(12) United States Patent
Ju

(10) Patent No.: US 12,373,000 B2
(45) Date of Patent: Jul. 29, 2025

(54) DISPLAY SUBSTRATE AND DISPLAY DEVICE INCLUDING THE SAME

(71) Applicant: Samsung Display Co., LTD., Yongin-si (KR)

(72) Inventor: Jin Ho Ju, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 241 days.

(21) Appl. No.: 18/172,224

(22) Filed: Feb. 21, 2023

(65) Prior Publication Data

US 2023/0376070 A1    Nov. 23, 2023

(30) Foreign Application Priority Data

May 19, 2022    (KR) ........................ 10-2022-0061165

(51) Int. Cl.
*G06F 1/16* (2006.01)
*H04M 1/02* (2006.01)

(52) U.S. Cl.
CPC .......... *G06F 1/1616* (2013.01); *G06F 1/1652* (2013.01); *G06F 1/1656* (2013.01); *H04M 1/0222* (2013.01); *H04M 1/0268* (2013.01)

(58) Field of Classification Search
CPC .... G06F 1/1616; G06F 1/1652; G06F 1/1656; G06F 1/1637; G06F 1/1641; G06F 1/1681; H04M 1/0222; H04M 1/0268; H10K 77/111; H10K 71/50; H10K 2102/311; G09F 9/301
See application file for complete search history.

(56) References Cited

U.S. PATENT DOCUMENTS 9,983,424 B2 *   5/2018   Kim ..................... H10K 77/111
10,591,959 B1 *  3/2020   Hsu ......................... G09F 9/301
12,158,779 B2 * 12/2024   Ohyama .................. G09F 9/301

FOREIGN PATENT DOCUMENTS

KR    10-2020-0091529 A    7/2020
KR    10-2022-0002005 A    1/2022

* cited by examiner

*Primary Examiner* — Anthony M Haughton
*Assistant Examiner* — Hung Q Dang
(74) *Attorney, Agent, or Firm* — Womble Bond Dickinson (US) LLP

(57) ABSTRACT

A display device includes: a first substrate, and a second substrate on the first substrate, each of the first and second substrates including: a folding part; and first and second non-folding parts spaced from each other by the folding part; a first reinforcing member between the first and second substrates, and overlapping with the folding parts of the first and second substrates; and a metal plate on a rear side of the first substrate, and including: a connecting part overlapping with the first reinforcing member, and including: slits; and bars at least partially spaced from one another by the slits; a first plate part overlapping with the first non-folding part of the first substrate; and a second plate part spaced from the first plate part with the connecting part interposed therebetween, and overlapping with the second non-folding part of the first substrate.

16 Claims, 42 Drawing Sheets

DISPLAY SUBSTRATE AND DISPLAY DEVICE INCLUDING THE SAME

CROSS-REFERENCE TO RELATED APPLICATION

This application claims priority to and the benefit of Korean Patent Application No. 10-2022-0061165, filed on May 19, 2022 in the Korean Intellectual Property Office, the entire content of which is incorporated by reference herein.

BACKGROUND

1. Field

Aspects of embodiments of the present disclosure relate to a display substrate, and a display device including the display substrate.

2. Description of the Related Art

A display device, which is a device for displaying an image, may include a display panel, such as a liquid crystal display panel or an organic light-emitting display panel including organic light-emitting diodes (OLEDs) or quantum-dot electroluminescence (QD-EL) devices.

A mobile electronic device includes a display device for providing an image to a user. The number of mobile electronic devices having a large display screen, while also having a volume or thickness equal to or smaller than a conventional electronic device, has increased. To provide a large screen only at the time of use, a foldable display device or a bendable display device that may be folded and unfolded has been developed.

The above information disclosed in this Background section is for enhancement of understanding of the background of the present disclosure, and therefore, it may contain information that does not constitute prior art.

SUMMARY

In a foldable display device, a metal plate that may be at least partially flexible in accordance with a folding operation of a display panel may be disposed on a rear side of the display panel.

One or more embodiments of the present disclosure are directed to a display device including a display panel having improved resistance against external impacts by including a reinforcing member, which is formed of a material having a large modulus value, between folding parts of first and second substrates that correspond to a folding area of the display device.

However, the aspects and features of the present disclosure are not restricted to those set forth herein. The above and other aspects and features of the present disclosure will become more apparent to those having ordinary skill in the art to which the present disclosure pertains by referencing the detailed description of the present disclosure and the figures.

According to one or more embodiments of the present disclosure, a display device includes: a first substrate including: a folding part; and first and second non-folding parts spaced from each other by the folding part; a second substrate on the first substrate, and including: a folding part; and first and second non-folding parts spaced from each other by the folding part of the second substrate; a first reinforcing member between the first and second substrates, and overlapping with the folding parts of the first and second substrates; and a metal plate on a rear side of the first substrate, and including: a connecting part overlapping with the first reinforcing member, and including: slits; and bars at least partially spaced from one another by the slits; a first plate part overlapping with the first non-folding part of the first substrate; and a second plate part spaced from the first plate part with the connecting part interposed therebetween, and overlapping with the second non-folding part of the first substrate.

In an embodiment, the first reinforcing member may not overlap with the first and second plate parts.

In an embodiment, the first reinforcing member may have a modulus value of 50 GPa to 450 GPa.

In an embodiment, the first reinforcing member may include at least one of molybdenum, copper, aluminum, silicon nitride, silicon oxide, or silicon oxynitride.

In an embodiment, the first reinforcing member may include: a plurality of first supporting parts; and a plurality of first openings between the first supporting parts, and penetrating the first reinforcing member in a thickness direction, and the first reinforcing member may have a mesh pattern defined by the first supporting parts and the first openings.

In an embodiment, the first openings may have a circular shape or a polygonal shape, and the polygonal shape may be one of a triangular shape, a rectangular shape, a pentagonal shape, or a hexagonal shape.

In an embodiment, a width of the first supporting parts may be 50 μm to 500 μm.

In an embodiment, a width of the first openings may be 30 μm to 300 μm.

In an embodiment, the display device may further include a second reinforcing member between the first and second substrates, and overlapping with the first reinforcing member. The second reinforcing member may overlap with the connecting part.

In an embodiment, the first and second reinforcing members may include different materials from each other.

In an embodiment, the first and second reinforcing members may have different thicknesses from each other.

In an embodiment, the second reinforcing member may include: a plurality of second supporting parts; and a plurality of second openings between the second supporting parts, and penetrating the second reinforcing member in the thickness direction. The second reinforcing member may have a mesh pattern defined by the second supporting parts and the second openings.

In an embodiment, the second openings may have a different shape from that of the first openings.

In an embodiment, the display device may further include a middle layer between the first and second substrates, and the middle layer may cover an entirety of the first reinforcing member.

According to one or more embodiments of the present disclosure, a display device includes: a substrate including: a first non-folding part; a second non-folding part at a side of the first non-folding part in a first direction; a first folding part between the first and second non-folding parts; a third non-folding part at one side of the second non-folding part in the first direction; and a second folding part between the second and third non-folding parts; a first reinforcing member on the substrate, and overlapping with the first folding part; a second reinforcing member on the substrate, and overlapping with the second folding part; and a metal plate on a rear side of the substrate, and including: a first plate part; a second plate part at one side of the first plate part in the first direction; a first connecting part between the first and second plate parts; a third plate part at one side of the second plate part in the first direction; and a second connecting part between the second and third plate parts. The first connecting part includes: first slits; and first bars at least partially spaced from one another by the first slits; and the second connecting part includes: second slits; and second bars at least partially spaced from one another by the second slits. The first reinforcing member overlaps with the first connecting part; and the second reinforcing member overlaps with the second connecting part.

In an embodiment, the first and second reinforcing members may have different widths from each other.

In an embodiment, the first and second reinforcing members may include different materials from each other.

In an embodiment, the first reinforcing member may include: a plurality of first supporting parts; and a plurality of first openings between the first supporting parts, and penetrating the first reinforcing member in a thickness direction, and the first reinforcing member may have a mesh pattern defined by the first supporting parts and the first openings. The second reinforcing member may include: a plurality of second supporting parts; and a plurality of second openings between the second supporting parts, and penetrating the second reinforcing member in the thickness direction, and the second reinforcing member may have a mesh pattern defined by the second supporting parts and the second openings. The first openings may have a different shape from that of the second openings.

According to one or more embodiments of the present disclosure, a display substrate includes: a first substrate including: a folding part; and first and second non-folding parts spaced from each other by the folding part; a second substrate on the first substrate, and including: a folding part; and first and second non-folding parts spaced from each other by the folding part of the second substrate; and a reinforcing member overlapping with the folding parts of the first and second substrates. The reinforcing member includes: a plurality of supporting parts; and a plurality of openings between the supporting parts, and penetrating the reinforcing member in a thickness direction, and the reinforcing member may have a mesh pattern defined by the supporting parts and the openings.

In an embodiment, the display substrate may further include: a middle layer between the first and second substrates, and the middle layer may cover an entirety of the reinforcing member.

According to one or more embodiments of the present disclosure, as a reinforcing member having a large modulus value may be disposed between the folding parts of the first and second substrates to overlap with a plurality of slits included in a metal plate on the rear side of a display panel, step differences generated by the slits may be compensated for, and the impact resistance of the display panel may be improved.

However, the aspects and features of the present disclosure are not limited to those described above, and other aspects and features of the present disclosure will be apparent from the following detailed description with reference to the figures.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
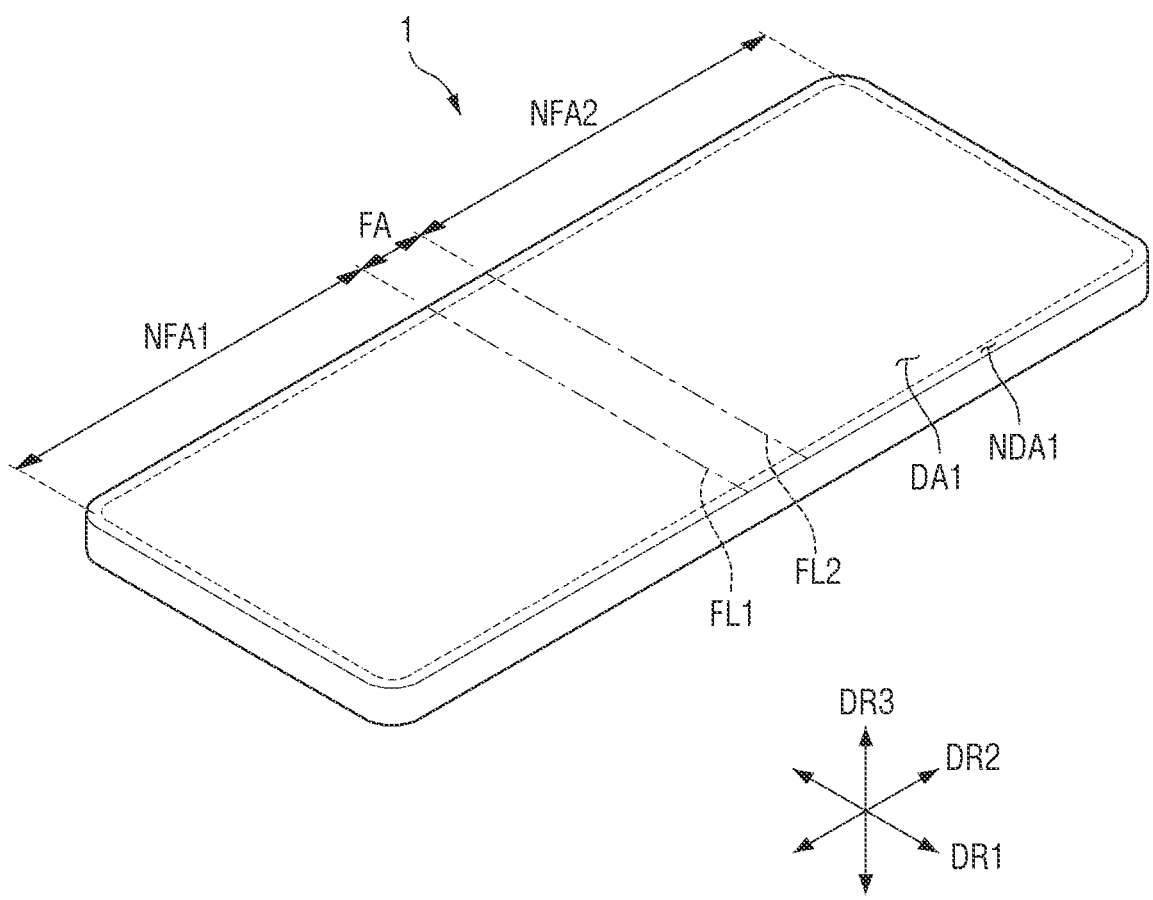
FIG. 1 is a perspective view of a display device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
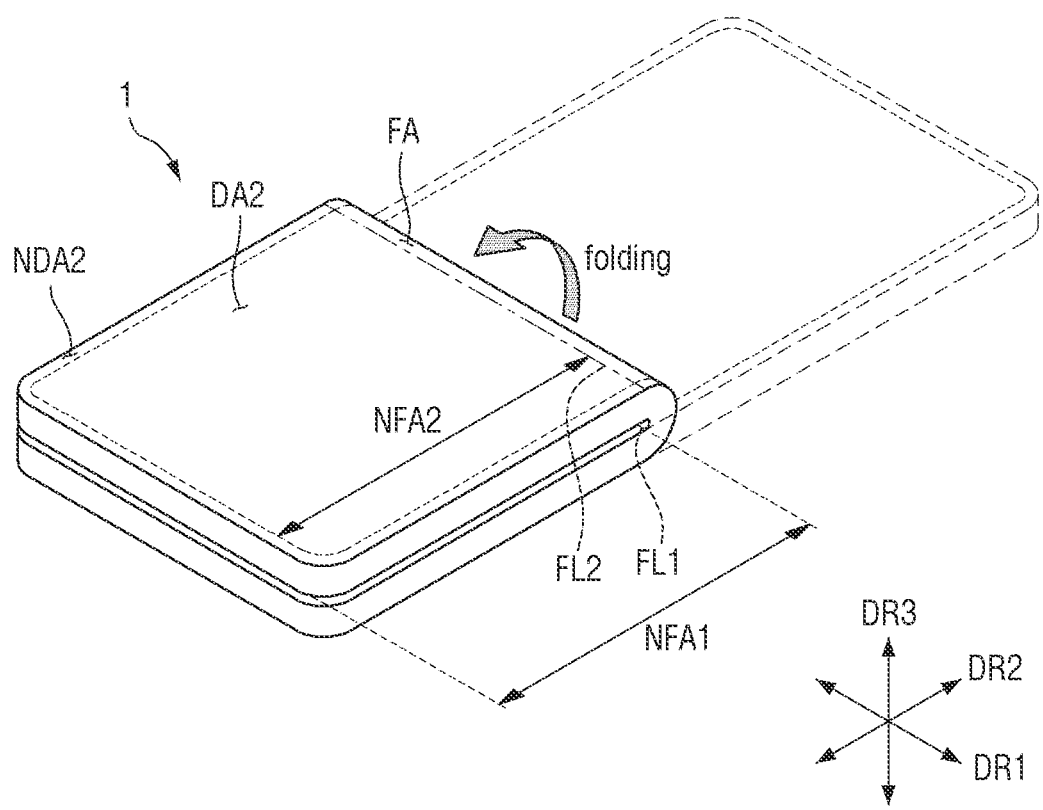
FIG. 2 is a perspective view of the display device of FIG. 1 in a folded state.

FIG. 1 is a perspective view of a display device according to an embodiment of the present disclosure. FIG. 2 is a perspective view of the display device of FIG. 1 in a folded state.

FIG. 1 illustrates a display device 1 in a first state, which is an unfolded state of the display device 1 that is not folded along folding lines, and FIG. 2 illustrates the display device 1 a second state, which is the folded state of the display device 1 folded along the folding lines.

Referring to FIGS. 1 and 2, the display device 1 may be a foldable, stretchable, flexible, bendable, or rollable display device. The display device 1 may be applicable to a smartphone, but the present disclosure is not limited thereto.

For example, the display device 1, which is a device for displaying a moving and/or still image, may be used as the display screen of various suitable mobile electronic devices, such as a mobile phone, a smartphone, a tablet personal computer (PC), a smartwatch, a watchphone, a mobile communication terminal, an electronic notepad, an electronic book reader, a portable multimedia player (PMP), a navigation device, and/or an ultramobile PC (UMPC), as well as the display screen of various other suitable products, such as a television (TV), a notebook computer, a monitor, an electronic billboard, and/or an Internet-of-things (IoT) device.

The display device 1 may have a three-dimensional (3D) shape. Unless specified otherwise, hereinafter, a direction parallel to or substantially parallel to a first side (e.g., a longitudinal side) of the display device 1, a direction parallel to or substantially parallel to a second side (e.g., a latitudinal side) of the display device 1, and a thickness direction of the display device 1 will be referred to as first, second, and third directions DR1, DR2, and DR3, respectively. As used herein, the term "direction" may refer to both sides (e.g., opposite directions) of each corresponding direction. One side in a particular direction may be referred to as a first side in the particular direction, and another side in the particular direction may be referred to as a second side in the particular direction. Referring to FIG. 1, one side in the direction indicated by each arrow may be referred to as, but is not limited to, a first side, and the other side in the direction indicated by each arrow may be referred to as, but is not limited to, a second side. The first, second, and third directions DR1, DR2, and DR3 may be perpendicular to or substantially perpendicular to one another, but the present disclosure is not limited thereto.

In FIG. 1, the display device 1 having a tetragonal shape, for example, such as a rectangular shape that extends shorter in a longitudinal direction than in a latitudinal direction, and has right-angled or rounded corners, is illustrated, but the present disclosure is not limited thereto.

The display device 1 may include a front side and a rear side. The display device 1 may further include at least one lateral side between the front side and the rear side.

The display device 1 includes a first non-folding part NFA1, a folding part FA, and a second non-folding part NFA2.

The first and second non-folding parts NFA1 and NFA2 may be parts of the display device 1 that are not bent, and are constantly flat or substantially flat. The first non-folding part NFA1, which is part of the display device 1, may be disposed on a first side in the second direction DR2. The second non-folding part NFA2, which is another part of the display device 1, may be disposed on a second side in the second direction DR2.

The folding part FA may be a bendable part of the display device 1. The folding part FA may be disposed between the first and second non-folding parts NFA1 and NFA2. In other words, the first non-folding part NFA1 may be disposed on a first side, in the second direction DR2, of the folding part FA, and the second non-folding part NFA2 may be disposed on a second side, in the second direction DR2, of the folding part FA.

The folding part FA may be defined by first and second folding lines FL1 and FL2. The first and second folding lines FL1 and FL2 may be where the folding part FA is folded. The first folding line FL1 may be a boundary between the first non-folding part NFA1 and the folding part FA, and the second folding line FL2 may be a boundary between the second non-folding part NFA2 and the folding part FA. The first and second folding lines FL1 and FL2 may extend in the first direction DR1, but the present disclosure is not limited thereto.

When the folding part FA is not folded, the display device 1 may maintain or substantially maintain a state of being unfolded (hereinafter, referred to as a first state) as illustrated in FIG. 1. When the folding part FA is folded, the display device 1 maintains or substantially maintains a state of being folded (hereinafter, referred to as a second state). The display device 1 may be folded in the second direction DR2 along the first and second folding lines FL1 and FL2, to be switched from the first state to the second state. As a result, the length in the second direction DR2 of the display device 1 may be reduced by half, and the display device 1 may be carried with ease.

One folding part FA and two non-folding parts (e.g., NFA1 and NFA2) may be defined in the display device 1, but the present disclosure is not limited thereto. For example, in some embodiments, multiple folding parts FA and multiple non-folding parts (e.g., NFA1 and NFA2) may be defined in the display device 1.

The display device 1 includes a display area (e.g., DA1 and DA2) and a non-display area (e.g., NDA1 and NDA2).

The display area may be an area where pixels are disposed and an image is displayed. The display area (e.g., DA1 and DA2) may include first and second display areas DA1 and DA2. The non-display area (e.g., NDA1 and NDA2) may be an area that does not display an image. The non-display area (e.g., NDA1 and NDA2) may include first and second non-display areas NDA1 and NDA2.

When the display device 1 is in the first state, the front side where the first display area DA1 and the first non-display area NDA1 are disposed may correspond to a first side in the third direction DR3 of the display device 1, and the rear side where the second display area DA2 and the second non-display area NDA2 are disposed may be a second side in the third direction DR3 of the display device 1.

Referring to FIG. 1, when the display device 1 is in the first state, the first display area DA1 may be disposed on the first side in the third direction DR3 of the display device 1 to overlap with the first non-folding part NFA1, the folding part FA, and the second non-folding part NFA2 in the third direction DR3. In other words, when the display device 1 is in the first state, first sides in the third direction DR3 of the first non-folding part NFA1, the folding part FA, and the second non-folding part NFA2 may correspond to the front side where the first display area DA1 is disposed, and second sides in the third direction DR3 of the first non-folding part NFA1, the folding part FA, and the second non-folding part NFA2 may correspond to the rear side where the first display area DA1 is not disposed. The shape of the first display area DA1 may conform to the shape of the display device 1 in the first state. For example, in a case where the display device 1 has a rectangular shape in the first state, the first display area DA1 may also have a rectangular shape.

The first non-display area NDA1 may be disposed around (e.g., adjacent to) the first display area DA1. The first non-display area NDA1 may be disposed to surround (e.g., around a periphery of) the first display area DA1, but the present disclosure is not limited thereto. For example, the first display area DA1 may be only partially surrounded (e.g., around a periphery thereof) by the first non-display area NDA1.

When the display device 1 is in the first state, the second display area DA2 may be disposed on the second side, in the third direction DR3, of the display device 1, and may overlap with only the second non-folding part NFA2, but the present disclosure is not limited thereto. For example, when the display device 1 is in the second state, the second display area DA2 may display a screen to a user. In other words, as the second display area DA2 is disposed on the rear side of the second non-display part NFA2, the second display area DA2 may not be disposed on the rear sides of the folding part FA and the first non-folding part NFA1. The shape of the second display area DA2 may conform to the shape of the display device 1 in the second state, as illustrated in FIG. 2. For example, in a case where the display device 1 has a square or substantially square (or rectangle) shape in the second state, the second display area DA2 may also have a square or substantially square (or rectangle) shape.

When the display device 1 is in the first state, the second non-display area NDA2 may be disposed around (e.g., adjacent to) the second display area DA2, and may overlap with the folding part FA and the first non-folding part NFA1 in the third direction DR3. In other words, the second display area DA2 may not be disposed on the rear sides of the folding part FA and the first non-folding part NFA1, and the second non-display area NDA2 may be disposed on the rear sides of the folding part FA and the first non-folding part NFA1. The second non-display area NDA2 may be disposed to surround (e.g., around a periphery of) the second display area DA2, but the present disclosure is not limited thereto. For example, the second display area DA2 may be partially surrounded (e.g., around a periphery thereof) by the second non-display area NDA2.

The display area (e.g., DA1 and DA2) may be provided on both the front and rear sides of the display device 1, but the present disclosure is not limited thereto. In some embodiments, the display area (e.g., DA1 and DA2) may be provided on the front side, the rear side, and two or more lateral sides of the display device 1.

Referring to FIG. 2, the display device 1 may be folded inwards, such that parts of the first display area DA1 that overlap with the first and second non-folding parts NFA1 and NFA2 when the display device 1 is folded in the second state may face each other, but the present disclosure is not limited thereto. As another example, the display device 1 may be folded outwards, such that parts of the rear side of the display device 1 may face each other.

Figure 3:
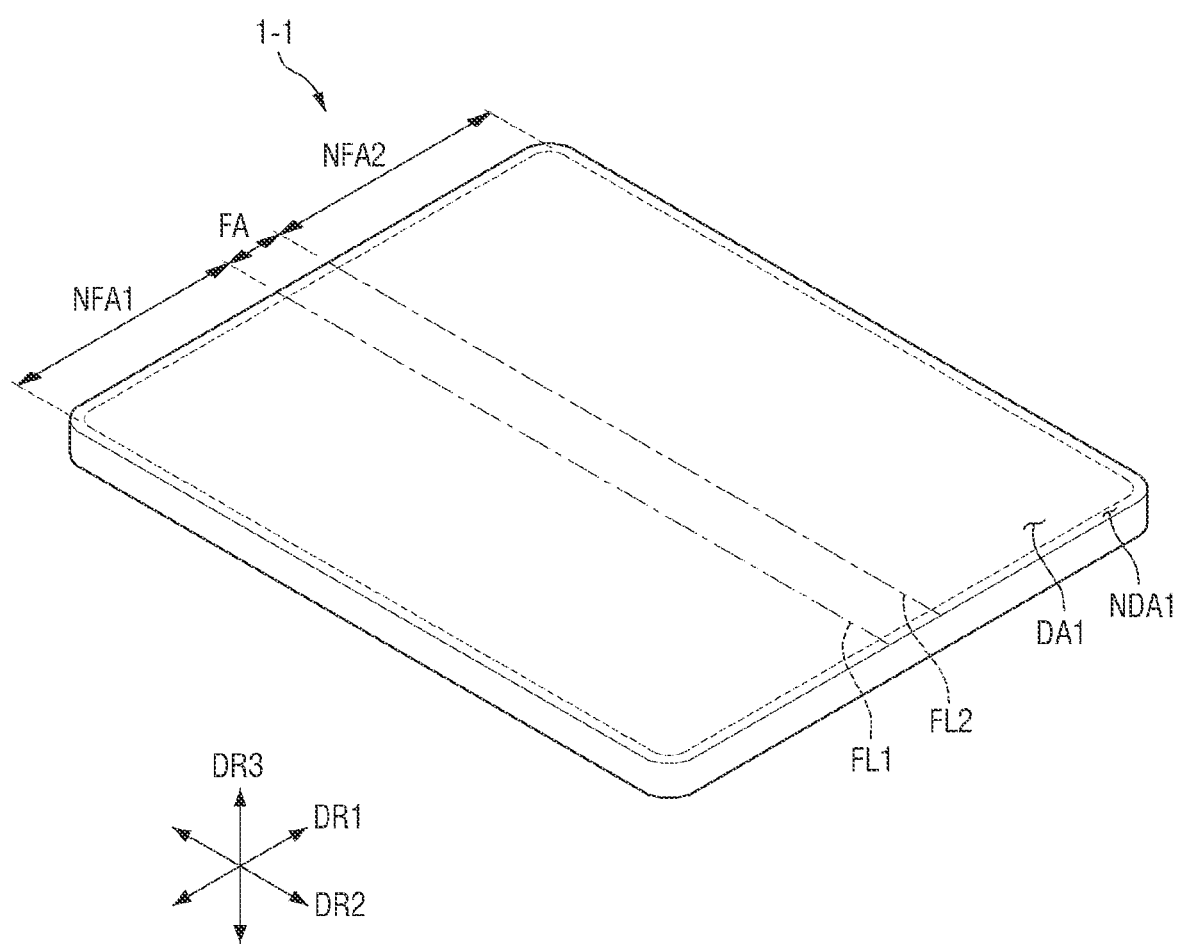
FIG. 3 is a perspective view of a display device according to another embodiment of the present disclosure in a first state.
Figure 4:
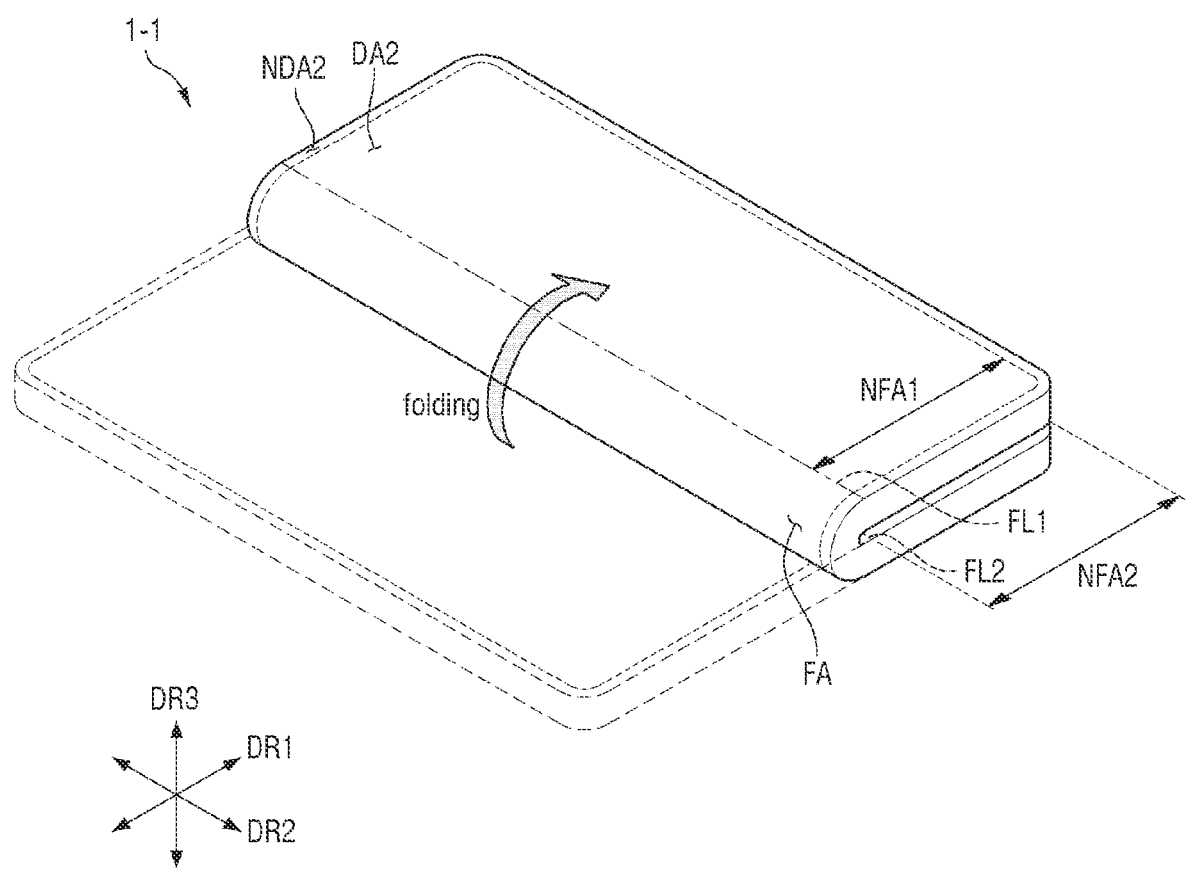
FIG. 4 is a perspective view of the display device of FIG. 3 in a second state.

FIG. 3 is a perspective view of a display device according to another embodiment of the present disclosure in a first state. FIG. 4 is a perspective view of the display device of FIG. 3 in a second state.

The embodiment of FIGS. 3 and 4 may be different from the embodiment of FIGS. 1 and 2, in that a display device 1_1 may have a rectangular shape that extends longer in a longitudinal direction than in a latitudinal direction. In FIGS. 3 and 4, other than the different shapes of the parts as illustrated, the same or substantially the same parts and components as those described above with reference to FIGS. 1 and 2 are denoted with the same reference symbols, and thus, redundant description thereof will not be repeated.

Figure 5:
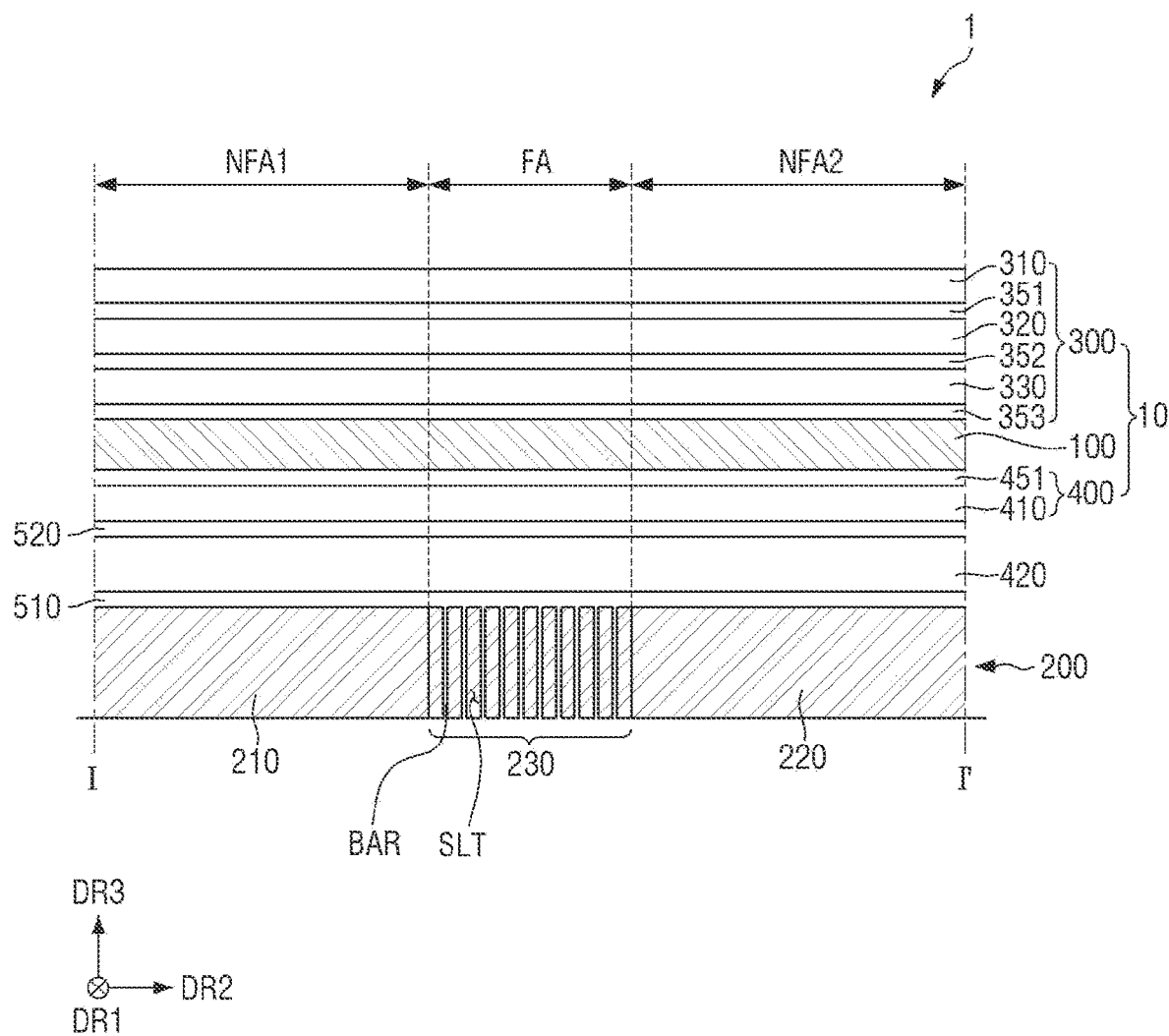
FIG. 5 is a cross-sectional view of a display device according to an embodiment of the present disclosure.
Figure 6:
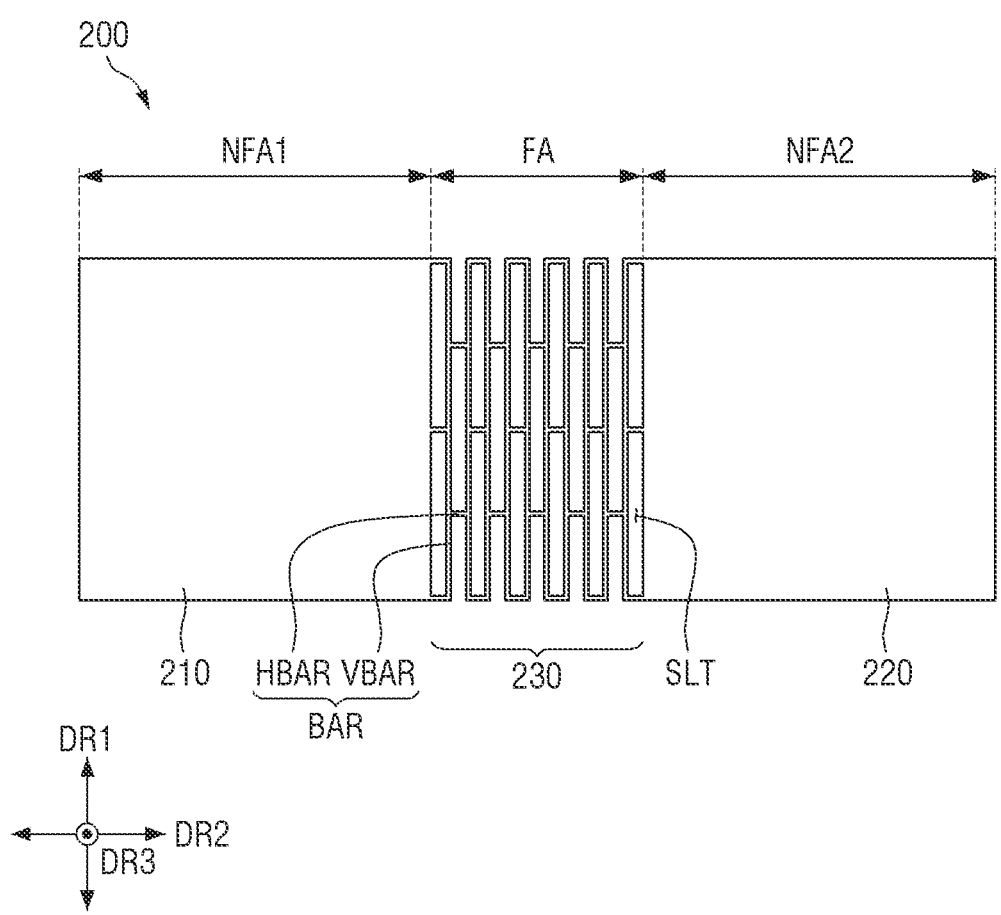
FIG. 6 is a plan view of a metal plate according to an embodiment of the present disclosure.

FIG. 5 is a cross-sectional view of a display device according to an embodiment of the present disclosure. FIG. 6 is a plan view of a metal plate according to an embodiment of the present disclosure.

Referring to FIG. 5, a display module (e.g., a display or a touch-display) 10 may include a display panel 100, a front stack structure 300, and a rear stack structure 400.

The front stack structure 300 is stacked at the front of the display panel 100, and the rear stack structure 400 is stacked at the rear of the display panel 100. The front of the display panel 100 may correspond to the direction in which the display panel 100 displays an image, and the rear of the display panel 100 may correspond to the opposite direction of the direction in which the display panel 100 displays an image.

The display panel 100, which is a panel for displaying a screen or an image, may be, for example, a self-emissive display panel, such as such as an organic light-emitting diode (OLED) display panel, an inorganic electroluminescence (LE) display panel, a quantum-dot electroluminescence (QD) display panel, a micro-light-emitting diode (microLED) display panel, a nano-light-emitting diode (nanoLED) display panel, a plasma display panel (PDP), a field emission display (FED) panel, or a cathode-ray tube (CRT) display panel, or a light-receiving display panel, such as a liquid crystal display (LCD) panel or an electrophoretic display (EPD) panel. For convenience, the display panel 100 will be described in more detail hereinafter in the context of an OLED display panel, but the present disclosure is not limited thereto. In other words, various other suitable display panels may also be applicable to the display panel 100.

The front stack structure 300 is disposed at the front of the display panel 100. The front stack structure 300 may include a polarizing member 330, a cover window 320, and a cover window protective layer 310, which are sequentially stacked at the front of the display panel 100.

The polarizing member 330 polarizes light that is transmitted therethrough. The polarizing member 330 may reduce a reflection of external light. The polarizing member 330 may be a polarizing film. The polarizing film may include a polarizing layer, and protective substrates, which are disposed above and below the polarizing film to protect the polarizing film. The polarizing film may include a polyvinyl alcohol (PVA) film. The polarizing film may be stretched in one direction. The direction in which the polarizing film is stretched may be an absorption axis, and a direction perpendicular to or substantially perpendicular to the absorption axis may be a transmission axis. The protective substrates may be disposed on both surfaces of the polarizing film. The protective substrates may be formed of a cellulose resin, such as triacetyl cellulose, or a polyester resin, but the present disclosure is not limited thereto.

The cover window 320 may be disposed at the front of the polarizing member 330. The cover window 320 protects the display panel 100. The cover window 320 may be formed of a transparent material. The cover window 320 may include, for example, glass, or plastic.

The cover window 320 may include glass, for example, such as ultrathin glass (UTG) or thin glass. In this case, the cover window 320 may have flexibility, such as bendability, foldability, or rollability. The thickness of the glass of the cover window 320 may be, for example, 10 μm to 300 μm, or in more detail, 30 μm to 80 μm or about 50 μm. The glass of the cover window 320 may include soda lime glass, alkali aluminosilicate glass, borosilicate glass, or lithium alumina silicate glass. The glass of the cover window 320 may include chemically- or thermally-strengthened glass to have a high strength. Chemical strengthening may be performed through an ion exchange treatment process in an alkali salt, and the ion exchange treatment process may be performed two or more times.

In a case where the cover window 320 includes plastic, the flexibility of the cover window 320 may be further improved. Examples of the plastic that is applicable to the cover window 320 include, but are not limited to, polyimide, polyacrylate, polymethylmethacrylate (PMMA), polycarbonate (PC), polyethylene naphthalate (PEN), polyvinylidene chloride, polyvinylidene difluoride (PVDF), polystyrene (PS), an ethylene vinyl alcohol copolymer, polyethersulphone (PES), polyetherimide (PEI), polyphenylene sulfide (PPS), polyallylate, triacetyl cellulose (TAC), and/or cellulose acetate propionate (CAP). The plastic cover window 320 may include one or more of the aforementioned plastic materials.

The cover window protective layer 310 may be disposed at the front of the cover window 320. The cover window protective layer 310 may perform at least one function, for example, such as anti-scattering, shock absorption, dent prevention, anti-fingerprint, and/or anti-glare. The cover window protective layer 310 may include a transparent polymer film. The transparent polymer film may include at least one of polyethylene terephthalate (PET), PEN, PES, polyimide (PI), polyarylate (PAR), PC, PMMA, and a cyclic olefin copolymer (COC) resin.

The front stack structure 300 may include first, second, and third front bonding members 351, 352, and 353, which bond the elements of the front stack structure 300 to one another, or bond the front stack structure 300 and the display panel 100 to each other. For example, the first front bonding member 351 may be disposed between the cover window 320 and the cover window protective layer 310, to bond the cover window 320 and the cover window protective layer 310 to each other. The second front bonding member 352 may be disposed between the cover window 320 and the polarizing member 330, to bond the cover window 320 and the polarizing member 330 to each other. The third front bonding member 353 may be disposed between the polarizing member 330 and the display panel 100, to bond the polarizing member 330 and the display panel 100 to each other. In other words, the first, second, and third front bonding members 351, 352, and 353, which are members for attaching the layers to the display panel 100, may be referred to as a protective layer bonding member 351 for attaching the cover window protective layer 310, a window bonding member 352 for attaching the cover window 320, and a polarizing member attaching member 353 for attaching the polarizing member 330, respectively, to the display panel 100. The first, second, and third front bonding members 351, 352, and 353 may all be optically clear (e.g., optically clear adhesives).

The rear stack structure 400 is disposed at the rear of the display panel 100. The rear stack structure 400 may include a polymer film layer 410, which is disposed at the rear of the display panel 100.

The polymer film layer 410 may include a polymer film. The polymer film layer 410 may include, for example, PI, PET, PC, polyethylene (PE), polypropylene (PP), polysulfone (PSF), PMMA, TAC, and/or a cyclic olefin polymer (COP).

The polymer film layer 410 may include a functional layer on at least one surface thereof. The functional layer may include, for example, a light-absorbing layer. The light-absorbing layer may include a light-absorbing material, such as a black dye or pigment. The light-absorbing layer may be formed of black ink on the polymer film via coating or printing.

The rear stack structure 400 may include a rear bonding member 451, which bonds the rear stack structure 400 and the display panel 100 to each other. For example, the rear bonding member 451 may be disposed between the display panel 100 and the polymer film layer 410, to bond the display panel 100 and the polymer film layer 410 to each other.

A barrier member 420 may be disposed at the rear of the polymer film layer 410. The barrier member 420 may prevent or substantially prevent a foreign material from the outside of the display device 1 from being introduced into the display module 10. The barrier member 420 may be formed of a material that is flexible in accordance with the folding and/or unfolding of the display device 1.

The display device 1 may include a metal plate 200, which is disposed at the rear of the display module 10. In other words, the metal plate 200 may be disposed on the rear side of the barrier member 420. The metal plate 200 may include bars BAR, and a lattice pattern, which is formed by slits SLT defined by the bars BAR, and may be configured to be at least partially flexible.

In some embodiments, the metal plate 200 may have a larger size than that of the display module 10, and may be longer than the display module 10 in both the first and second directions DR1 and DR2. For example, the metal plate 200 may have a thickness (e.g., in the third direction DR3) of about 0.1 mm to 0.2 mm.

The bars BAR and the slits SLT, which are included in a connecting part 230 of the metal plate 200, will be described in more detail below with reference to FIG. 6.

The barrier member 420 and the metal plate 200 may be bonded to the rear of the display module 10 through first and second bonding members 510 and 520.

In more detail, the second bonding member 520 may be disposed between the polymer film layer 410 and the barrier member 420, to bond the polymer film layer 410 and the barrier member 420 to each other. The first bonding member 510 may be disposed between the barrier member 420 and the metal plate 200, to bond the barrier member 420 and the metal plate 200 to each other.

Referring to FIG. 6, the metal plate 200 may include a first plate part 210, a second plate part 220, and the connecting part 230.

The metal plate 200 may have a rectangular shape that extends longer in the second direction DR2, but the present disclosure is not limited thereto.

The first and second plate parts 210 and 220 may be arranged along the second direction DR2. The first and second plate parts 210 and 220 may be arranged symmetrically or substantially symmetrically with each other with respect to the folding part FA. In other words, the first and second plate parts 210 and 220 may be spaced apart from each other in the second direction DR2 by the folding part FA, but the present disclosure is not limited thereto.

The first plate part 210 may be disposed to overlap with the first non-folding part NFA1, and the second plate part 220 may be disposed to overlap with the second non-folding part NFA2. Accordingly, the first and second plate parts 210 and 220 may be maintained or substantially maintained to be flat or substantially flat, regardless of the folding operation of the display device 1.

The first and second plate parts 210 and 220 may have a rectangular shape in a plan view, but the present disclosure is not limited thereto. The first and second plate parts 210 and 220 may be parts of the display device 1 that do not expand or contract, but that maintain or substantially maintain their length and/or size when the display device 1 is folded.

The connecting part 230 may be disposed between the first and second plate parts 210 and 220. The connecting part 230 may be disposed to overlap with the folding part FA. The connecting part 230 may be disposed to overlap with the first and second folding lines FL1 and FL2 extending in the first direction DR1, in the thickness direction DR3.

The connecting part 230 may have flexibility. The connecting part 230 may expand or contract, depending on whether the metal plate 200 is folded or unfolded. The connecting part 230 may be more flexible than the first plate part 210 and/or the second plate part 220. The connecting part 230 may reduce tensile or compressive stress generated by the bending of the metal plate 200.

The connecting part 230 may include a lattice pattern. In other words, the lattice pattern may include the bars BAR and the slits SLT, which are defined by the bars BAR. The slits SLT may be openings (e.g., holes) penetrating the metal plate 200 in the third direction DR3.

In other words, a plurality of bars BAR may be spaced at least partially apart from one another by the slits SLT, and the slits SLT may be disposed to be spaced apart from one another.

The bars BAR may include vertical bars VBAR, which extend in the first direction DR1, and horizontal bars HBAR, which extend in the second direction DR2.

As the slits SLT are defined by the bars BAR, the horizontal bars HBAR may be disposed between slits SLT that are adjacent to one another in the first direction DR1, and the vertical bars VBAR may be disposed between slits SLT that are adjacent to one another in the second direction DR2.

The slits SLT may extend in the first direction DR1, which is parallel to or substantially parallel to the first and second folding lines FL1 and FL2. In other words, the length in the first direction DR1 of the slits SLT may be greater than the length in the second direction DR2 of the slits SLT. Thus, each of the slits SLT may have longer sides in the first direction DR1 and shorter sides in the second direction DR2, and the longer sides of each of the slits SLT may be parallel to or substantially parallel to the first and second folding lines FL1 and FL2. However, the shape of the slits SLT is not particularly limited thereto.

The lattice pattern may have flexibility due to the slits SLT. In other words, the lattice pattern may expand or contract in the second direction DR2, when the display device 1 is being folded.

The metal plate 200 may include stainless steel, which may include, for example, at least one of iron (Fe), chromium (Cr), Carbon©, nickel (Ni), silicon (Si), manganese (Mn), molybdenum (Mo), and/or a suitable alloy thereof. The metal plate 200 may include austenitic stainless steel.

Figure 7:
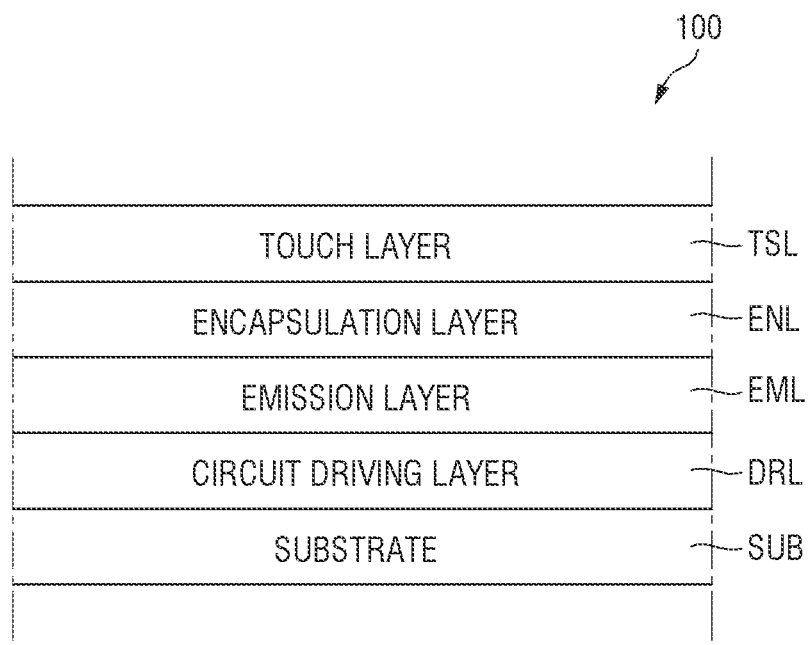
FIG. 7 is a schematic cross-sectional view of a display panel according to an embodiment of the present disclosure.

FIG. 7 is a schematic cross-sectional view of a display panel according to an embodiment of the present disclosure.

Referring to FIG. 7, the display panel 100 may include a substrate SUB, a circuit driving layer DRL, an emission layer EML, an encapsulation layer ENL, and a touch layer TSL, which are sequentially stacked on one another.

The substrate SUB may support elements or members disposed thereon.

The circuit driving layer DRL may be disposed on the substrate SUB.

The circuit driving layer DRL may include circuitry for driving the emission layer EML, and may also include a plurality of insulating films and a plurality of thin-film transistors (TFTs).

The emission layer EML may be disposed on the circuit driving layer DRL. The emission layer EML may include an organic emission layer. The emission layer EML may emit light having various desired luminances in response to driving signals from the circuit driving layer DRL.

The encapsulation layer ENL may be disposed on the emission layer EML. The encapsulation layer ENL may include an inorganic film, or a stack of an inorganic film and an organic film. In another embodiment, glass or an encapsulation film may be used as the encapsulation layer ENL.

The touch layer TSL may be disposed on the encapsulation layer ENL. The touch layer TSL, which is a layer for recognizing a touch input, may perform the functions of a touch member. The touch layer TSL may include a plurality of sensing areas and sensing electrodes.

Figure 8:
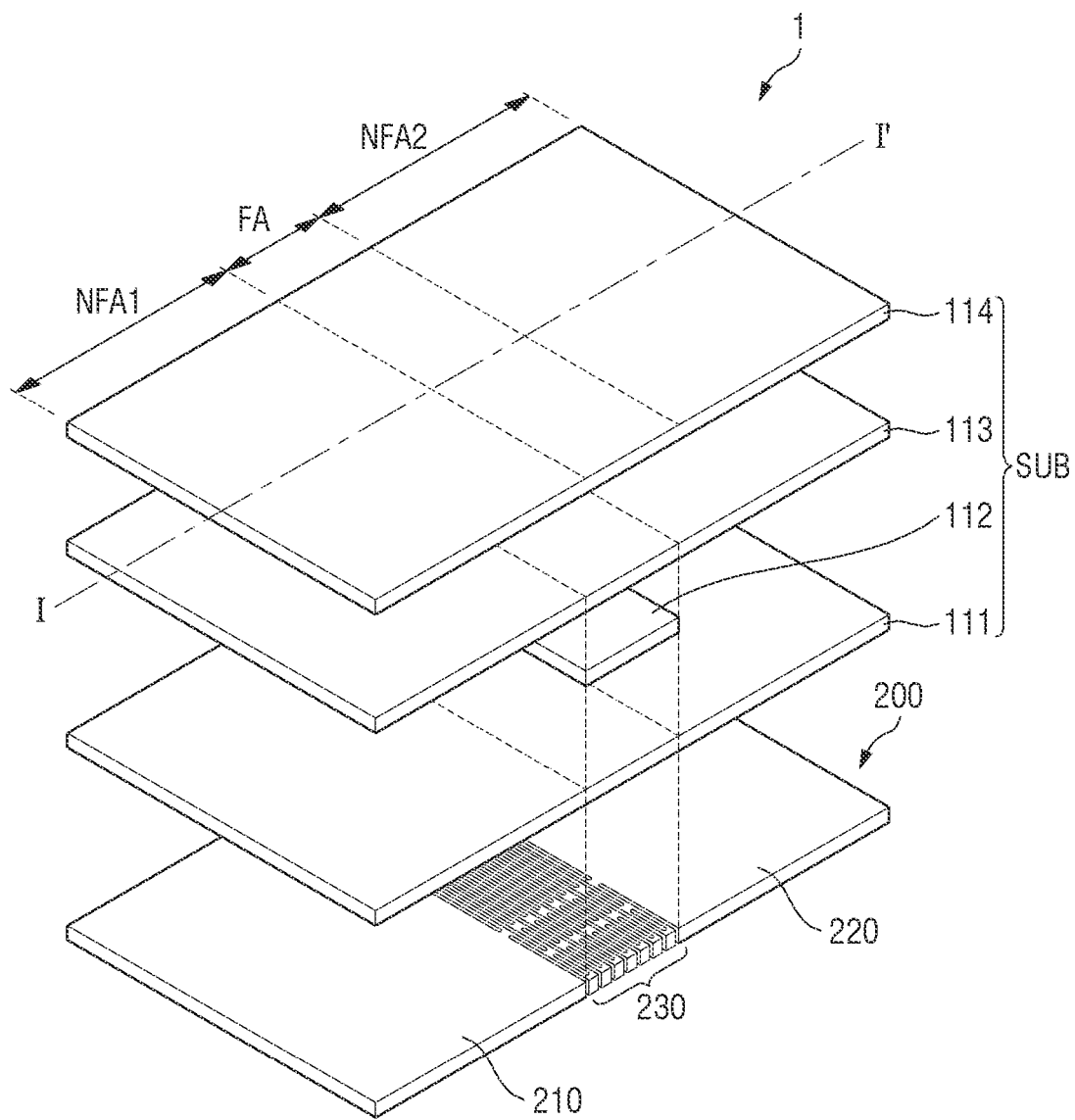
FIG. 8 is an exploded perspective view of the display device of FIG. 1.
Figure 9:
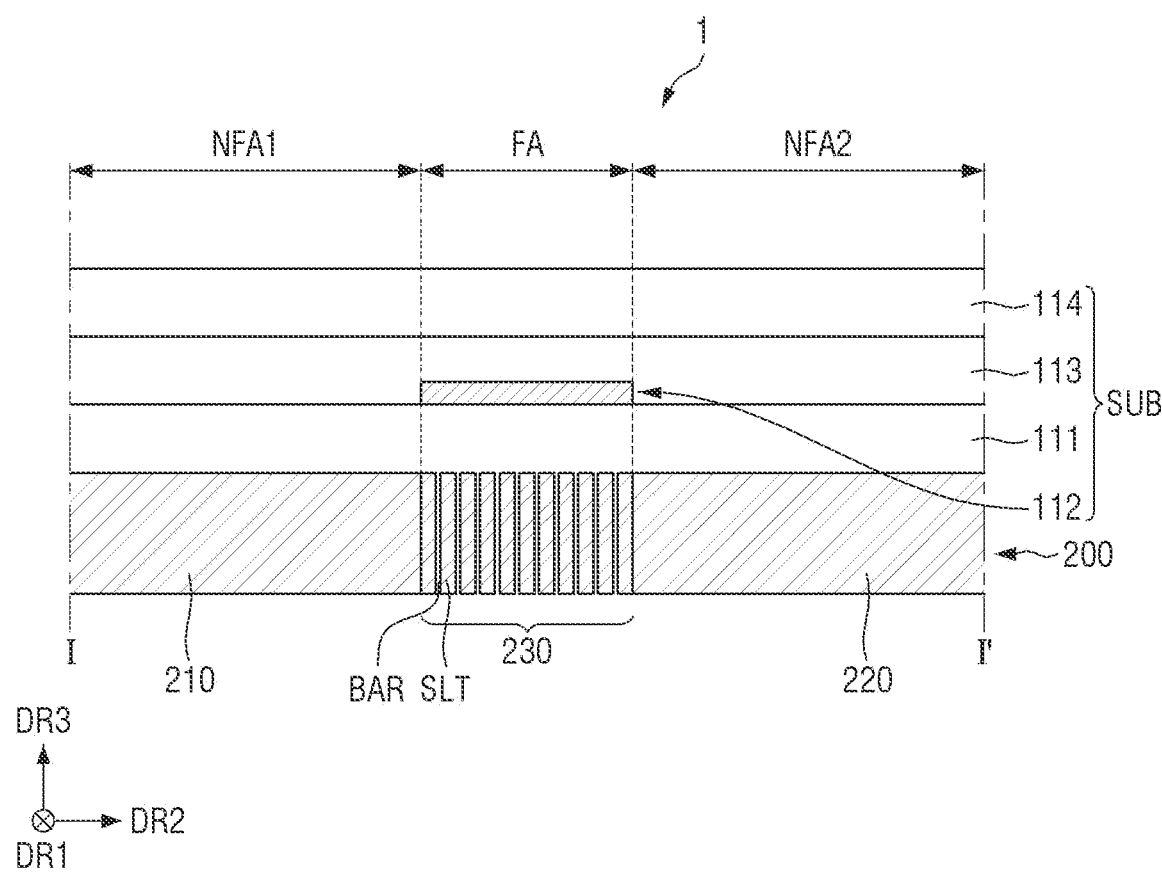
FIG. 9 is a cross-sectional view taken along the line I-I' of FIG. 8.

FIG. 8 is an exploded perspective view of the display device of FIG. 1. FIG. 9 is a cross-sectional view taken along the line I-I' of FIG. 8.

FIG. 8 is an exploded perspective view of the display device 1. For convenience of illustration, FIG. 8 shows some of the components of the display device 1, for example, such as the substrate SUB of the display panel 100, and the metal plate 200 at the rear of the display panel 100, but other components have been omitted.

Referring to FIGS. 8 and 9, the substrate SUB of the display panel 100 may include a first substrate 111, a reinforcing member 112, a barrier layer 113, and a second substrate 114. The metal plate 200 may be disposed on the rear side of the substrate SUB.

The substrate SUB, which is included in the display panel 100 of the display device 1, may be a flexible substrate. For example, the first and second substrates 111 and 114 of the substrate SUB may be formed of a polymer material, such as PI, or a plastic material.

In more detail, the substrate SUB may have a structure in which the first substrate 111, the reinforcing member 112, the barrier layer 113, and the second substrate 114 are sequentially stacked along the third direction DR3.

The first substrate 111 may include a first non-folding part NFA1, a folding part FA, and a second non-folding part NFA2. The first non-folding part NFA1, the folding part FA, and the second non-folding part NFA2 of the first substrate 111 may correspond to the first non-folding part NFA1, the folding part FA, and the second non-folding part NFA2 of the display device 1, and are the same or substantially the same as the first non-folding part NFA1, the folding part FA, and the second non-folding part NFA2 of the display device 1. Accordingly, redundant description thereof may not be repeated.

The first substrate 111 may be formed of an insulating material having flexibility, and may be an insulating plastic substrate including one of, for example, PI, PES, PET, and/or PC, but the present disclosure is not limited thereto.

The reinforcing member 112 may be disposed on the first substrate 111.

In more detail, the reinforcing member 112 may overlap with the folding part FA of the first substrate 111, and may be in contact (e.g., in direct contact) with the top surface of the first substrate 111. In other words, the reinforcing member 112 may overlap with the folding part FA of the first substrate 111, but may not overlap with the first and second non-folding parts NFA1 and NFA2 of the first substrate 111. The reinforcing member 112 may be disposed on the folding part FA of the first substrate 111.

The reinforcing member 112 may have a smaller size than those of the first substrate 111, the barrier layer 113, and the second substrate 113, and may have the same or substantially the same size and shape as those of the folding parts FA of the first and second substrates 111 and 114. For example, the reinforcing member 112 may have the same or substantially the same shape as that of the folding part FA of the first substrate 111, which has longer sides in the first direction DR1 and shorter sides in the second direction DR2.

In other words, the reinforcing member 112 may have a rectangular shape having longer sides in the first direction DR1 and shorter sides in the second direction DR2, but the present disclosure is not limited thereto. The reinforcing member 112 may have other various suitable shapes conforming to the shape of the folding part FA of the first substrate 111.

The barrier layer 113 may be disposed on the first substrate 111, and the reinforcing member 112 may be disposed therein. As the reinforcing member 112 is not disposed between the first and second non-folding parts NFA1 and NFA2 of the first substrate 111, the rear side of the barrier layer 113 may be in direct contact with the first substrate 111 at the first and second non-folding parts NFA1 and NFA2 of the first substrate 111.

In other words, the barrier layer 113 may be in contact with the top surface of the reinforcing member 112 to cover the reinforcing member 112 at (e.g., in or on) an overlapping area with the folding part FA of the first substrate 111, and may be in contact with the top surface of the first substrate 111 at (e.g., in or on) overlapping areas with the first and second non-folding parts NFA1 and NFA2 of the first substrate 111.

Thus, the reinforcing member 112 may be completely covered (e.g., encapsulated) by the first substrate 111 and the barrier layer 113. In more detail, the barrier layer 113 may be in contact with the top surface of the reinforcing member 112 to cover the reinforcing member 112 at (e.g., in or on) the overlapping area with the folding part FA of the first substrate 111, may be in contact with one side of the reinforcing member 112 to cover the one side of the reinforcing member 112 at (e.g., in or on) an area along a boundary between the first non-folding part NFA1 and the folding part FA of the first substrate 111, and may be in contact with another side of the reinforcing member 112 to cover the other side of the reinforcing member 112 at (e.g., in or on) an area along a boundary between the second non-folding part NFA2 and the folding part FA of the first substrate 111. Also, the folding part FA of the first substrate 111 may be in contact with the rear side of the reinforcing member 112 to cover the rear side of the reinforcing member 112.

As the reinforcing member 112 is not exposed to the outside of the first substrate 111 and/or the second substrate 114 due to the presence of the first substrate 111 and the barrier layer 113, damage that may be caused when the reinforcing member 112 is exposed may be prevented or substantially prevented.

The second substrate 114 may include a first non-folding part NFA1, a folding part FA, and a second non-folding part NFA2, and may be disposed on the barrier layer 113.

In more detail, the first non-folding part NFA1 of the second substrate 114 may overlap with the first non-folding part NFA1 of the first substrate 111 with the barrier layer 113 interposed therebetween. The folding part FA of the second substrate 114 may overlap with the folding part FA of the first substrate 111 with the reinforcing member 112 and the barrier layer 113 interposed therebetween. The second non-folding part NFA2 of the second substrate 114 may overlap with the second non-folding part NFA2 of the first substrate 111 with the barrier layer 113 interposed therebetween. The second substrate 114 may include the same or substantially the same material as that of the first substrate 111, but the present disclosure is not limited thereto.

In some embodiments, the barrier layer 113 may not be provided between the first and second substrates 111 and 114. In this case, the second substrate 114 may be in contact (e.g., in direct contact) with, and may completely cover, the reinforcing member 112, and the first and second non-folding parts NFA1 and NFA2 of the second substrate 114 may be in contact with the first and second non-folding parts NFA1 and NFA2 of the first substrate 111, respectively.

As described above, the metal plate 200, which includes the plurality of slits SLT, and the plurality of bars BAR that are spaced apart from one another by the slits SLT, may be disposed on the rear side of the substrate SUB.

Referring to FIG. 9, the connecting part 230 of the metal plate 200 may overlap with the folding part FA of the substrate SUB in the thickness direction (e.g., the third direction DR3).

In more detail, the slits SLT and the bars BAR of the connecting part 230 of the metal plate 200 may overlap with the reinforcing member 112, which is on the folding part FA of the first substrate 111, in the third direction DR3.

In other words, the reinforcing member 112, which is disposed on the folding part FA of the first substrate 111, may cover the entirety or substantially the entirety of the connecting part 230 of the metal plate 200, which is disposed on the rear side of the first substrate 111, but the present disclosure is not limited thereto.

The reinforcing member 112 may include a metallic material. For example, the reinforcing member 112 may include a suitable material, such as copper (Cu), Mo, or aluminum (Al), but the present disclosure is not limited thereto. In some embodiments, the reinforcing member 112 may include an inorganic material. For example, the reinforcing member 112 may be formed as a single layer or multilayers including one or more of silicon nitride, silicon oxide, or silicon oxynitride.

The reinforcing member 112 may have a modulus value of about 50 GPa to about 450 GPa. The modulus value of the reinforcing member 112 is not particularly limited thereto.

In a case where the reinforcing member 112 has a modulus value of 50 GPa or greater, unevenness between the elements of the display device 1, or step differences caused by the slits SLT of the metal plate 200, may be sufficiently alleviated, and impact resistance of the folding part FA may be improved. In a case where the reinforcing member 112 has a modulus value of 450 GPa or less, the flexibility of the reinforcing member 112 at (e.g., in or on) the folding part FA can be maintained or substantially maintained during the folding operation of the display device 1.

As the reinforcing member 112, which is formed of a suitable material having a high modulus value, is disposed between the folding part FA of the first substrate 111 and part of the barrier layer 113 overlapping with the folding part FA of the first substrate 111, the impact resistance of the folding part FA of the display device 1 may be improved, and the reliability of the display device 1 may be improved.

Figure 10:
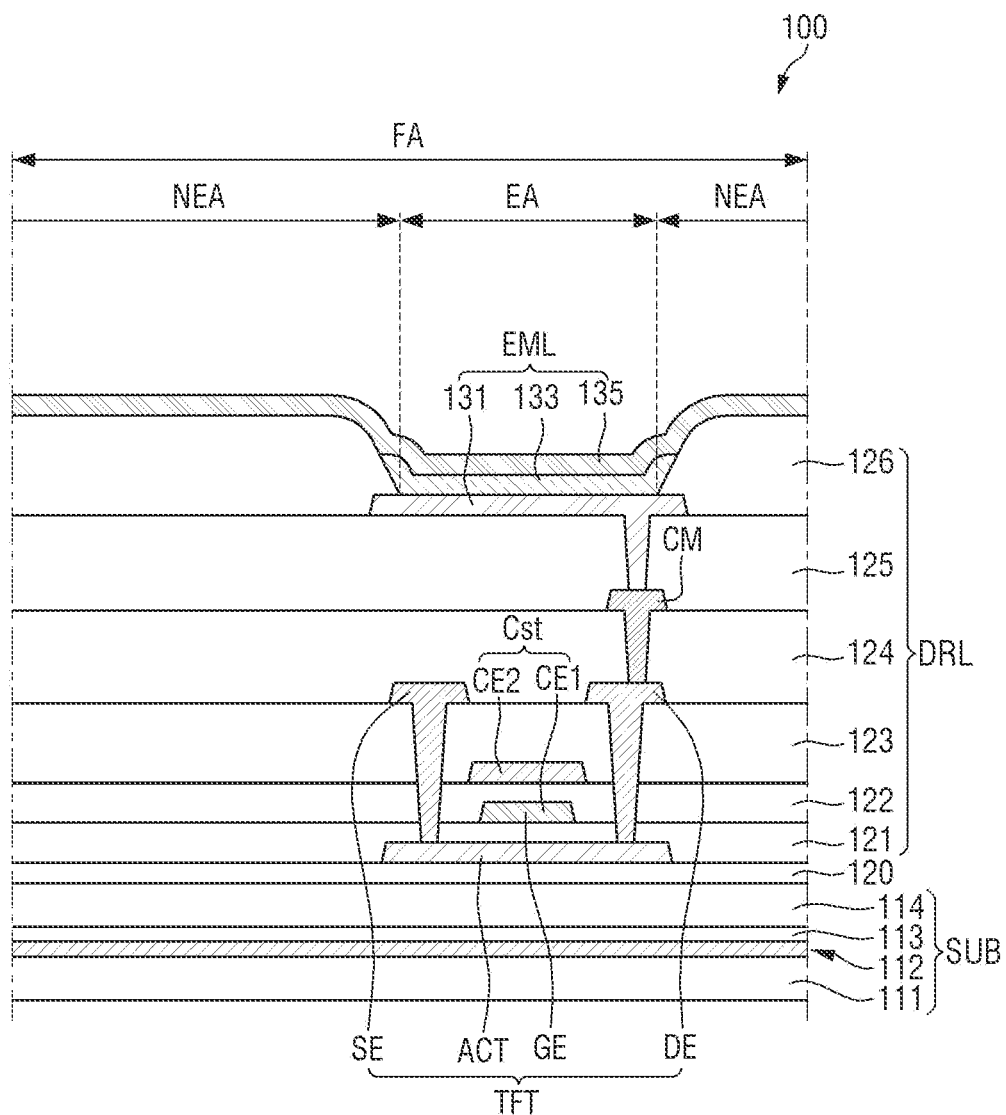
FIG. 10 is a cross-sectional view of a folding part of a display panel according to an embodiment of the present disclosure.

FIG. 10 is a cross-sectional view of a folding part of a display panel according to an embodiment of the present disclosure.

Referring to FIG. 10, a folding part FA of a display panel 100 may include a substrate SUB, a circuit driving layer DRL including a plurality of insulating layers, and an emission layer EML.

As described above, the substrate SUB may be flexible to maintain or substantially maintain the performance of the display device 1, even when the display device 1 is bent.

The substrate SUB may be the same or substantially the same as the substrate SUB described above with reference to FIGS. 8 and 9, and thus, redundant description thereof may not be repeated.

The buffer layer 120 may be positioned on the substrate SUB. The buffer layer 120 may planarize or substantially planarize a surface (e.g., a top surface) of the substrate SUB, and may prevent or substantially prevent impurities from infiltrating into a semiconductor layer ACT disposed above the buffer layer 120. The buffer layer 120 may have a single-layer structure or a multi-layered structure formed of an inorganic insulating material, such as silicon oxide, silicon nitride, or silicon oxynitride. In some embodiments, the buffer layer 120 may be omitted as needed or desired.

A thin-film transistor (TFT) may be disposed on the buffer layer 120. The thin-film transistor (TFT) may include the semiconductor layer ACT, a gate electrode GE, a source electrode SE, and a drain electrode DE.

The semiconductor layer ACT may include amorphous silicon, polycrystalline silicon, or an organic semiconductor material. The semiconductor layer ACT may include a source region, a drain region, and a channel region between the source region and the drain region.

The gate electrode GE may be formed as a single layer or multilayers including at least one of Al, platinum (Pt), palladium (Pd), silver (Ag), magnesium (Mg), gold (Au), Ni, neodymium (Nd), iridium (Ir), Cr, lithium (Li), calcium (Ca), Mo, titanium (Ti), tungsten (W), or Cu.

A first insulating layer 121 may be disposed between the semiconductor layer ACT and the gate electrode GE. Second and third insulating layers 122 and 123 may be disposed between the gate electrode GE and the source and drain electrodes SE and DE.

The first, second, and third insulating layers 121, 122, and 123 may include an inorganic material, such as silicon oxide, silicon nitride, and/or silicon oxynitride.

The source electrode SE and the drain electrode DE may be electrically connected to the source region and the drain region, respectively, of the semiconductor layer ACT through contact holes formed in the first, second, and third insulating layers 121, 122, and 123.

The source electrode SE and the drain electrode DE may be formed as single layers or multilayers including at least one of Al, Pt, Pd, Ag, Mg, Au, Ni, Nd, Ir, Cr, Li, Ca, Mo, Ti, W, or Cu.

A capacitor Cst may include a lower electrode CE1 and an upper electrode CE2, which overlap with each other with the second insulating layer 122 interposed therebetween. The capacitor Cst may overlap with the thin-film transistor (TFT).

FIG. 10 illustrates that the gate electrode GE of the thin-film transistor (TFT) is also the lower electrode CE1 of the capacitor Cst, but the present disclosure is not limited thereto. As another example, in some embodiments, the capacitor Cst may not overlap with the thin-film transistor (TFT), and the lower electrode CE1 of the capacitor Cst may be a separate independent element from the gate electrode GE of the thin-film transistor (TFT). The capacitor Cst may be covered by the third insulating layer 123.

A pixel circuit including the thin-film transistor (TFT) and the capacitor Cst may be covered by fourth and fifth insulating layers 124 and 125. The fourth and fifth insulating layers 124 and 125 may be organic insulating planarization layers.

The fourth and fifth insulating layers 124 and 125 may include an organic insulating material, such as a general-purpose polymer (e.g., PMMA or PS), a polymer derivative having a phenolic group, an acrylic polymer, an imide polymer, an aryl ether polymer, an amide polymer, a fluorine polymer, a p-xylene polymer, a vinyl alcohol polymer, or a suitable blend thereof. The fourth and fifth insulating layers 124 and 125 may include PI.

Various conductive layers may be further disposed on the third insulating layer 123. For example, a data line and a power supply voltage line may be further disposed at (e.g., in or on) the same layer as that of the source electrode SE and the drain electrode DE, for example, on the third insulating layer 123. The data line and the power supply voltage line may include Mo, Al, Cu, or Ti, and may be formed as single layers or multilayers. Each of the data line and the power supply voltage line may be formed as multilayers of, for example, Ti/Al/Ti.

The fourth insulating layer 124 may be disposed on the source electrode SE and the drain electrode DE. A connecting electrode CM may be disposed on the fourth insulating layer 124. The connecting electrode CM may electrically connect a first electrode 131 and the source or drain electrode SE or DE of the thin-film transistor (TFT) to each other. The connecting electrode CM may include at least one of Mo, Al, Cu, Ti, and/or a suitable alloy thereof, and may be formed as a single layer or multilayers. The connecting electrode CM may be formed as multilayers of, for example, Ti/Al/Ti.

The emission layer EML may be disposed on the fifth insulating layer 125. The emission layer EML may include the first electrode 131, a second electrode 135, and a light-emitting element layer 133 disposed between the first and second electrodes 131 and 135.

The first electrode 131 may include a conductive oxide, such as indium tin oxide (ITO), indium zinc oxide (IZO), zinc oxide (ZnO), indium oxide (In2O3), indium gallium oxide (IGO), or aluminum zinc oxide (AZO).

In some embodiments, the first electrode 131 may include a reflective film, which may include Ag, Mg, Al, Pt, Pd, Au, Ni, Nd, Ir, Cr, or a suitable compound thereof. The first electrode 131 may further include an ITO, IZO, ZnO, or In2O3 film above or below the reflective film.

A sixth insulating layer 126 may be disposed on the fifth insulating layer 125 to cover edges of the first electrode 131. The sixth insulating layer 126 may include an opening to expose part of the first electrode 131. The opening of the sixth insulating layer 126 may define an emission area EA. In other words, a display area DA may include the emission area EA, and a non-emission NEA surrounding (e.g., around a periphery of) the emission area EA.

The sixth insulating layer 126 may be disposed to correspond to the non-emission area NEA, and may include an organic material, such as acryl, benzocyclobutene (BCB), PI, or hexamethyldisiloxane (HMDSO). As another example, the sixth insulating layer 126 may include an inorganic material described above.

The light-emitting element layer 133 may be formed on part of the first electrode 131 that is exposed by the opening of the sixth insulating layer 126. A light-emitting layer may include a high-molecular organic material or a low-molecular organic material capable of emitting light of a desired color (e.g., a predetermined or particular color). The light-emitting layer may be a red-light-emitting layer, a green-light-emitting layer, or a blue-light-emitting layer. As another example, the light-emitting layer may have a multilayered structure in which a red-light-emitting layer, a green-light-emitting layer, and a blue-light-emitting layer are stacked to emit white light, or may have a single-layer structure including a red-light-emitting material, a green-light-emitting material, or a blue-light-emitting material.

The light-emitting element layer 133 may include a first functional layer disposed below the light-emitting layer, and a second functional layer disposed above the light-emitting layer. The first and second functional layers may be integrally formed for multiple first electrodes 131, or may be patterned to correspond to each individual ones of the multiple first electrodes 131.

The second electrode 135 may be disposed to face the first electrode 131, with the light-emitting element layer 133 interposed therebetween. The second electrode 135 may be formed of a conductive material with a low work function. For example, the second electrode 135 may include a transparent (or semitransparent) layer including Ag, Mg, Al, Pt, Pd, Au, Ni, Nd, Ir, Cr, Li, Ca, or a suitable alloy thereof. The second electrode 135 may further include a layer of ITO, IZO, ZnO or In2O3 on the transparent (or semitransparent) layer.

Hereinafter, display devices according to one or more other embodiments of the present disclosure will be described in more detail, while focusing mainly on the differences with the display device 1 described above. Like reference numerals are used to indicate like elements (e.g., the same or substantially the same elements) throughout the present disclosure, and thus, redundant description thereof may be simplified, or may not be repeated.

Figure 11:
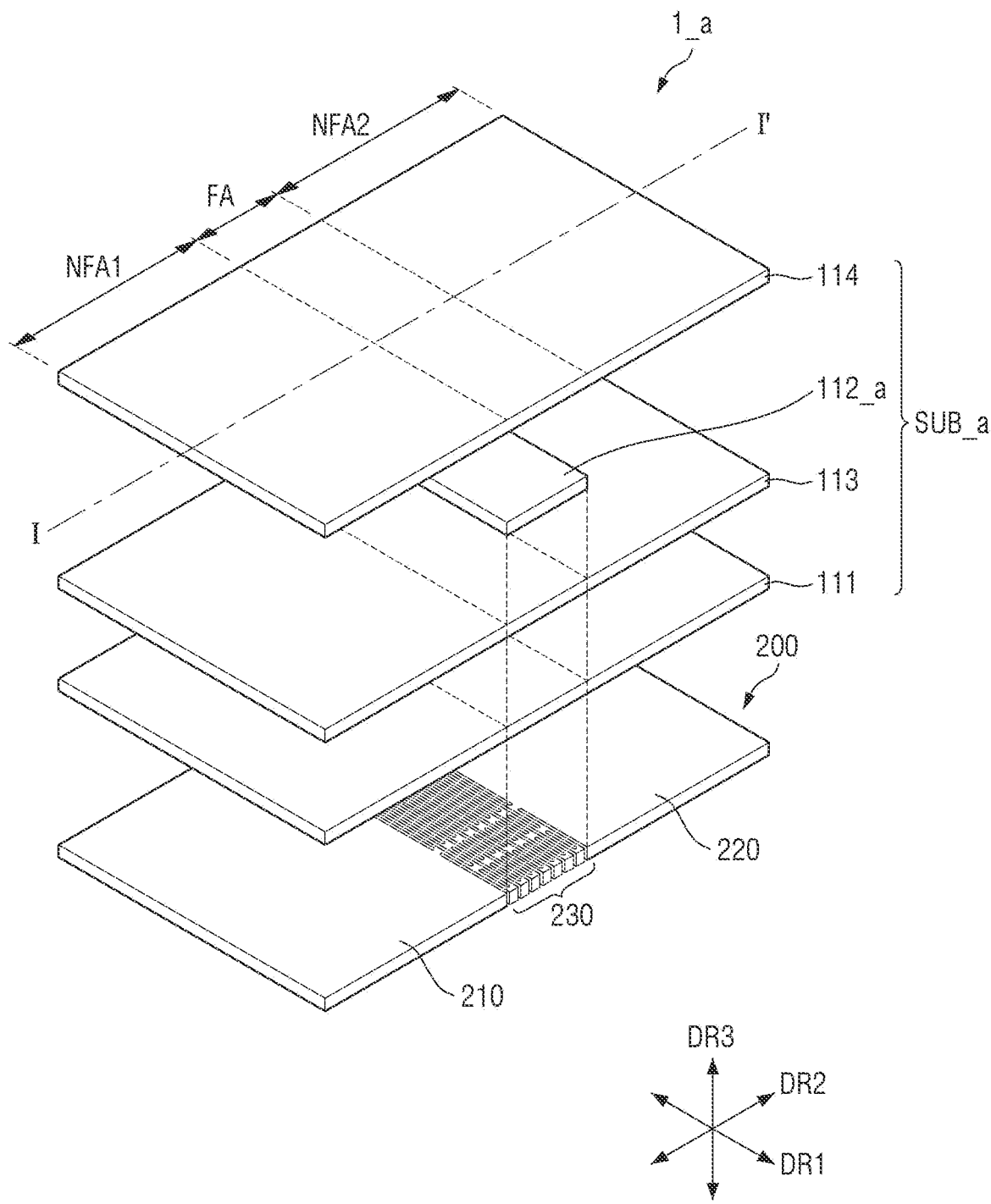
FIG. 11 is an exploded perspective view of a display device according to another embodiment of the present disclosure.
Figure 12:
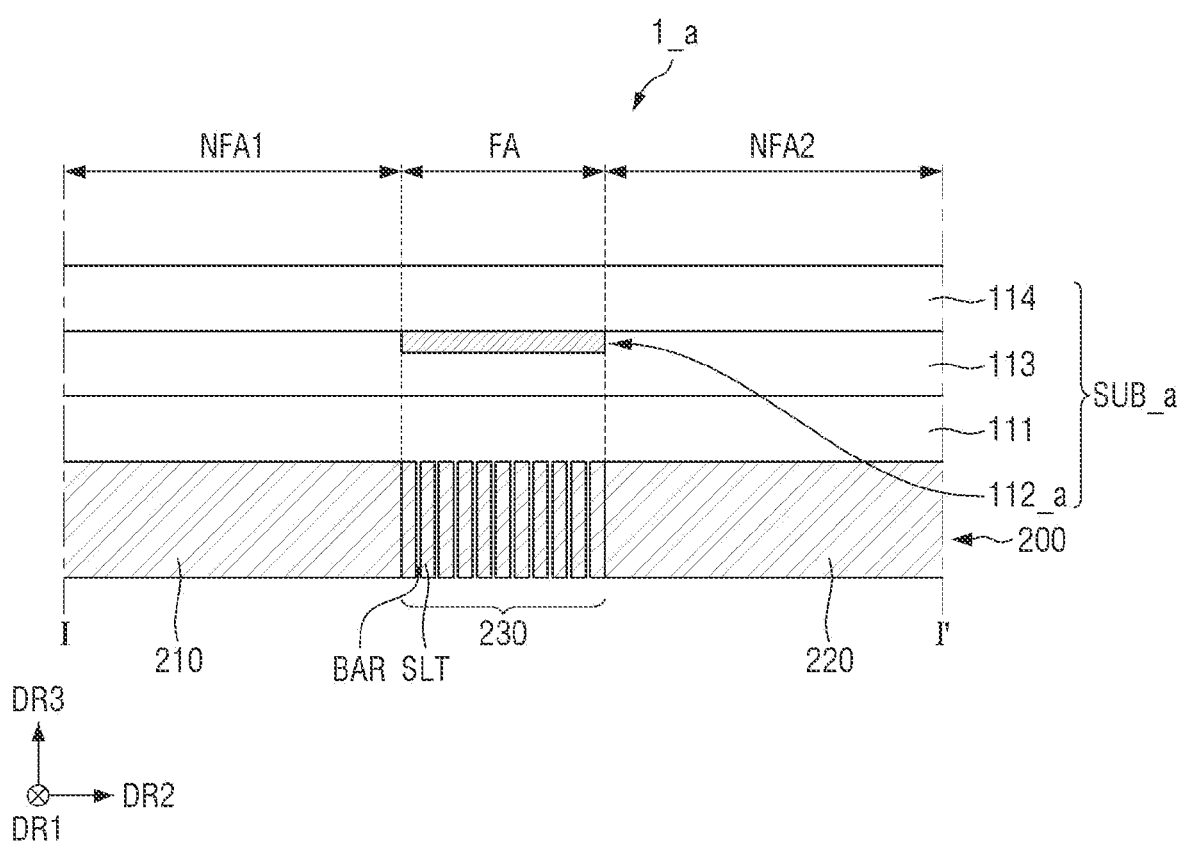
FIG. 12 is a cross-sectional view taken along the line I-I' of FIG. 11.

FIG. 11 is an exploded perspective view of a display device according to another embodiment of the present disclosure. FIG. 12 is a cross-sectional view taken along the line I-I' of FIG. 11.

The embodiment illustrated in FIGS. 11 and 12 may differ from the embodiment illustrated in FIG. 8, in that, unlike in the substrate SUB of the display device 1, in a substrate SUB_a of a display device 1_a, a reinforcing member 112_a is disposed between the barrier layer 113 and the second substrate 114.

Referring to FIGS. 11 and 12, the reinforcing member 112_a may be disposed on the rear side of the second substrate 114.

In more detail, the barrier layer 113 may cover, and may be in contact with, the rear side of the reinforcing member 112_a at (e.g., in or on) the overlapping area with the folding part FA of the second substrate 114, and may be in contact with the rear side of the second substrate 114 at (e.g., in or on) the overlapping area of the first non-folding part NFA1 and the second non-folding part NFA2 of the second substrate 114.

Thus, the reinforcing member 112_a may be completely covered (e.g., encapsulated) by the second substrate 114 and the barrier layer 113. In more detail, the barrier layer 113 may be in contact with, and may cover, the rear side of the reinforcing member 112_a at (e.g., in or on) the overlapping area with the folding part FA of the second substrate 114, may be in contact with, and may cover, a side of the reinforcing member 112_a at (e.g., in or on) an area along the boundary between the first non-folding part NFA1 and the folding part FA of the second substrate 114, and may be in contact with, and may cover, another side of the reinforcing member 112_a at (e.g., in or on) an area along the boundary between the second non-folding part NFA2 and the folding part FA of the second substrate 114.

The folding part FA of the second substrate 114 may be in contact with, and may cover, the top surface of the reinforcing member 112_a.

Figure 13:
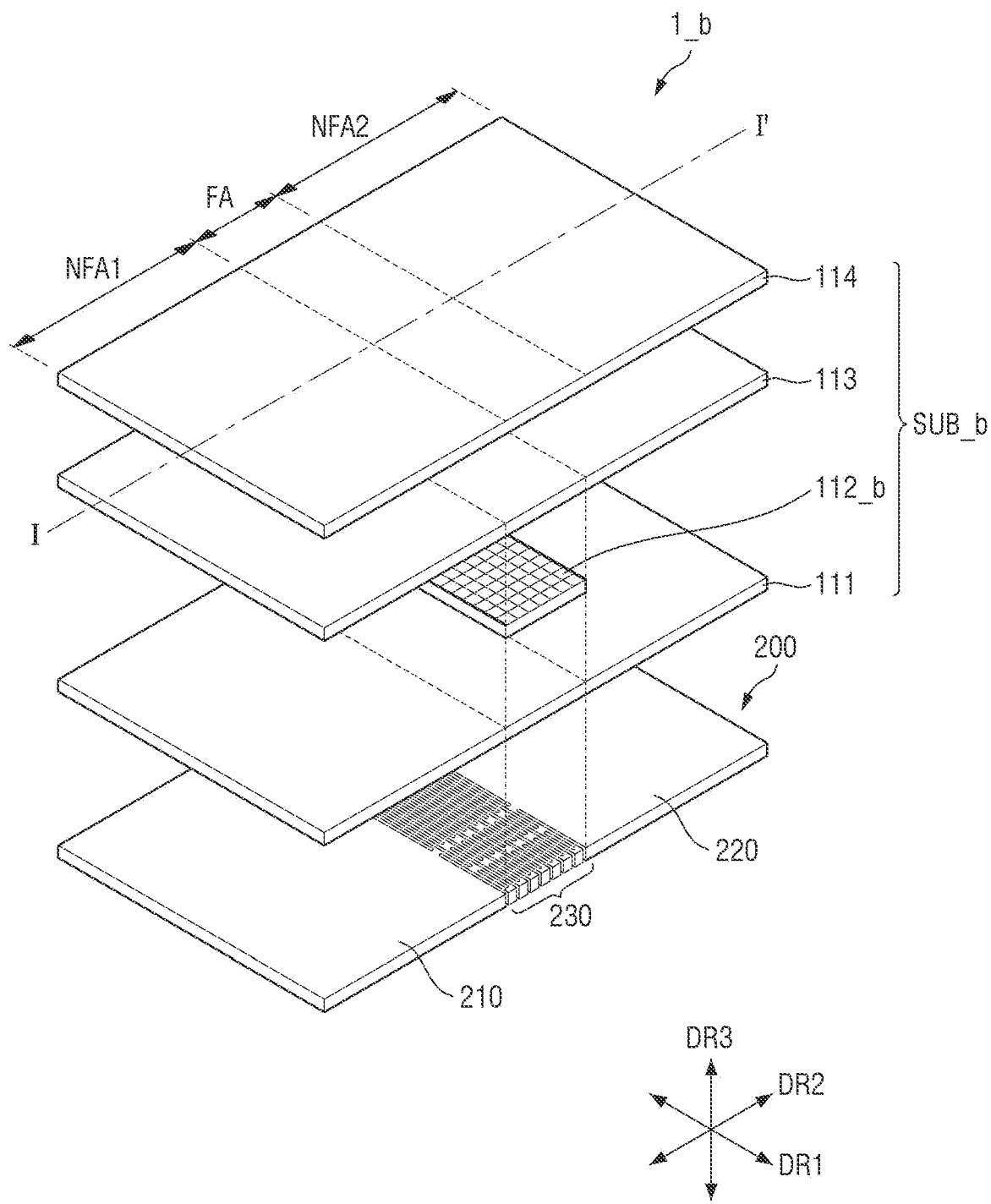
FIG. 13 is an exploded perspective view of a display device according to another embodiment of the present disclosure.
Figure 14:
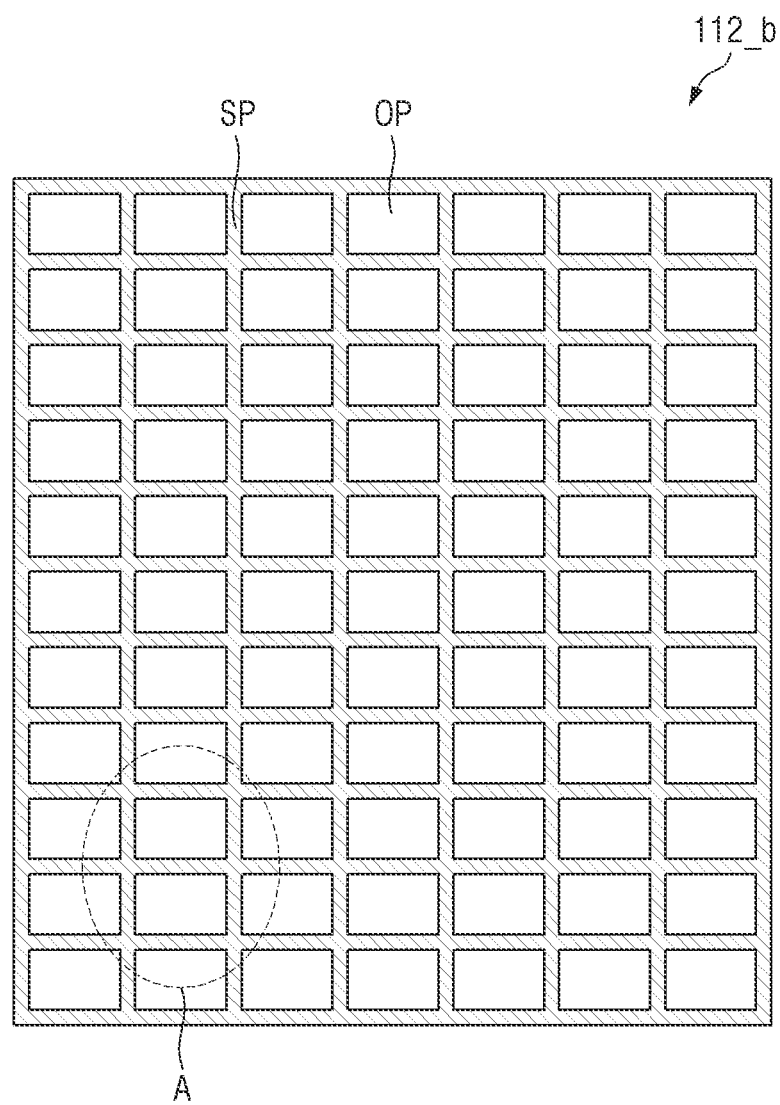
FIG. 14 is a plan view of a reinforcing member according to an embodiment of the present disclosure.
Figure 15:
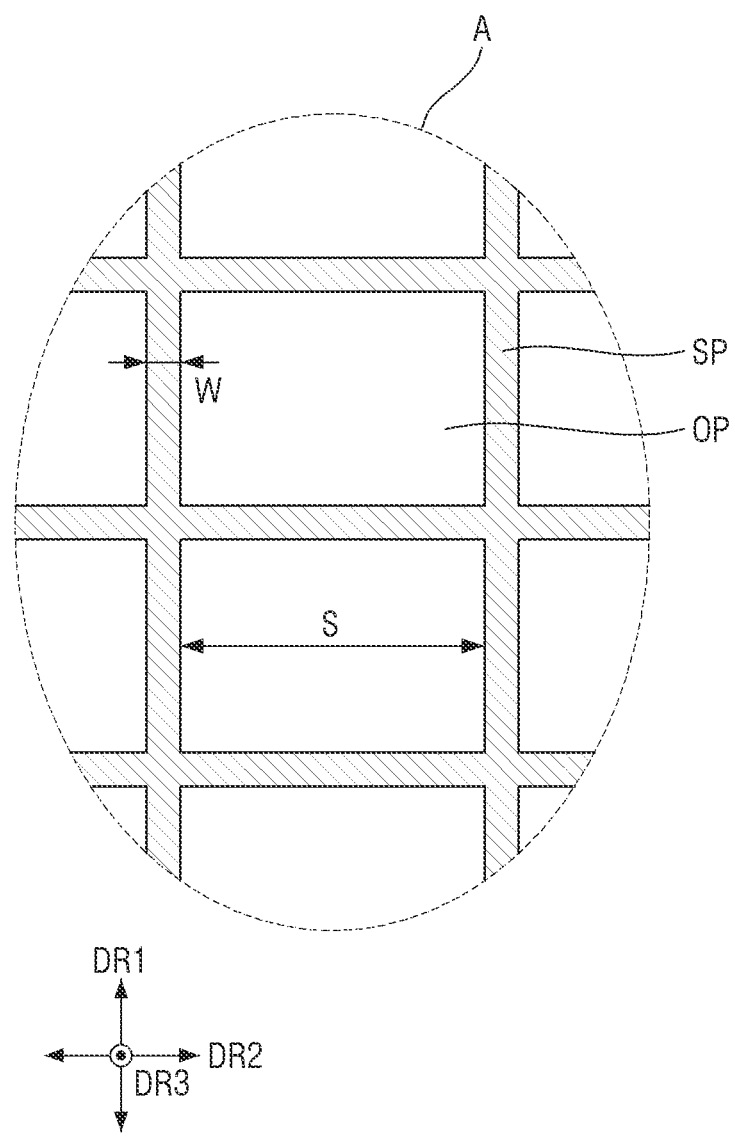
FIG. 15 is an enlarged plan view of the part A of FIG. 14.
Figure 16:
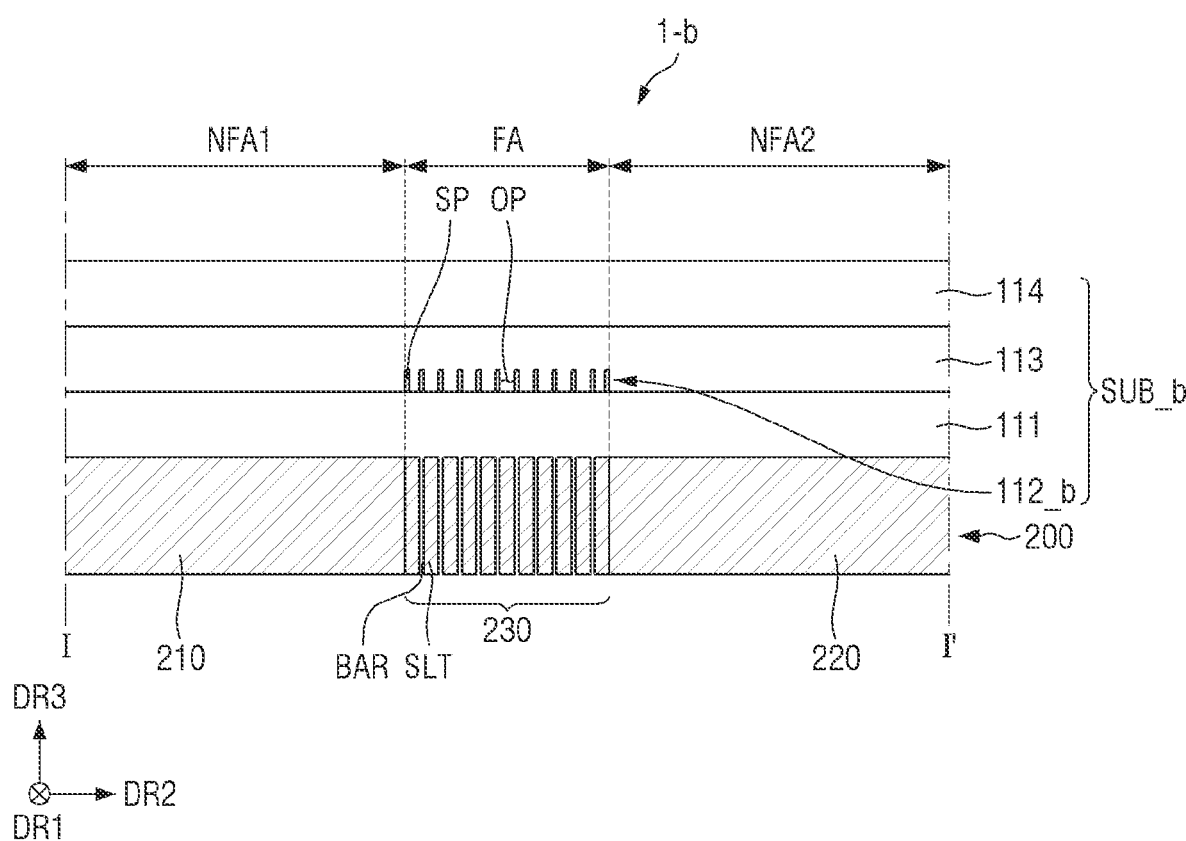
FIG. 16 is a cross-sectional view taken along the line I-I' of FIG. 13.

FIG. 13 is an exploded perspective view of a display device according to another embodiment of the present disclosure. FIG. 14 is a plan view of a reinforcing member according to an embodiment of the present disclosure. FIG. 15 is an enlarged plan view of the part A of FIG. 14. FIG. 16 is a cross-sectional view taken along the line I-I' of FIG. 13.

The embodiment illustrated in FIGS. 13 and 14 may differ from the embodiment illustrated in FIG. 8, in that, unlike the reinforcing member 112 of the substrate SUB, a reinforcing member 112_b of a substrate SUB_b of a display device 1_b may have a mesh pattern in a plan view.

Referring to FIG. 13, the reinforcing member 112_b, like the reinforcing member 112 illustrated in FIG. 8, may be disposed between the first substrate 111 and the barrier layer 113, and may overlap with the folding part FA of the first substrate 111.

Referring to FIG. 14, the reinforcing member 112_b may include a plurality of supporting parts SP, and a plurality of openings OP. The openings OP may be defined by the supporting parts SP, and may all have the same or substantially the same shape and size as each other, but the present disclosure is not limited thereto. As another example, in some embodiments, the openings OP may have different shapes from one another, or may have the same or substantially the same shape as one another, but with different sizes from one another.

The reinforcing member 112_b may have a mesh pattern or a lattice pattern in a plan view, due to the presence of the supporting parts SP and the openings OP.

The supporting part SP may extend in first and second directions DR1 and DR2, which cross (e.g., which intersect with) each other, and may be spaced apart from one another at regular intervals along the first and second directions DR1 and DR2.

For example, the supporting parts SP may extend in the first and second directions DR1 and DR2, and may cross one another to be connected to one another.

Every two adjacent supporting parts SP may be spaced apart from one another by an opening OP therebetween. For example, every two adjacent supporting parts SP in the first direction DR1 and every two adjacent supporting parts SP in the second direction DR2 may be spaced apart from one another by an opening OP interposed therebetween.

The openings OP of the reinforcing member 112_b may have a square shape or a rectangular shape, as viewed from above in the third direction DR3 (e.g., in a plan view), but the present disclosure is not limited thereto. As another example, in some embodiments, the supporting parts SP may cross one another in other various suitable directions, and in a case where the openings OP all have the same or substantially the same shape as each other, the openings OP may have various suitable shapes other than the square shape or the rectangular shape. For example, the openings OP may have a circular shape including a curve.

Referring to FIG. 15, the supporting parts SP of the reinforcing member 112_b may have a width W of about 50 μm to 500 μm.

In more detail, the width W of the supporting parts SP may refer to the width in the first direction DR1 and/or the second direction DR2 of the supporting parts SP.

When the width W of the supporting parts SP is 50 μm or greater, sufficient rigidity to properly support the folding part FA of the display panel 100 may be secured, and when the width W of the supporting parts SP is 500 μm or less, sufficient elasticity to properly fold the display device 1_b may be maintained or substantially maintained. However, the width W of the supporting parts SP is not particularly limited thereto.

A width S of the openings OP of the reinforcing member 112_b may be about 30 μm to 300 μm.

In more detail, the width S of the openings OP of the reinforcing member 112_b may refer to the width in the second direction DR2 of the square shaped or the rectangular shaped openings OP. In other words, the width S of the openings OP may be a distance between every two adjacent supporting parts SP in the second direction DR2, with a corresponding opening OP interposed therebetween.

When the width S of the openings OP of the reinforcing member 112_b is 30 μm or greater, the display panel 100 may be properly supported when the display device 1_b is folded, the stress applied to the display panel 100 when the display device 1_b is folded may be minimized or reduced, and sufficient elasticity to properly fold the display device 1_b may be maintained or substantially maintained. When the width S of the openings OP of the reinforcing member 112_b is 300 μm or less, a height differences with the slits SLT of the metal plate 200 may be effectively alleviated, and sufficient rigidity against external impacts may be secured. However, the width S of the openings OP is not particularly limited thereto.

Referring to FIG. 16, the supporting parts SP and the openings OP of the reinforcing member 112_b may overlap with, and may be in contact (e.g., in direct contact) with, the folding part FA of the first substrate 111. In other words, the supporting parts SP and the openings OP of the reinforcing member 112_b may overlap with the folding part FA of the first substrate 111, but may not overlap with the first and second non-folding parts NFA1 and NFA2 of the first substrate 111, and may be disposed on the folding part FA of the first substrate 111.

The barrier layer 113 may be disposed on the first substrate 111, with the reinforcing member 112_b disposed therein.

In more detail, the barrier layer 113 may cover all of the supporting parts SP of the reinforcing member 112_b, and may fill the openings OP of the reinforcing member 112_b at (e.g., in or on) the overlapping area with the folding part FA of the first substrate 111. In other words, the barrier layer 113 may fill the openings OP, which are spaces between the supporting parts SP, while being in contact with the top surface and the sides of each of the supporting parts SP.

As the reinforcing member 112_b, which is disposed on the folding part FA of the first substrate 111, includes the plurality of openings OP, the display device 1_b may be flexible enough to be properly folded, due to the presence of the openings OP. As a result, the impact resistance and the flexibility of the folding part FA of the display device 1_b may both be improved.

Figure 17:
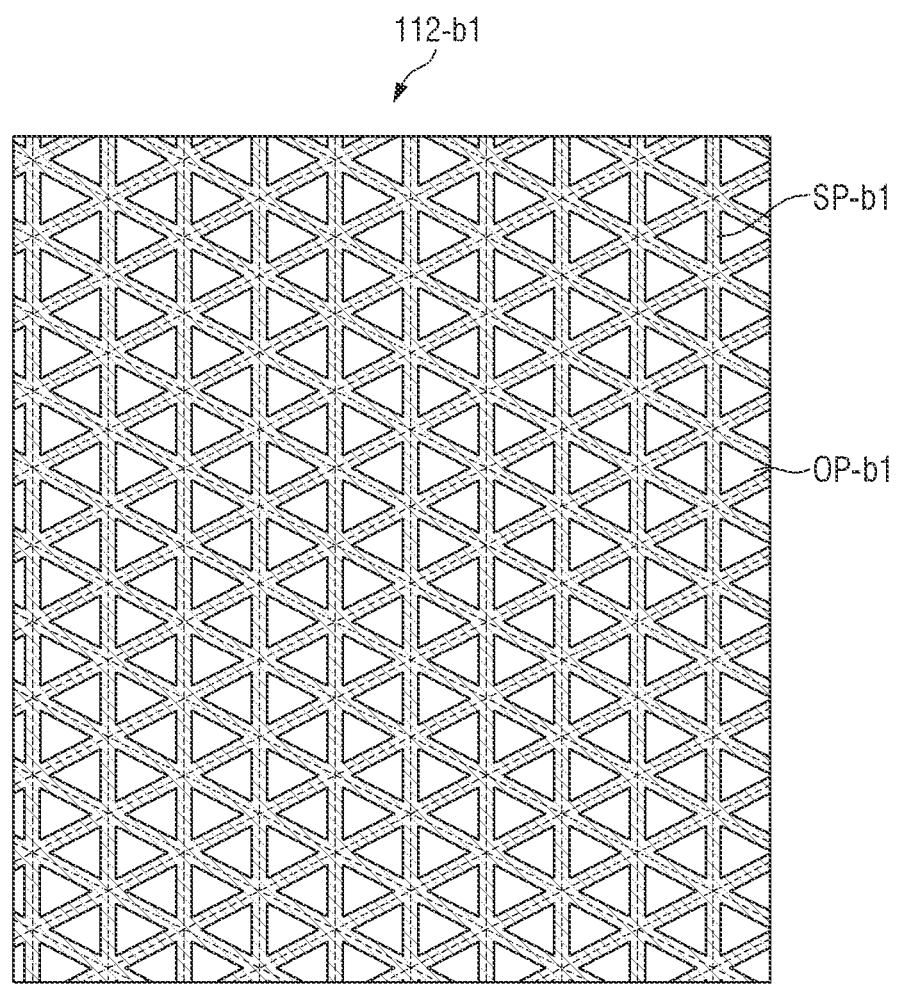
FIGS. 17 and 18 are plan views of reinforcing members according to other embodiments of the present disclosure.
Figure 18:
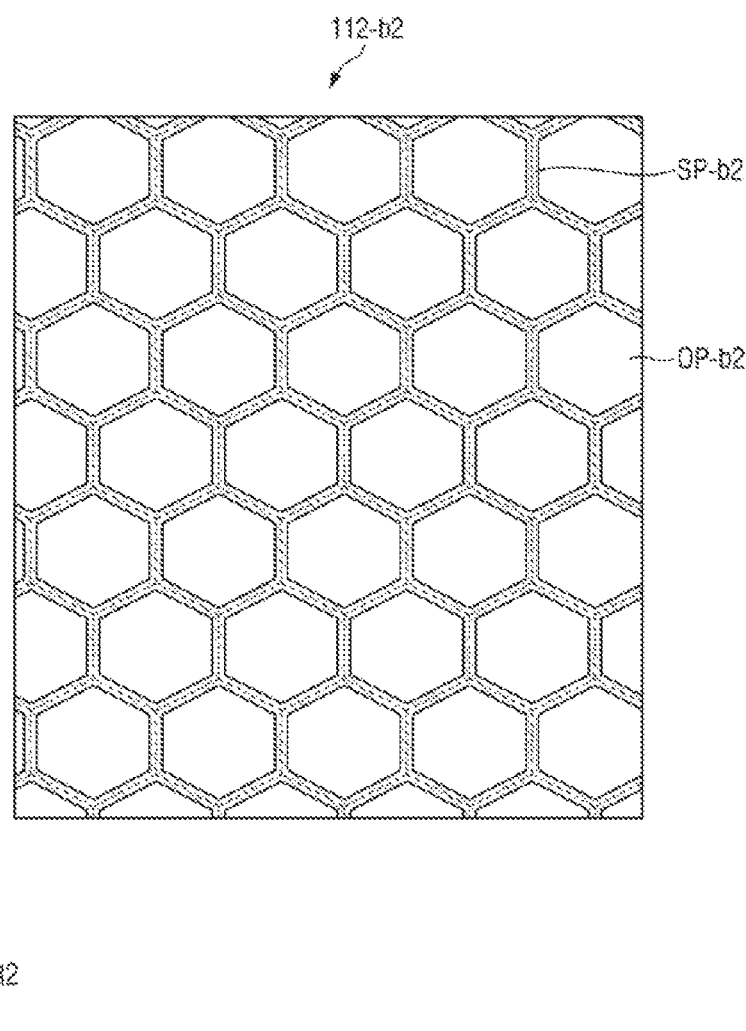

FIGS. 17 and 18 are plan views of reinforcing members according to other embodiments of the present disclosure.

The embodiment illustrated in FIG. 17 may differ from the embodiment illustrated in FIG. 14, in that, unlike the reinforcing member 112_b, a reinforcing member 112_b1 includes triangular shaped openings OP_b1.

Referring to FIG. 17, the plurality of openings OP_b1 having a triangular shape may be defined by a plurality of supporting parts SP_b1, and may be arranged at regular intervals along the first and second directions DR1 and DR2 to form a mesh pattern in a plan view.

In more detail, every two adjacent openings OP_b1 in the first direction DR1 may be arranged with a supporting part SP interposed therebetween, such that their opposing sides may be parallel to or substantially parallel to each other. Similarly, every two adjacent openings OP_b1 in the second direction DR2 may also be arranged with a supporting part SP interposed therebetween, such that their opposing sides may be parallel to or substantially parallel to each other, or their opposing apexes may face each other. However, the layout of the openings OP_b1 of the reinforcing member 112_b1 is not particularly limited thereto. The openings OP_b1 are illustrated as having an equilateral triangular shape, but the present disclosure is not limited thereto.

The embodiment illustrated in FIG. 18 may differ from the embodiment illustrated in FIG. 14, in that, unlike the reinforcing member 112_b, a reinforcing member 112_b2 includes hexagonal shaped openings OP_b2.

Referring to FIG. 18, the plurality of openings OP_b2 having a hexagonal shape may be defined by a plurality of supporting parts SP_b2, and may be arranged with the supporting parts SP_b2 interposed therebetween to form a honeycomb pattern in a plan view.

In more detail, the openings OP_b2 of the reinforcing member 112_b2 may be arranged along the second direction DR2 to define a plurality of first opening rows, and the first opening rows may be arranged along a first direction DR1. Two openings OP_b2 from among two adjacent first opening rows may be arranged in a staggered manner with respect to each other. However, the layout of the openings OP_b2 is not particularly limited thereto. The openings OP_b2 are illustrated as having a hexagonal shape, but the present disclosure is not limited thereto.

Figure 19:
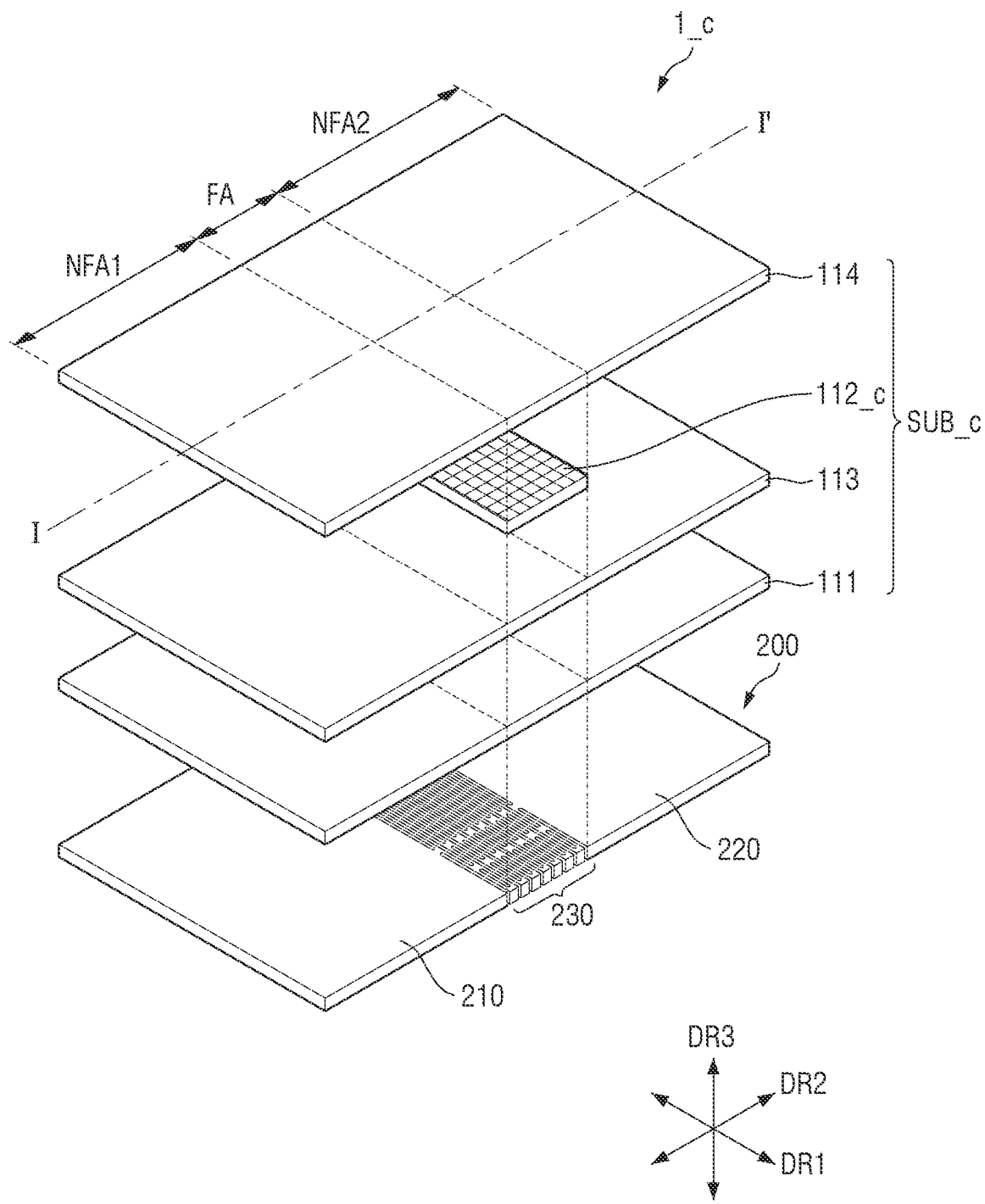
FIG. 19 is an exploded perspective view of a display device according to another embodiment of the present disclosure.
Figure 20:
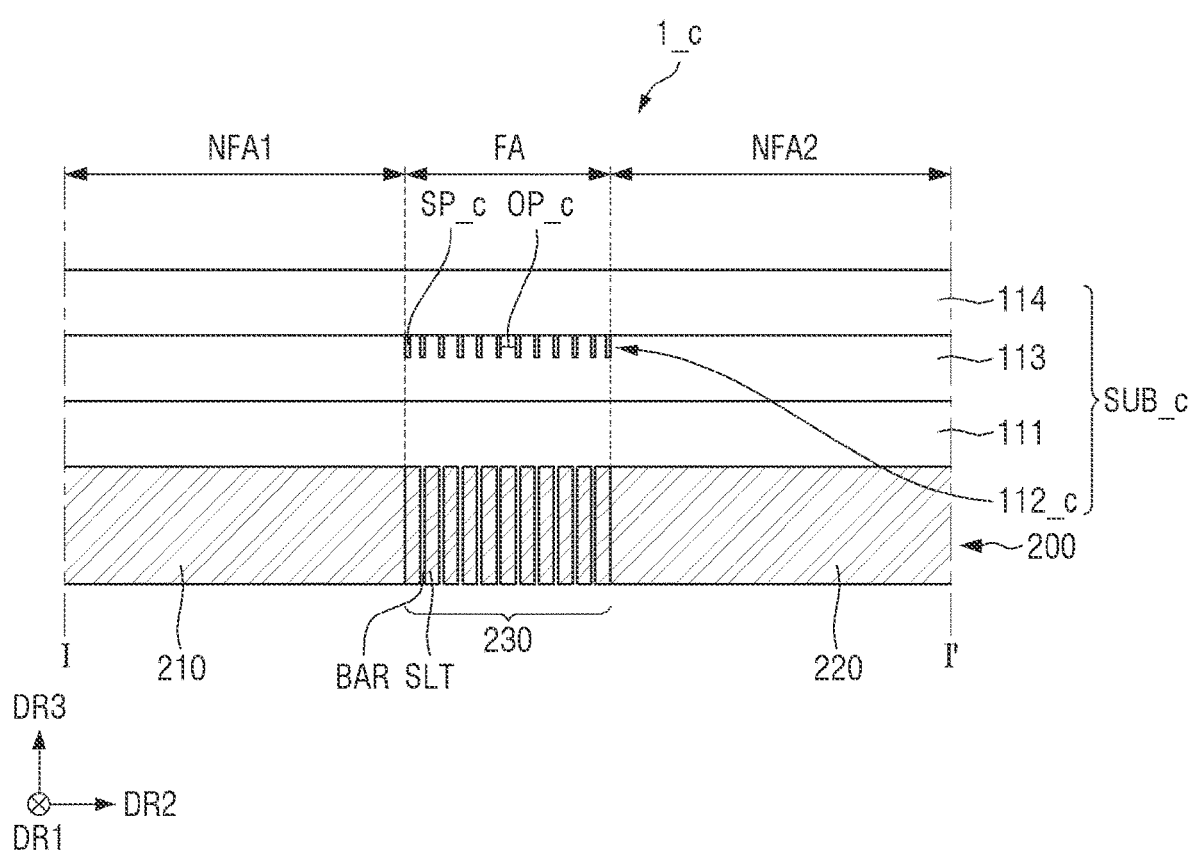
FIG. 20 is a cross-sectional view taken along the line I-I' of FIG. 19.

FIG. 19 is an exploded perspective view of a display device according to another embodiment of the present disclosure. FIG. 20 is a cross-sectional view taken along the line I-I' of FIG. 19.

The embodiment illustrated in FIGS. 19 and 20 may differ from the embodiment illustrated in FIG. 13, in that, unlike the reinforcing member 112_b, a reinforcing member 112_c of a substrate SUB_c of a display device 1_c is disposed between the barrier layer 113 and the second substrate 114.

Referring to FIGS. 19 and 20, the reinforcing member 112_c, like the reinforcing member 112_b of FIG. 13, may include a plurality of supporting parts SP_c, and a plurality of openings OP_c. The openings OP_c may have a triangular shape or a hexagonal shape.

In more detail, the supporting parts SP_c and the openings OP_c of the reinforcing member 112_c may overlap with the folding part FA of the second substrate 114, and may be in contact (e.g., in direct contact) with the rear side of the second substrate 114. In other words, the supporting parts SP_c and the openings OP_c of the reinforcing member 112_c may overlap with the folding part FA of the second substrate 114, but may not overlap with first and second non-folding parts NFA1 and NFA2 of the second substrate 114, and may be disposed on the rear side of the folding part FA of the second substrate 114.

Also, the barrier layer 113 may be in contact with the sides and the rear side of each of the supporting parts SP_c of the reinforcing member 112_c at (e.g., in or on) an overlapping area with the folding part FA of the second substrate 114, and may fill the openings OP_c of the reinforcing member 112_c.

Figure 21:
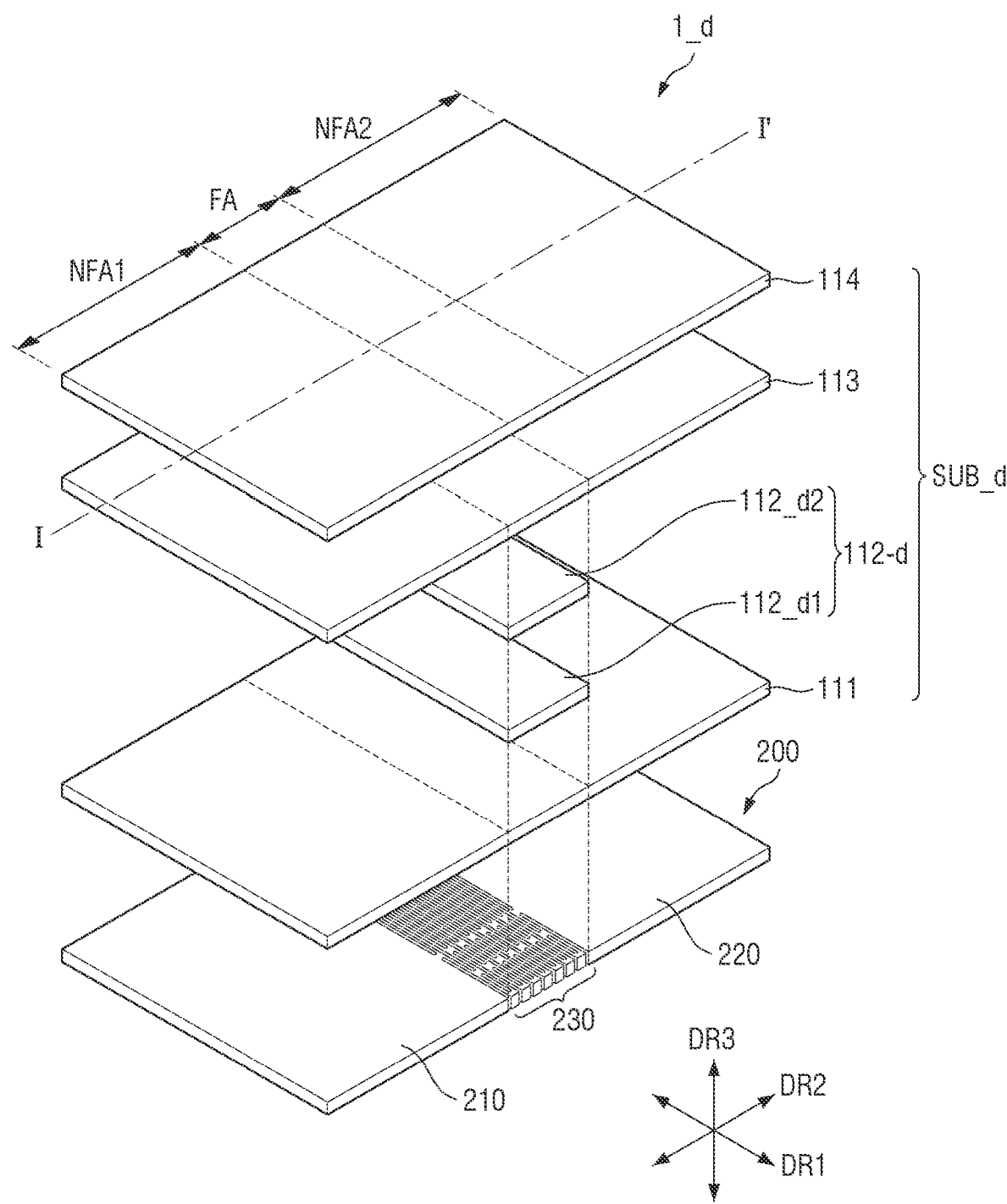
FIG. 21 is an exploded perspective view of a display device according to another embodiment of the present disclosure.
Figure 22:
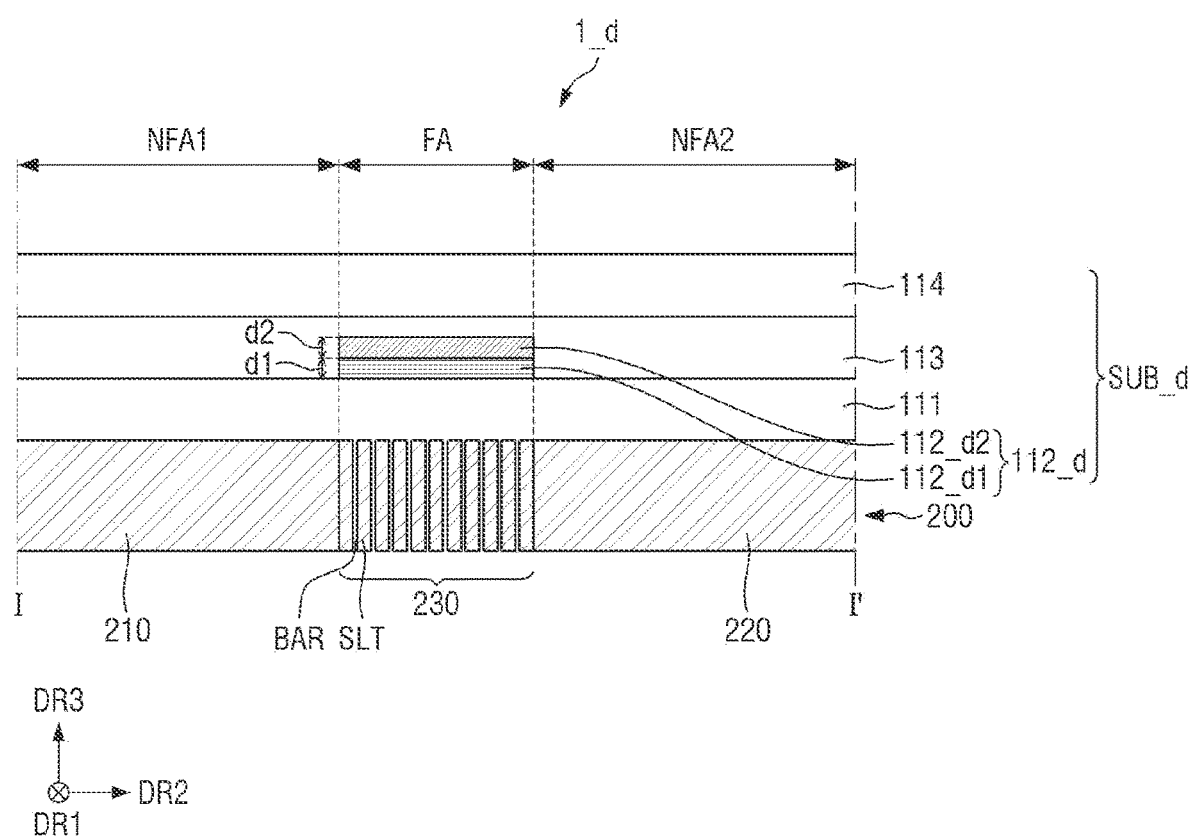
FIG. 22 is a cross-sectional view taken along the line I-I' of FIG. 21.

FIG. 21 is an exploded perspective view of a display device according to another embodiment of the present disclosure. FIG. 22 is a cross-sectional view taken along the line I-I' of FIG. 21.

The embodiment illustrated in FIGS. 21 and 22 may differ from the embodiment illustrated FIG. 8, in that, unlike the reinforcing member 112 of FIG. 8, a substrate SUB_d may include a reinforcing member 112_d that includes two layers between the first substrate 111 and the barrier layer 113.

In more detail, the reinforcing member 112_d including first and second reinforcing members 112_d1 and 112_d2 may be disposed at (e.g., in or on) the overlapping area of the folding part FA of the first substrate 111 and the barrier layer 113.

In other words, the bottom surface of the first reinforcing member 112_d1 may be in contact (e.g., in direct contact) with the folding part FA of the first substrate FA, the top surface of the second reinforcing member 112_d2 may be in contact (e.g., in direct contact) with the barrier layer 113 at (e.g., in or on) the overlapping area of the folding part FA of the first substrate 111 and the barrier layer 113, and the bottom surface of the second reinforcing member 112_2d may be in contact with the top surface of the first reinforcing member 112_d1, which are disposed at (e.g., in or on) the overlapping area of the folding part FA of the first substrate 111 and the barrier layer 113.

Accordingly, the first and second reinforcing members 112_d1 and 112_d2 of the reinforcing member 112_d may be completely covered (e.g., may be encapsulated) by the first substrate 111 and the barrier layer 113.

The first and second reinforcing members 112_d1 and 112_d2 may include a metallic material, such as Cu, Mo, or Al, or an inorganic material, such as silicon nitride, silicon oxide, or silicon oxynitride, but the present disclosure is not limited thereto. In some embodiments, the first and second reinforcing members 112_d1 and 112_d2 may be formed of different materials from each other. For example, the first reinforcing member 112_d1 may include Cu, Mo, or Al, and the second reinforcing member 112_d2 may include a single layer or multilayers of silicon nitride, silicon oxide, or silicon oxynitride.

A thickness d1 in the third direction DR3 of the first reinforcing member 112_d1 may be the same or substantially the same as a thickness d2 in the third direction DR3 of the second reinforcing member 112_d2, but the present disclosure is not limited thereto. As another example, in some embodiments, the thickness d1 in the third direction DR3 of the first reinforcing member 112_d1 may be different from the thickness d2 in the third direction DR3 of the second reinforcing member 112_d2.

In a case where the reinforcing member 112_d, which is disposed on the folding part FA of the first substrate 111, includes multiple layers, the modulus value or rigidity of the reinforcing member 112_d may be controlled by diversifying the material and/or the pattern of each layer of the reinforcing member 112_d.

Figure 23:
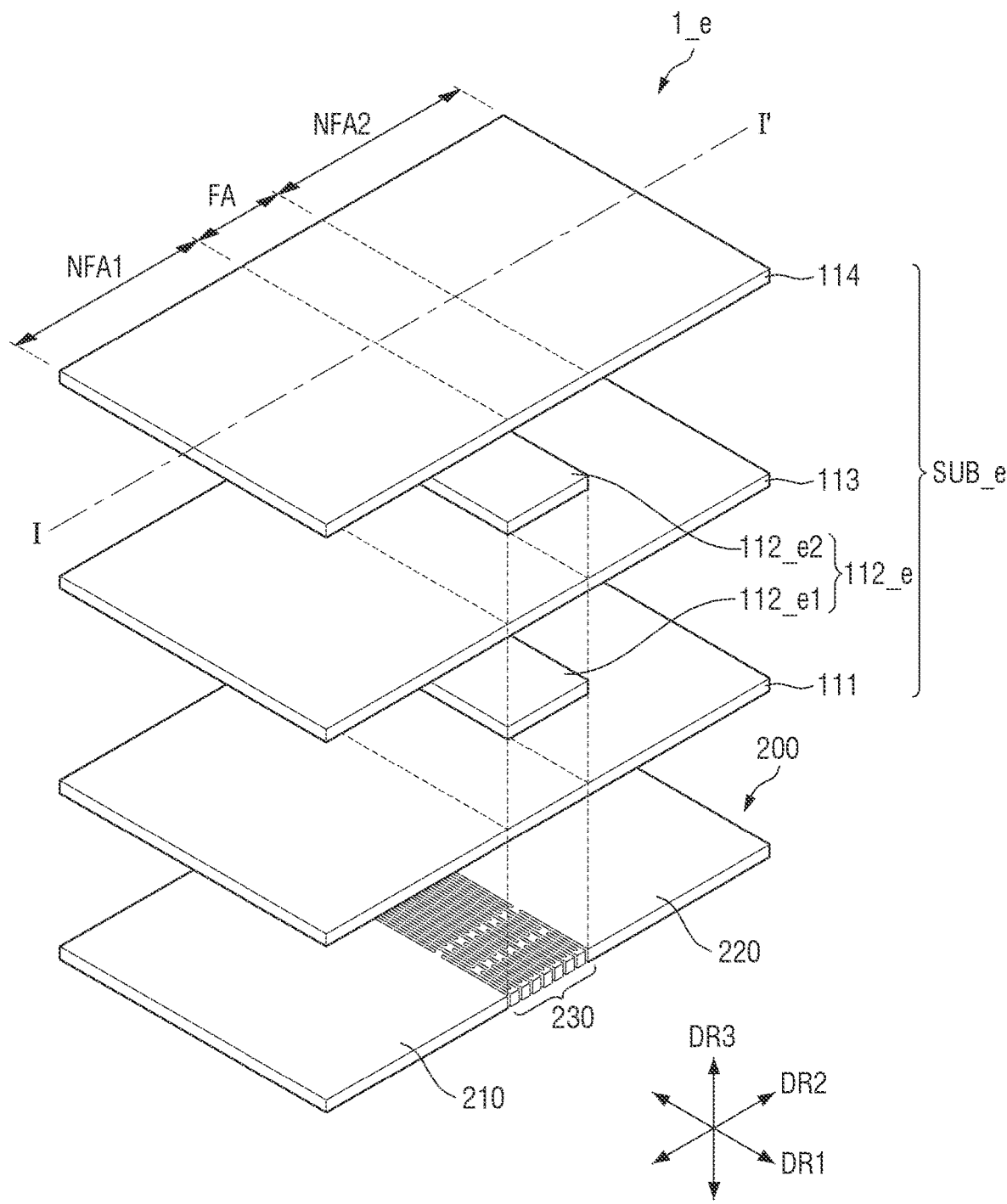
FIG. 23 is an exploded perspective view of a display device according to another embodiment of the present disclosure.
Figure 24:
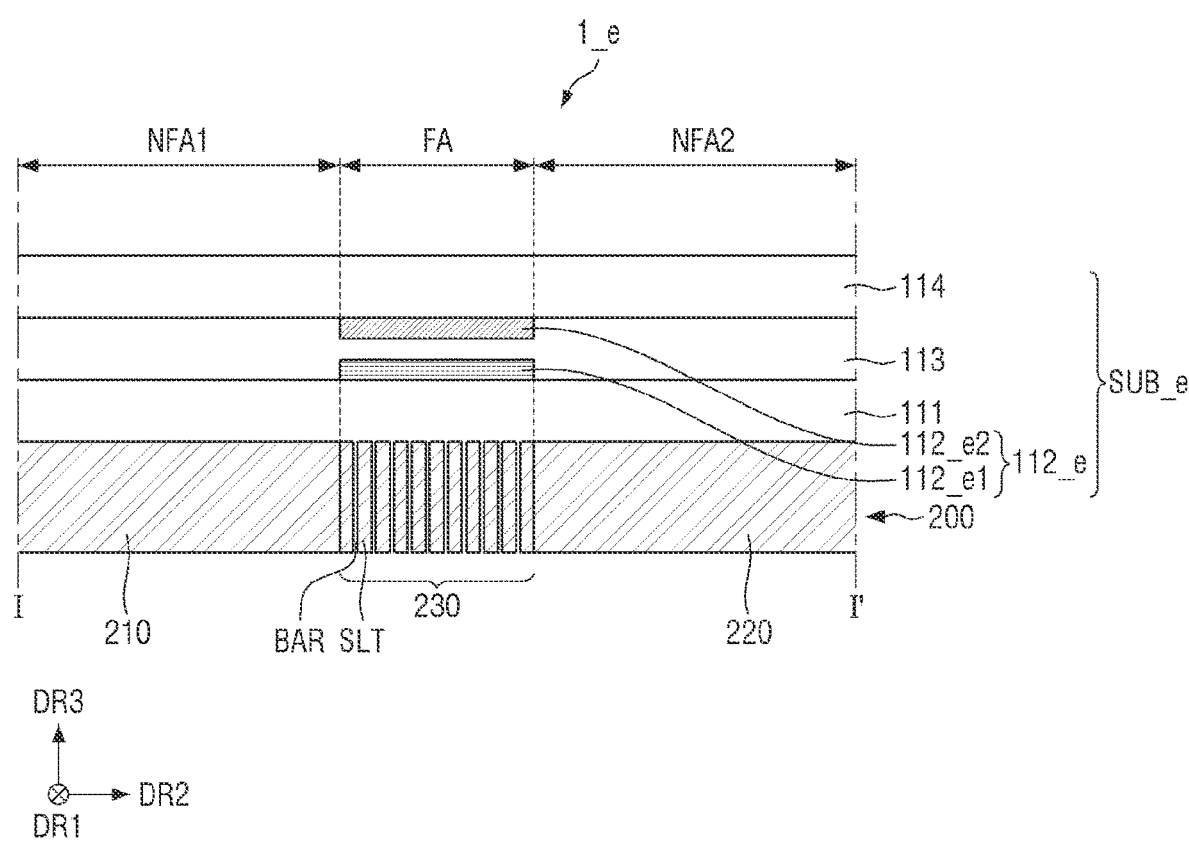
FIG. 24 is a cross-sectional view taken along the line I-I' of FIG. 23.

FIG. 23 is an exploded perspective view of a display device according to another embodiment of the present disclosure. FIG. 24 is a cross-sectional view taken along the line I-I' of FIG. 23.

The embodiment illustrated in FIGS. 23 and 24 may differ from the embodiment illustrated FIGS. 21 and 22, in that, unlike in the substrate SUB_d, in a substrate SUB_e, a first reinforcing member 112_e1 is disposed between the first substrate 111 and the barrier layer 113, and a second reinforcing member 112_e2 is disposed between the barrier layer 113 and the second substrate 114.

In more detail, referring to FIGS. 23 and 24, the first and second reinforcing members 112_e1 and 112_e2 may be spaced apart from each other in the third direction DR3, with the barrier layer 113 interposed therebetween.

In other words, the first reinforcing member 112_e1 may be disposed on the folding part FA of the first substrate 111, and the second reinforcing member 112_e2 may be disposed on the folding part FA of the second substrate 114. The top surface of the first reinforcing member 112_e1 and the bottom surface of the second reinforcing member 112_e2 may be in contact with the barrier layer 113.

Accordingly, the first reinforcing member 112_e1 may be completely covered (e.g., encapsulated) by the first substrate 111 and the barrier layer 113, and the second reinforcing member 112_e2 may be completely covered (e.g., encapsulated) by the second substrate 114 and the barrier layer 113.

Figure 25:
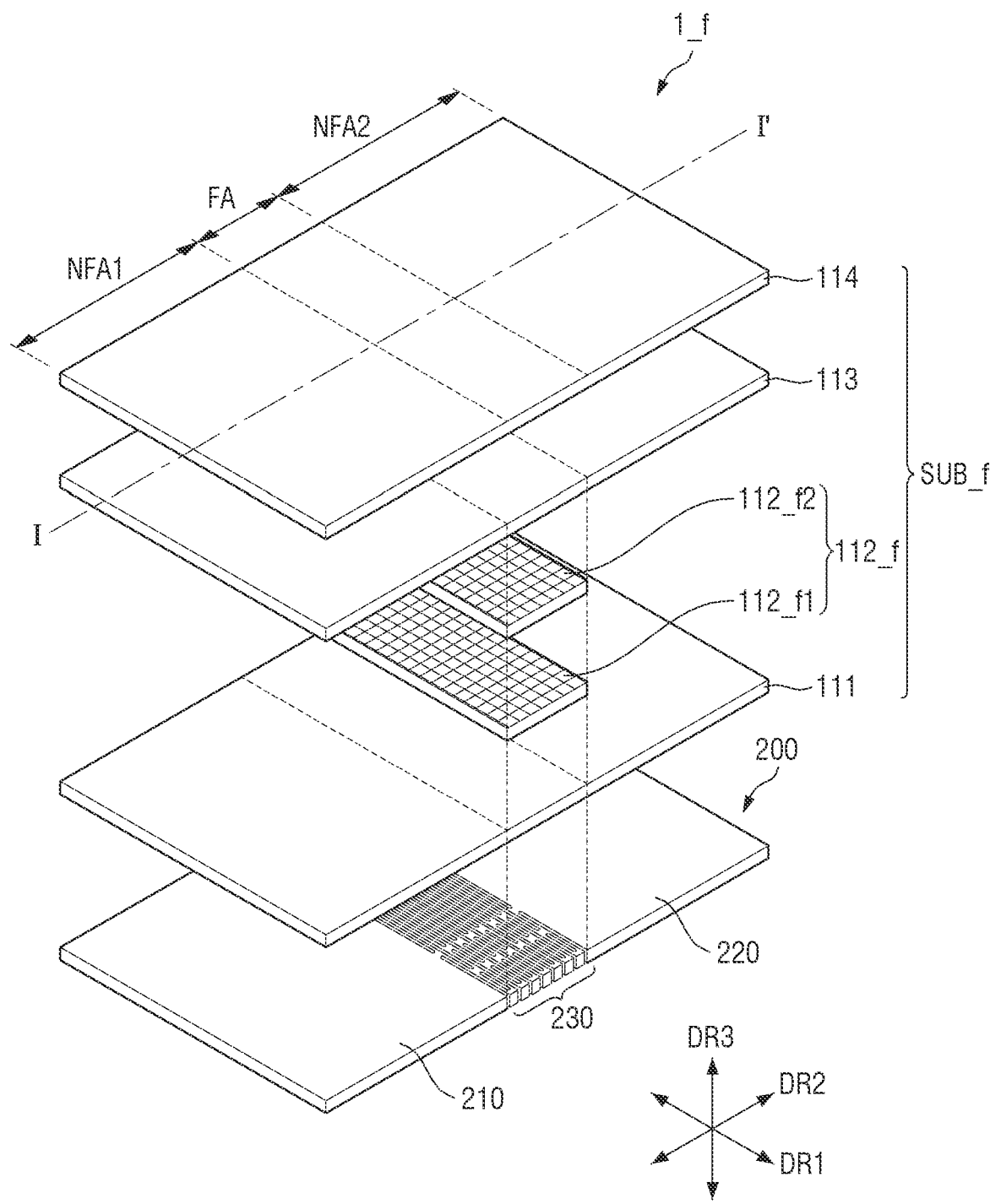
FIG. 25 is an exploded perspective view of a display device according to another embodiment of the present disclosure.
Figure 26:
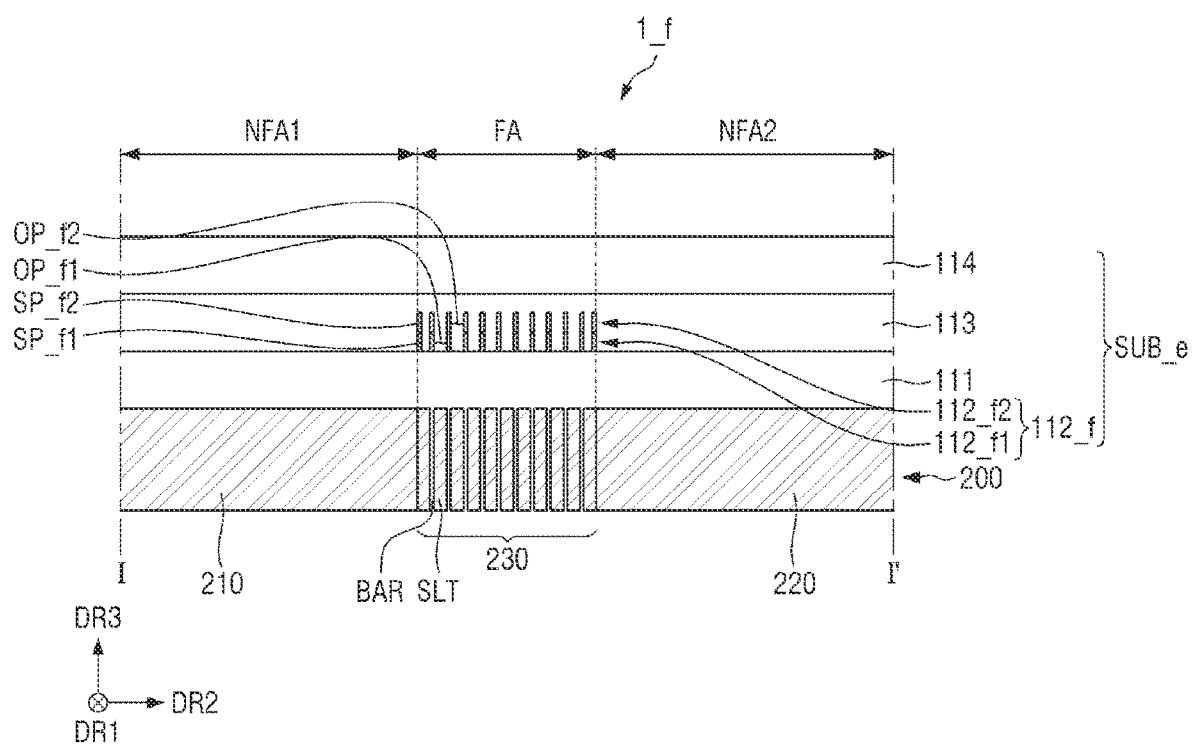
FIG. 26 is a cross-sectional view taken along the line I-I' of FIG. 25.

FIG. 25 is an exploded perspective view of a display device according to another embodiment of the present disclosure. FIG. 26 is a cross-sectional view taken along the line I-I' of FIG. 25.

The embodiment illustrated in FIGS. 25 and 26 may differ from the embodiment illustrated in FIGS. 21 and 22, in that in FIGS. 21 and 22, each of first and second reinforcing members 112_f1 and 112_f2 includes a plurality of supporting parts and a plurality of openings, and thus, has a mesh pattern.

Referring to FIGS. 25 and 26, the first reinforcing member 112_f1 may include a plurality of supporting parts SP_f1, and a plurality of openings OP_f1 defined by the supporting parts SP_f1. The second reinforcing member 112_f2 may include a plurality of supporting parts SP_f2, and a plurality of openings OP_f2 defined by the supporting parts SP_f2.

The supporting parts SP_f1 of the first reinforcing member 112_f1 may be in contact with, and may overlap with, the supporting parts SP_f2 of the second reinforcing member 112_f2 in the third direction DR3, and the openings OP_f1 of the first reinforcing member 112_f1 may overlap with the openings OP_f2 of the second reinforcing member 112_f2 in the third direction DR3

The barrier layer 113 may fill the openings OP_f1 of the first reinforcing member 112_f1 and the openings OP_f2 of the second reinforcing member 112_f2, and may be in contact with, and may cover, the supporting parts SP_f1 of the first reinforcing member 112_f1 and the supporting parts SP_f2 of the second reinforcing member 112_f2.

The shape and width of the openings OP_f1 of the first reinforcing member 112_f1 are illustrated as being the same or substantially the same as the shape and width of the openings OP_f2 of the second reinforcing member 112_f2, but the present disclosure is not limited thereto. As another example, in some embodiments, the shape and width of the openings OP_f1 of the first reinforcing member 112_f1 may be different from the shape and width of the openings OP_f2 of the second reinforcing member 112_f2. For example, the openings OP_f1 of the first reinforcing member 112_f1 may have the same or substantially the same shape as that of the openings OP illustrated in FIG. 14, and the openings OP_f2 of the second reinforcing member 112_f2 may have the same or substantially the same shape as that of the openings OP_b1 illustrated in FIG. 17 or the openings OP_b2 illustrated in FIG. 18. However, the present disclosure is not limited thereto, and the openings OP_f1 of the first reinforcing member 112_f1 and the openings OP_f2 of the second reinforcing member 112_f2 may have other various suitable shapes.

The width of the supporting parts SP_f1 of the first reinforcing member 112_f1 may be the same or substantially the same as the width of the supporting parts SP_f2 of the second reinforcing member 112_f2, but the present disclosure is not limited thereto. As another example, in some embodiments, the width of the supporting parts SP_f1 of the first reinforcing member 112_f1 may be different from the width of the supporting parts SP_f2 of the second reinforcing member 112_f2.

In a case where the width of the supporting parts SP_f1 of the first reinforcing member 112_f1 is different from the width of the supporting parts SP_f2 of the second reinforcing member 112_f2, the supporting parts SP_f1 of the first reinforcing member 112_f1 may only partially overlap with the supporting parts SP_f2 of the second reinforcing member 112_f2.

For example, in a case where the width of the supporting parts SP_f1 of the first reinforcing member 112_f1 is greater than the width of the supporting parts SP_f2 of the second reinforcing member 112_f2, the supporting parts SP_f2 of the second reinforcing member 112_f2, which are disposed on the supporting parts SP_f1 of the first reinforcing member 112_f1, may expose parts of the top surfaces of the supporting parts SP_f1 of the first reinforcing member 112_f1. As another example, in a case where the width of the supporting parts SP_f1 of the first reinforcing member 112_f1 is less than the width of the supporting parts SP_f2 of the second reinforcing member 112_f2, the supporting parts SP_f2 of the second reinforcing member 112_f2 may cover the entire top surfaces of the supporting parts SP_f1 of the first reinforcing member 112_f1, and may overlap with the openings OP_f1 of the first reinforcing member 112_f1 in the third direction DR3.

Figure 27:
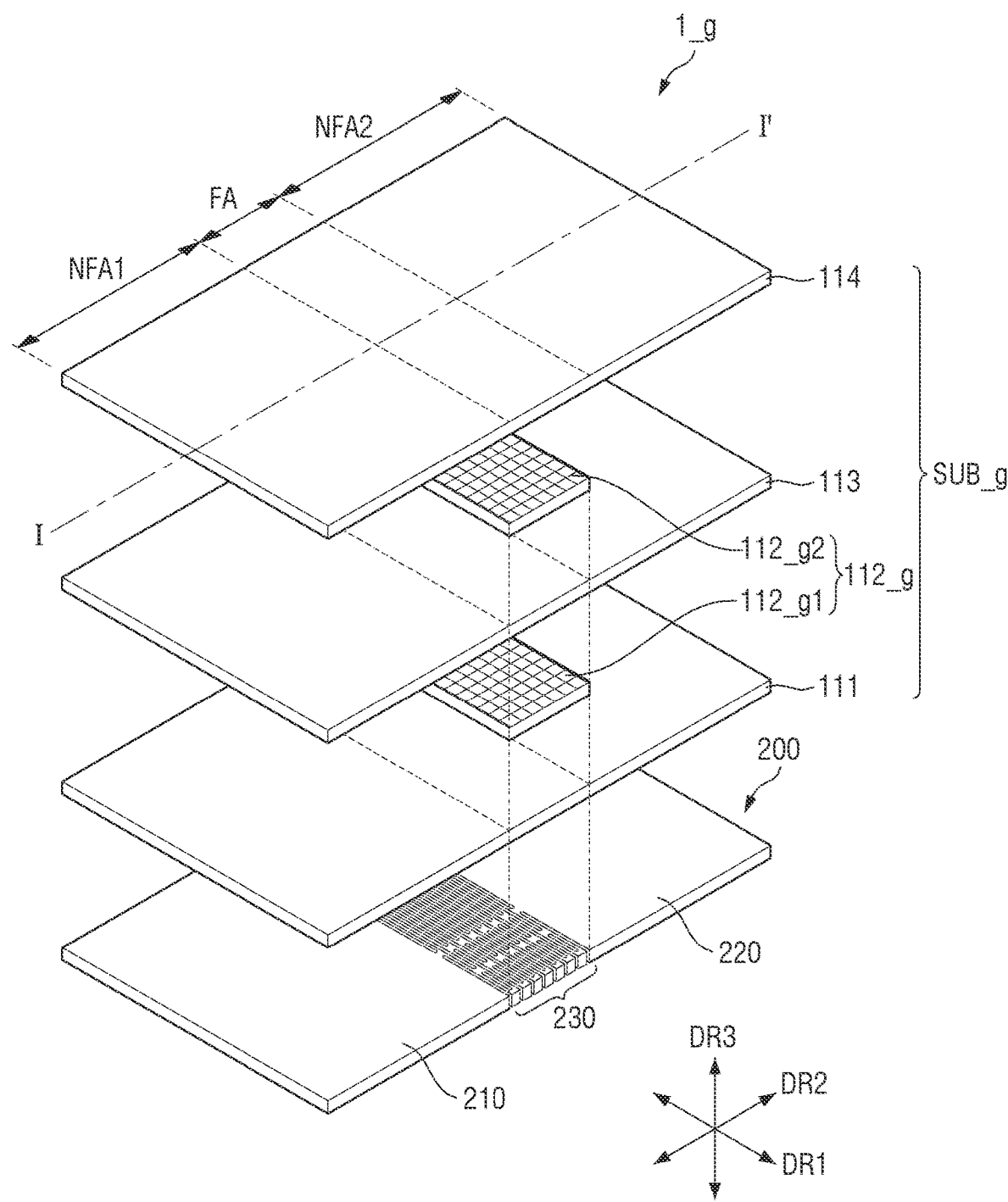
FIG. 27 is an exploded perspective view of a display device according to another embodiment of the present disclosure.
Figure 28:
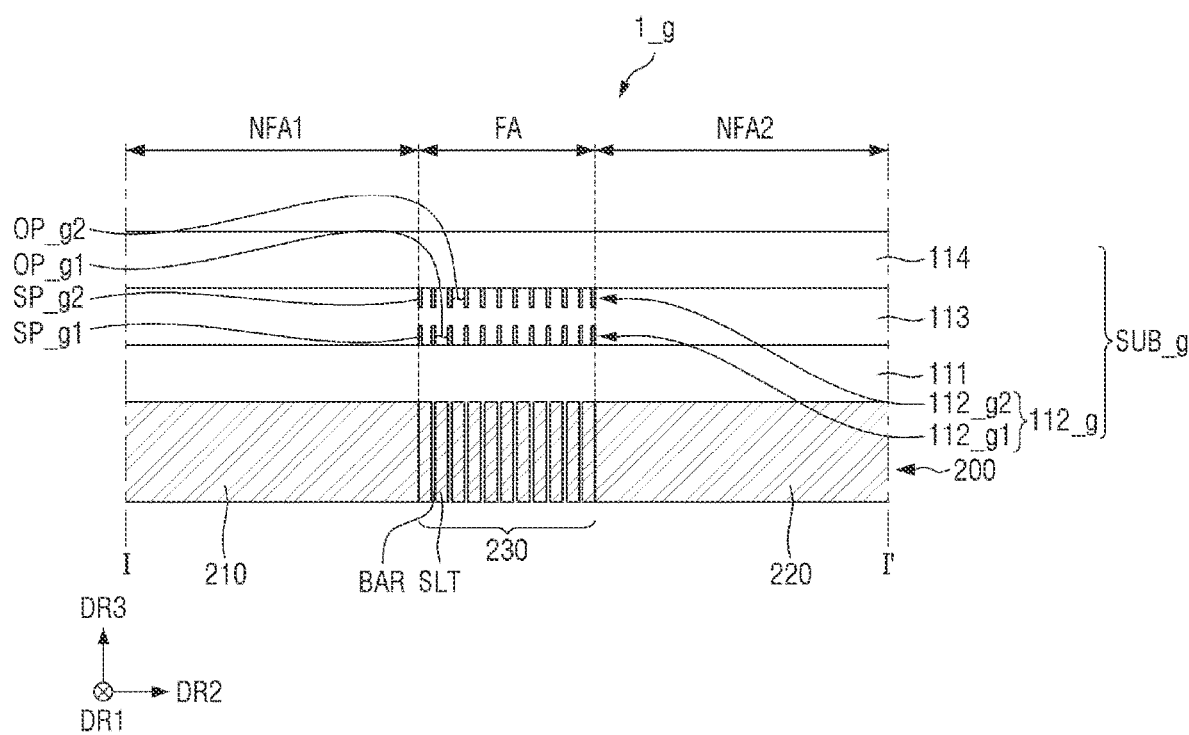
FIG. 28 is a cross-sectional view taken along the line I-I' of FIG. 27.

FIG. 27 is an exploded perspective view of a display device according to another embodiment of the present disclosure. FIG. 28 is a cross-sectional view taken along the line I-I' of FIG. 27.

The embodiment illustrated in FIGS. 27 and 28 may differ from the embodiment illustrated in FIGS. 25 and 26, in that a first reinforcing member 112_g1 is disposed between the first substrate 111 and the barrier layer 113, and a second reinforcing member 112_g2 is disposed between the barrier layer 113 and the second substrate 114.

Referring to FIGS. 27 and 28, the first reinforcing member 112_g1 may include a plurality of supporting parts SP_g1, and a plurality of openings OP_g1 defined by the supporting parts SP_g1. The second reinforcing member 112_g2 may include a plurality of supporting parts SP_g2, and a plurality of openings OP_g2 defined by the supporting parts SP_g2. The first and second reinforcing members 112_g1 and 112_g2 may be spaced apart from each other in the third direction DR3, with the barrier layer 113 interposed therebetween.

In other words, the first reinforcing member 112_g1 may be disposed on the folding part FA of the first substrate 111, the second reinforcing member 112_g2 may be disposed on the folding part FA of the second substrate 114, and the top surface of the first reinforcing member 112_g1 and the bottom surface of the second reinforcing member 112_g2 may be in contact with the barrier layer 113.

The barrier layer 113 may fill the openings OP_g1 of the first reinforcing member 112_g1 and the openings OP_g2 of the second reinforcing member 112_g2, and may be in contact with, and may cover, the supporting parts SP_g1 of the first reinforcing member 112_g1 and the supporting parts SP_g2 of the second reinforcing member 112_g2.

Figure 29:
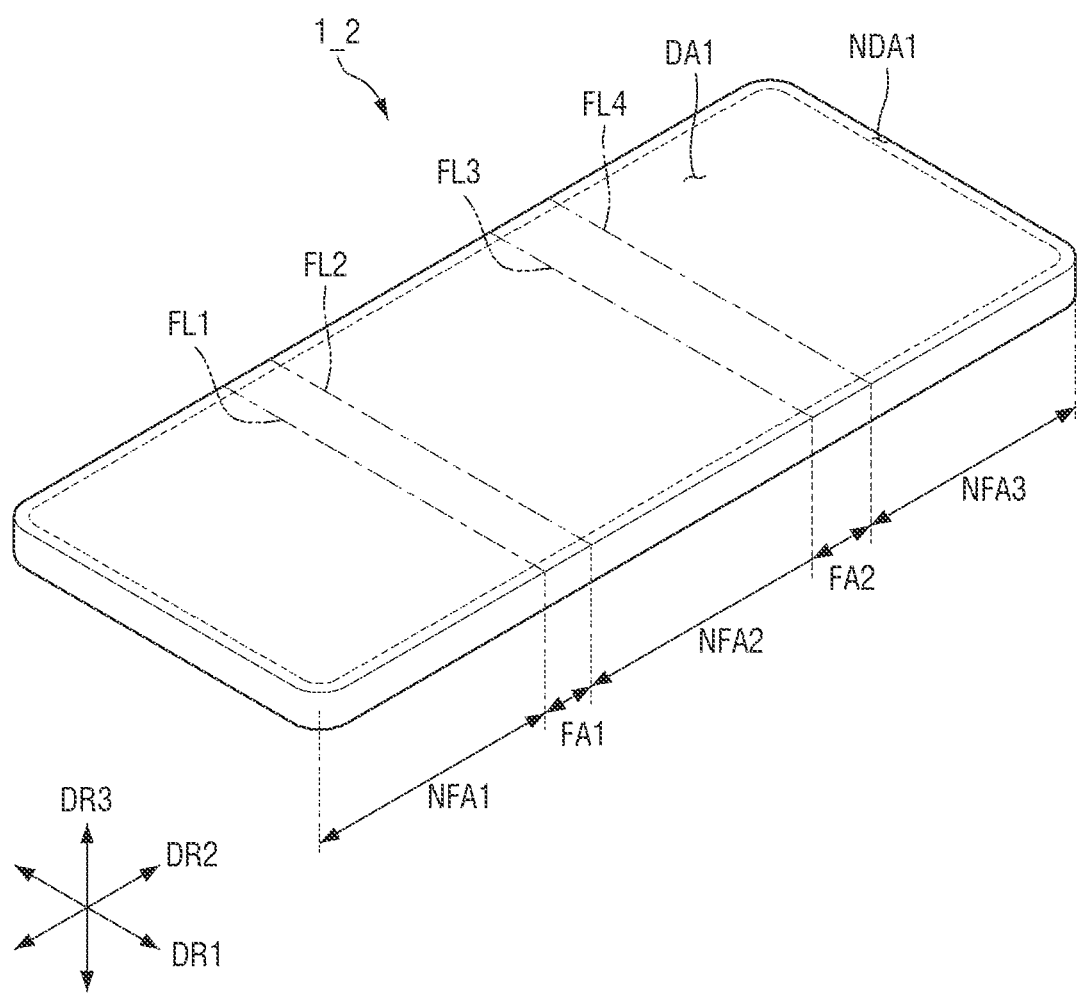
FIG. 29 is a perspective view of a display device according to another embodiment of the present disclosure.
Figure 30:
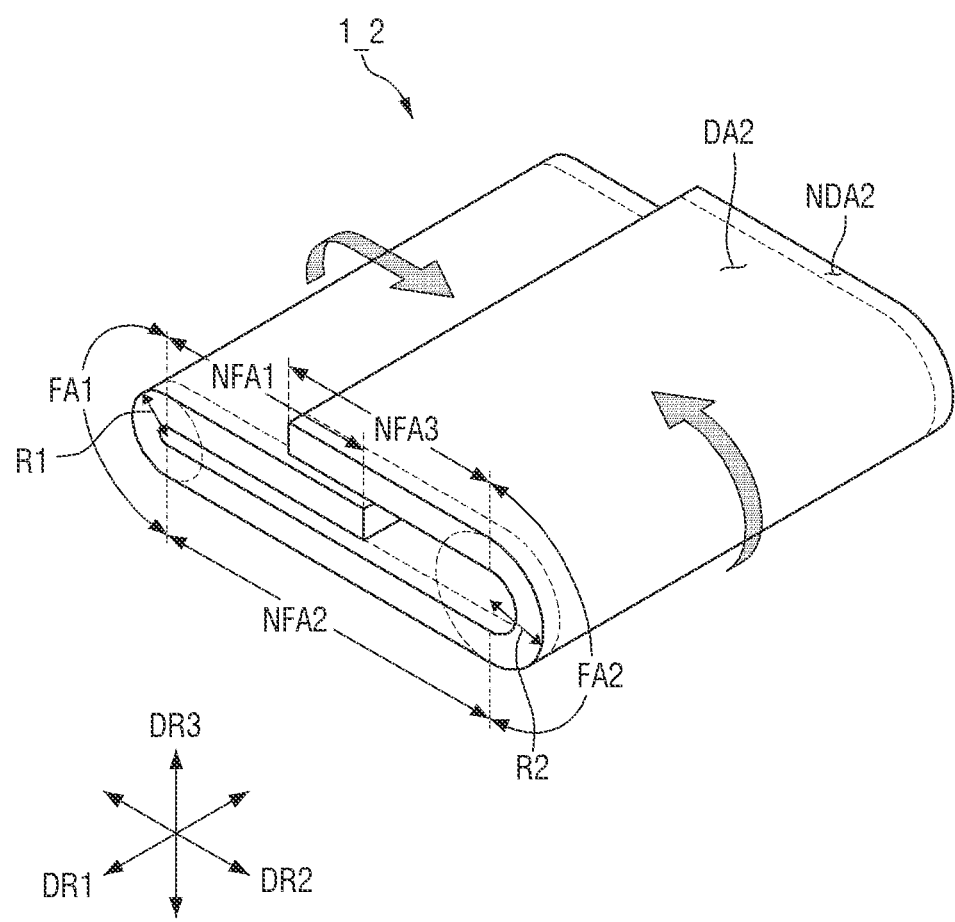
FIGS. 30 and 31 are perspective views illustrating folding operations of the display device of FIG. 29.
Figure 31:
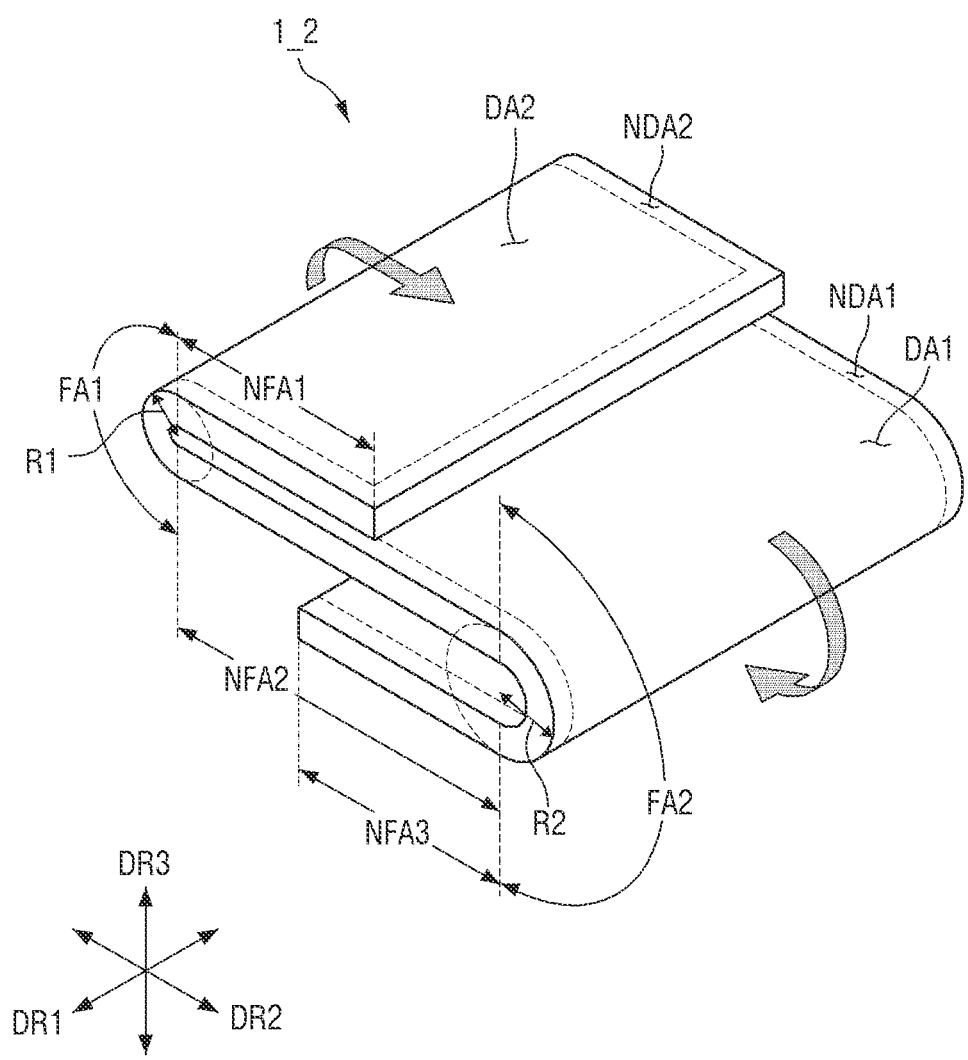

FIG. 29 is a perspective view of a display device according to another embodiment of the present disclosure. FIGS. 30 and 31 are perspective views illustrating folding operations of the display device 29.

Referring to FIG. 29, unlike the display device 1, a display device 1_2 may further include a second folding part FA2 and a third non-folding part NFA3.

The third non-folding part NFA3 may be part of the display device 1_2 that is not folded, and is constantly flat or substantially flat. The third non-folding part NFA3, which is part of the display device 1_2, may be disposed on a side of the display device 1_2 in the second direction DR2. In more detail, the third non-folding part NFA3 may be disposed on a side of a second non-folding part NFA2 in the second direction DR2.

The second folding part FA2 may be a foldable part of the display device 1_2. The second folding part FA2 may be disposed between the second and third non-folding parts NFA2 and NFA3. In other words, the third non-folding part NFA3 may be disposed on one side of the second folding part FA2 in the second direction DR2, and the second non-folding part NFA2 may be disposed on another side of the second folding part FA2 in the second direction DR2.

The second folding part FA2 may be defined by third and fourth lines FL3 and FL4. The third and fourth folding lines FL3 and FL4 may be where the second folding part FA2 is folded. The third folding line FL3 may be a boundary between the second non-folding part NFA2 and the second folding part FA2, and the fourth folding line FL4 may be a boundary between the third non-folding part NFA3 and the second folding part FA2. The third and fourth folding lines FL3 and FL4 may extend in the first direction DR1, but the present disclosure is not limited thereto.

As the display device 1_2 includes the second folding part FA2 and the third non-folding part NFA3, the display device 1_2 may be a multi-foldable display device that may be folded at multiple locations.

When the first folding part FA1 and the second folding part FA2 are not folded, the display device 1_2 may maintain or substantially maintain a state (e.g., a first state) of being unfolded, as illustrated in FIG. 29. When at least one of the first and second folding parts FA1 and FA2 is folded, the display device 1_2 may maintain or substantially maintain a state (e.g., a second state) of being folded, as illustrated in FIGS. 30 and 31. The display device 1_2 may be folded in the second direction DR2 along the first and second folding lines FL1 and FL2 and the third and fourth folding lines FL3 and FL4, and thus, may be switched from the first state to the second state.

A width, in the second direction DR2, of the second folding part FA2 may be greater than a width, in the second direction DR2, of the first folding part FA1. Accordingly, as illustrated in FIGS. 30 and 31, when the display device 1_2 is bent, a curvature radius R1 of the first folding part FA1 may be less than a curvature radius R2 of the second folding part FA2.

The display device 1_2 may be folded inwards, as illustrated in FIG. 30, such that parts of a first display area DA1 that overlap with the first and third non-folding parts NFA1 when the display device 1_2 is in the second state may face part of the first display area DA1 that overlaps with the second non-folding part NFA2 when the display device 1_2 is in the second state, but the present disclosure is not limited thereto. As another example, the display device 1 may be folded outwards, such that parts of a second display area DA2 that overlap with the first and third non-folding parts NFA1 and NFA3 may face part of the second display area DA2 that overlaps with the second non-folding part NFA2. As another example, as illustrated in FIG. 31, one of the first and third non-folding parts NFA1 and NFA3 may be folded inwards, and another non-folding part may be folded outwards.

Figure 32:
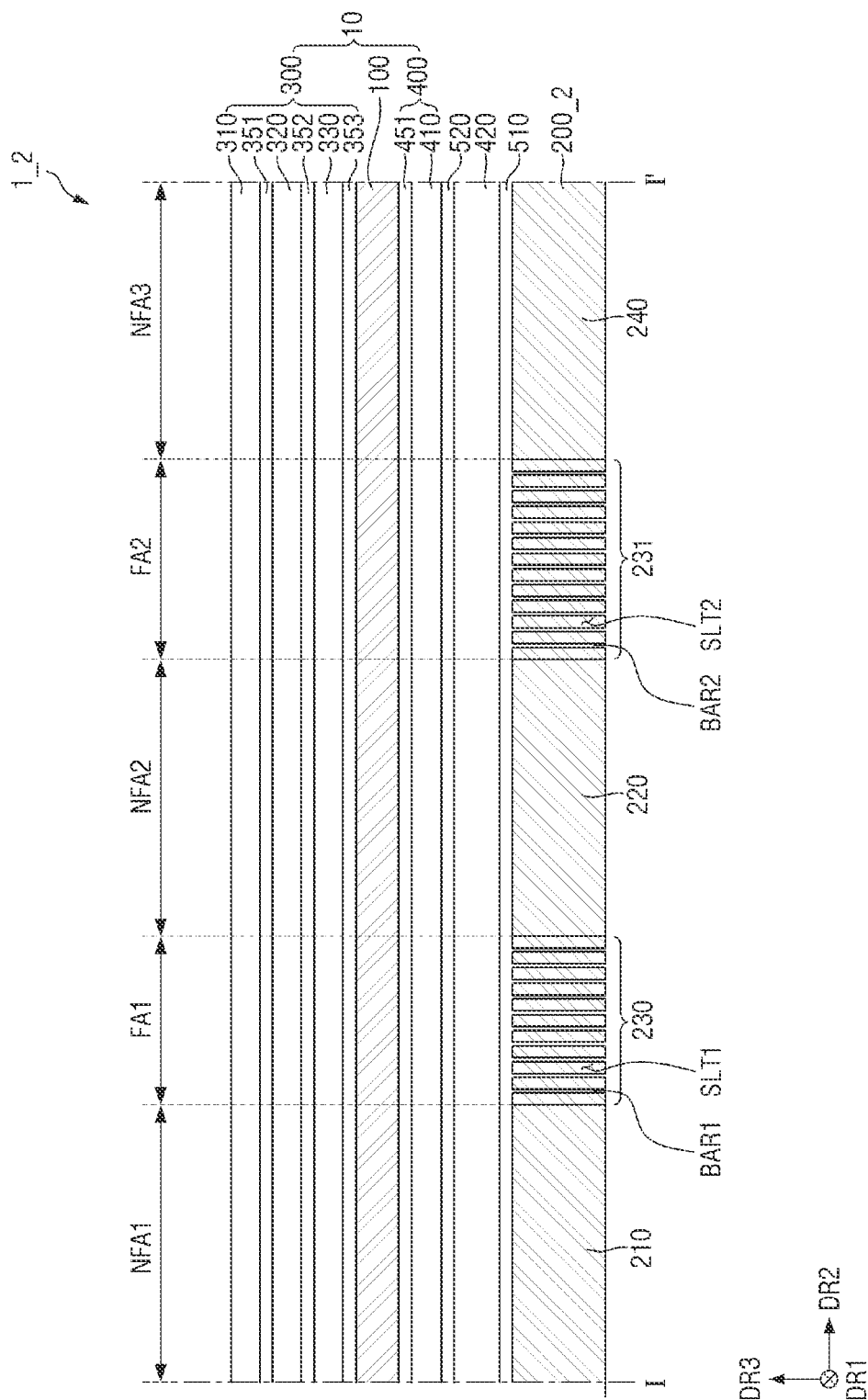
FIG. 32 is a cross-sectional view of a display device according to another embodiment of the present disclosure.
Figure 33:
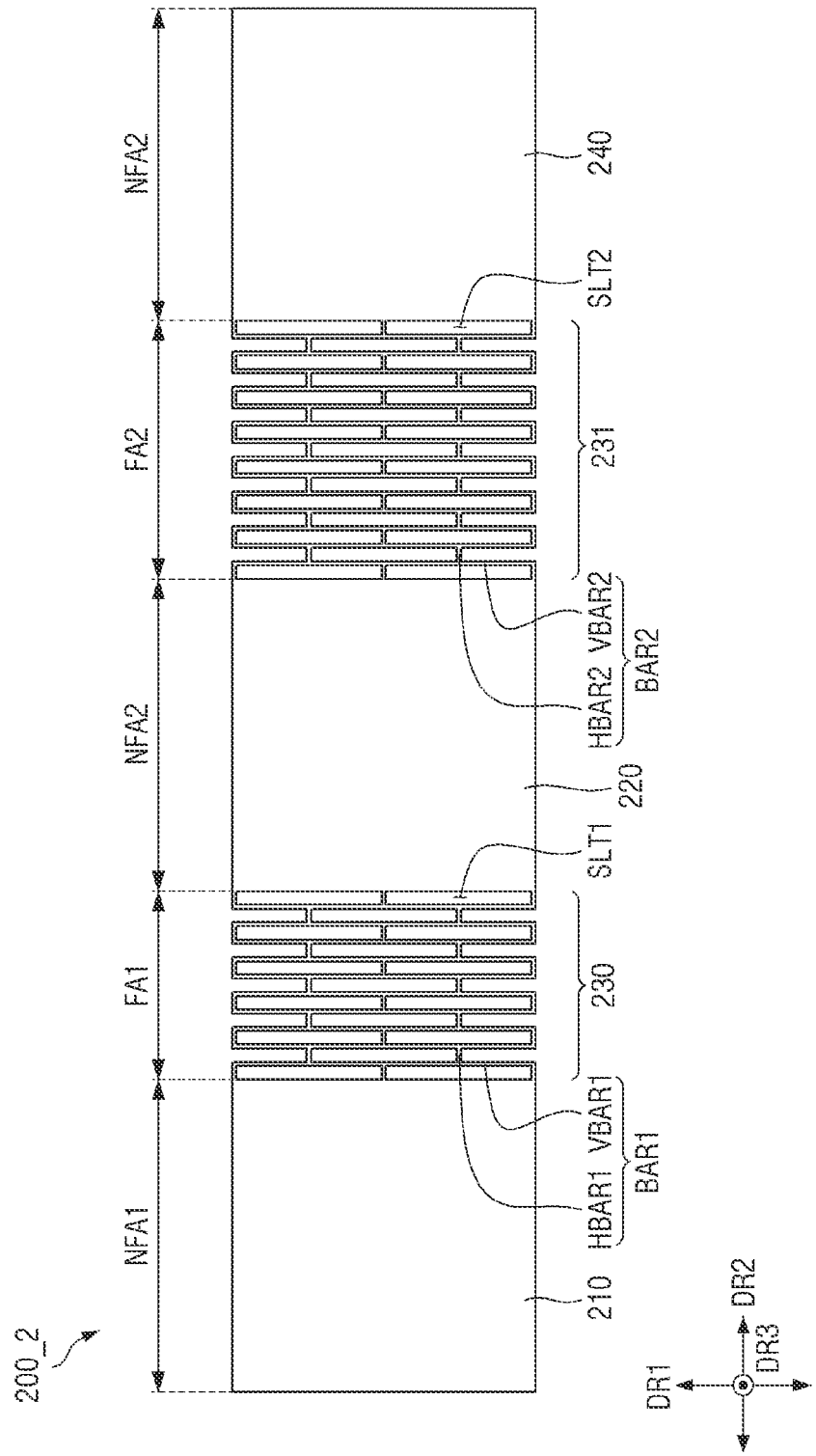
FIG. 33 is a plan view of a metal plate according to another embodiment of the present disclosure.

FIG. 32 is a cross-sectional view of a display device according to another embodiment of the present disclosure. FIG. 33 is a plan view of a metal plate according to another embodiment of the present disclosure.

Referring to FIG. 32, a display device 1_2 may be the same or substantially the same as (or similar to) the display device 1 illustrated in FIG. 5, except that the display device 1_2 may further include the second folding part FA2, the third non-folding part NFA3, and a metal plate 200_2 disposed on the rear side of the display panel 100 that further includes a second connecting portion 231.

In more detail, the display device 1_2 may include two folding parts (e.g., the first folding part FA1 and the second folding part FA2), and the width in the second direction DR2 of the second folding part FA2 may be greater than the width in the second direction DR2 of the first folding part FA1.

Referring to FIG. 33, unlike the metal plate 200 illustrated in FIG. 6, the metal plate 200_2 may further include the second connecting part 231, which includes second bars BAR2, and second slits SLT2 defined by the second bars BAR2. Thus, the second connecting part 231 has a lattice pattern.

Referring to FIGS. 32 and 33, the metal plate 200_2 may include the first plate part 210, the first connecting part 230, a second plate part 220, the second connecting part 231, and a third plate part 240.

The second and third plate parts 220 and 240 may be arranged along the second direction DR2. The second and third plate parts 220 and 240 may be arranged symmetrically or substantially symmetrically with each other with respect to the second folding part FA2. In other words, the second and third plate parts 220 and 240 may be spaced apart from each other in the second direction DR2, with the second folding part FA2 interposed therebetween.

The second plate part 220 may overlap with the second non-folding part NFA2, and the third plate part 240 may overlap with the third non-folding part NFA3. As a result, the second and third plate parts 220 and 240 may be maintained to be flat or substantially flat, regardless of the folding operation of the display device 1_2.

The second connecting part 231 may be disposed between the second and third plate parts 220 and 240. The second connecting part 231 may be disposed to overlap with the second folding part FA2. The second connecting part 231 may be disposed to overlap with the second and third folding lines FL2 and FL3, which extend in the first direction DR1, in the thickness direction (e.g., the third direction DR3).

The second connecting part 231 may include the lattice pattern. In other words, the lattice pattern may include the second bars BAR2, and the second slits SLT2 defined by the second bars BAR2. The second slits SLT2 may be openings (e.g., holes) penetrating the metal plate 200_2 in the third direction DR3.

In other words, the second bars BAR2 may be at least partially spaced apart from one another by the second slits SLT2, and the second slits SLT2 may be spaced apart from one another.

The second bars BAR2 of the second connecting part 231 may include second vertical bars VBAR2, which extend in the first direction DR1, and second horizontal bars HBAR2, which extend in the second direction DR2.

As the second connecting part 231 overlaps with, in the third direction DR3, the second folding part FA2, which is wider than the first folding part FA1 in the second direction DR2, the width in the second direction DR2 of the second connecting part 231 may be greater than the width in the second direction DR2 of the first connecting part 230. Also, as the second connecting part 231 has a larger width than that of the first connecting part 230 in the second direction DR2, the numbers of the second bars BAR2 and the second slits SLT2 of the second connecting part 231 may be greater than the numbers of the first bars BAR1 and the first slits SLT1 of the first connecting part 230, but the present disclosure is not limited thereto.

Figure 34:
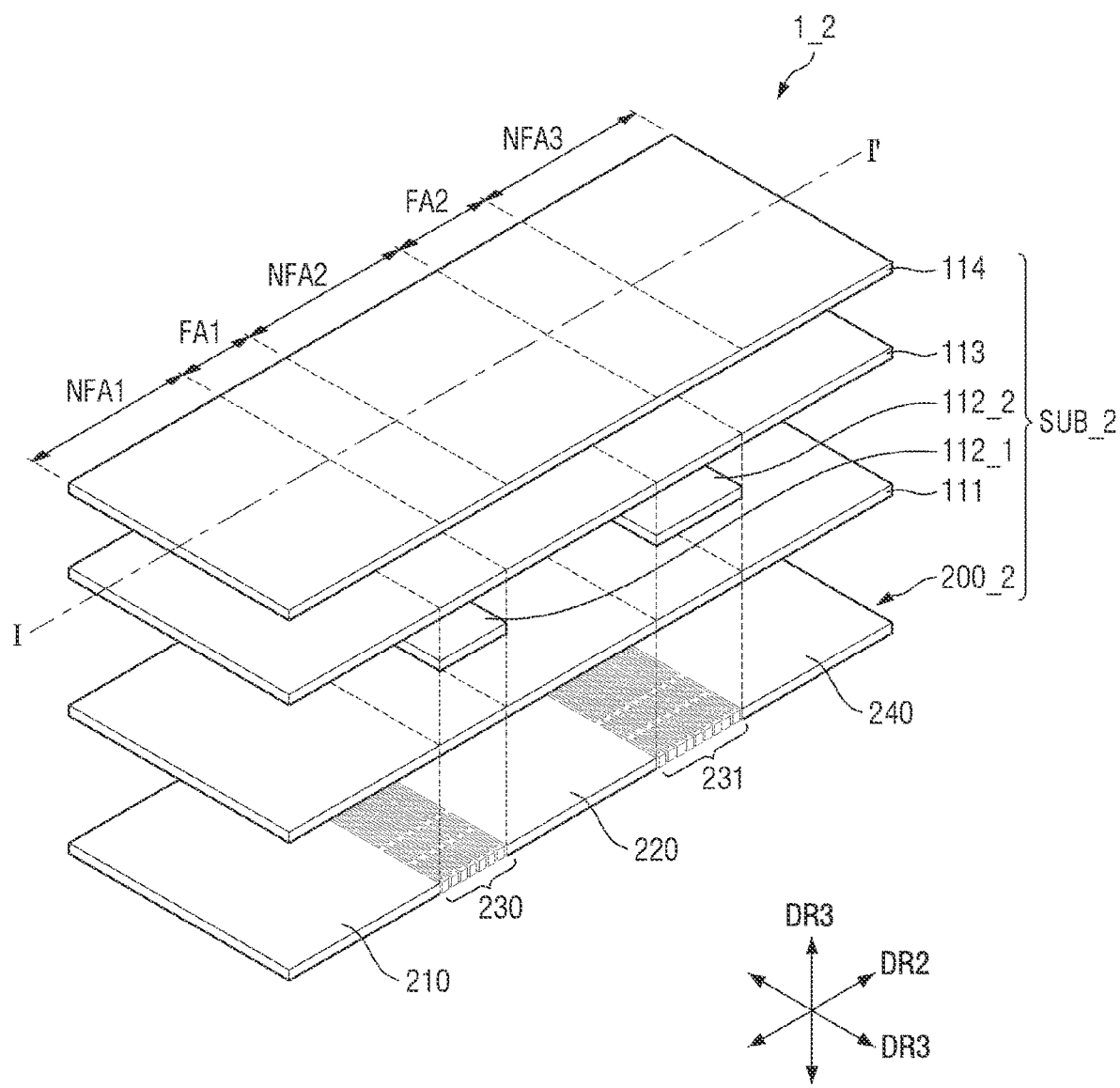
FIG. 34 is an exploded perspective view of a display device according to another embodiment of the present disclosure.

FIG. 34 is an exploded perspective view of a display device according to another embodiment of the present disclosure. FIGS. 35 through 42 are cross-sectional views taken along the line I-I' of FIG. 34 according to some embodiments of the present disclosure.

Figure 35:
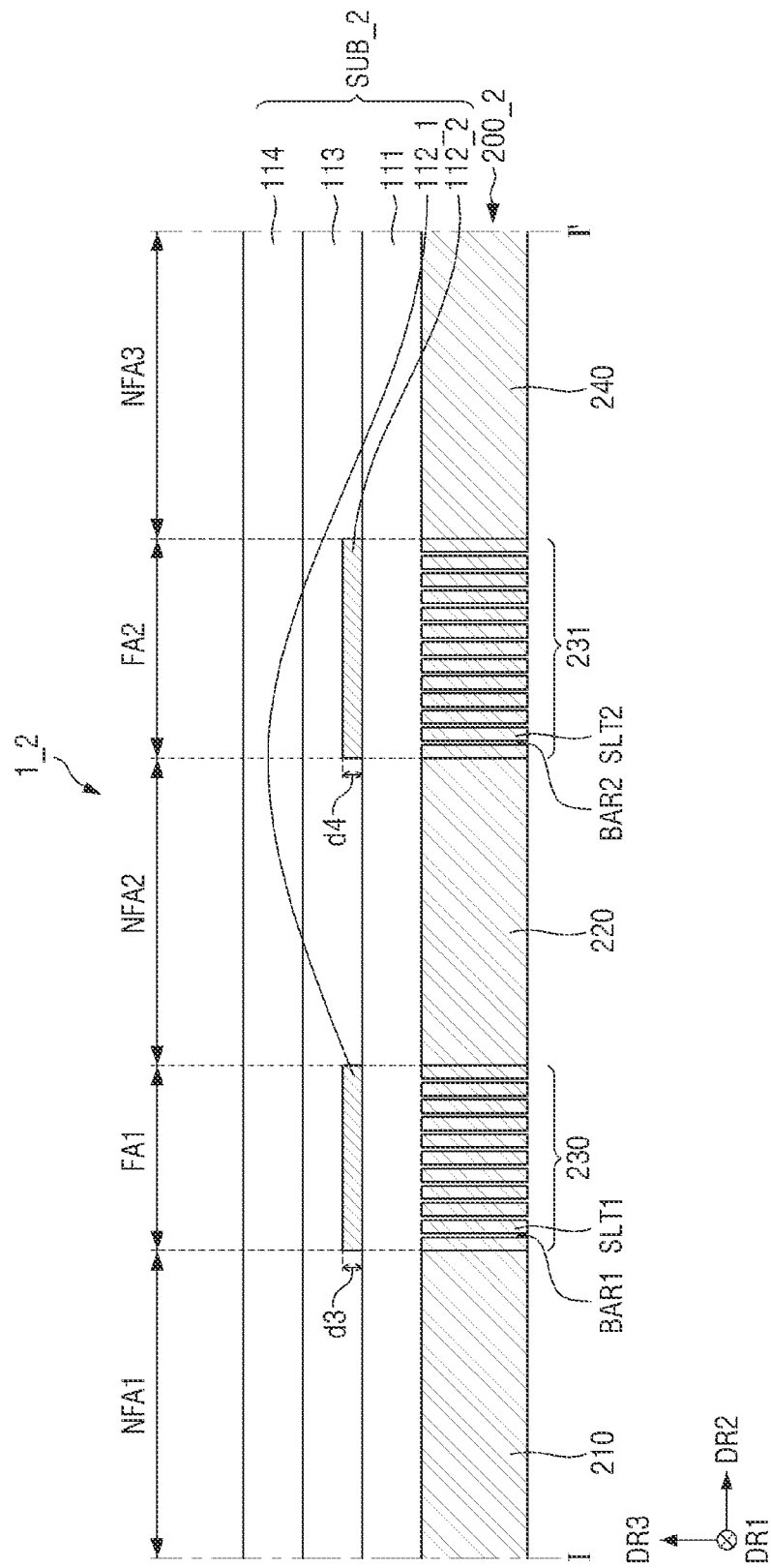
FIGS. 35-42 are cross-sectional views taken along the line I-I' of FIG. 34 according to some embodiments of the present disclosure.

The embodiment illustrated in FIGS. 34 and 35 may differ from the embodiment illustrated in FIG. 8, in that a second reinforcing member 112_2 is further provided at (e.g., in or on) the overlapping area of the second folding part FA2 of the first substrate 111 and the barrier layer 113.

Referring to FIGS. 34 and 35, a first reinforcing member 112_1 may be disposed on the first folding part FA1 of the first substrate 111, and the barrier layer 113 may cover the entire first reinforcing member 112_1 at (e.g., in or on) the overlapping area of the first folding part FA1 of the first substrate 111 and the barrier layer 113.

The second reinforcing member 112_2 may be disposed on the second folding part FA2 of the first substrate 111, and the barrier layer 113 may cover the entire second reinforcing member 112_2 at (e.g., in or on) the overlapping area of the second folding part FA2 of the first substrate 111 and the barrier layer 113.

The first and second reinforcing members 112_1 and 112_2 may be formed of the same or substantially the same material as each other, but the present disclosure is not limited thereto. As another example, in some embodiments, the first and second reinforcing members 112_1 and 112_2 may be formed of different materials from each other. For example, the first reinforcing member 112_1 may include a suitable material, such as Cu, Mo, or Al, and the second reinforcing member 112_2 may be formed as a single layer or multilayers including silicon nitride, silicon oxide, or silicon oxynitride.

A thickness d3 in the third direction DR3 of the first reinforcing member 112_1 may be the same or substantially the same as a thickness d4 in the third direction DR3 of the second reinforcing member 112_2, but the present disclosure is not limited thereto. As another example, in some embodiments, the thickness d3 in the third direction DR3 of the first reinforcing member 112_1 may be different from the thickness d4 in the third direction DR3 of the second reinforcing member 112_2.

Other features of the embodiment illustrated in FIGS. 34 and 35 may be the same or substantially the same as those described above, and thus, redundant description thereof will not be repeated.

Figure 36:
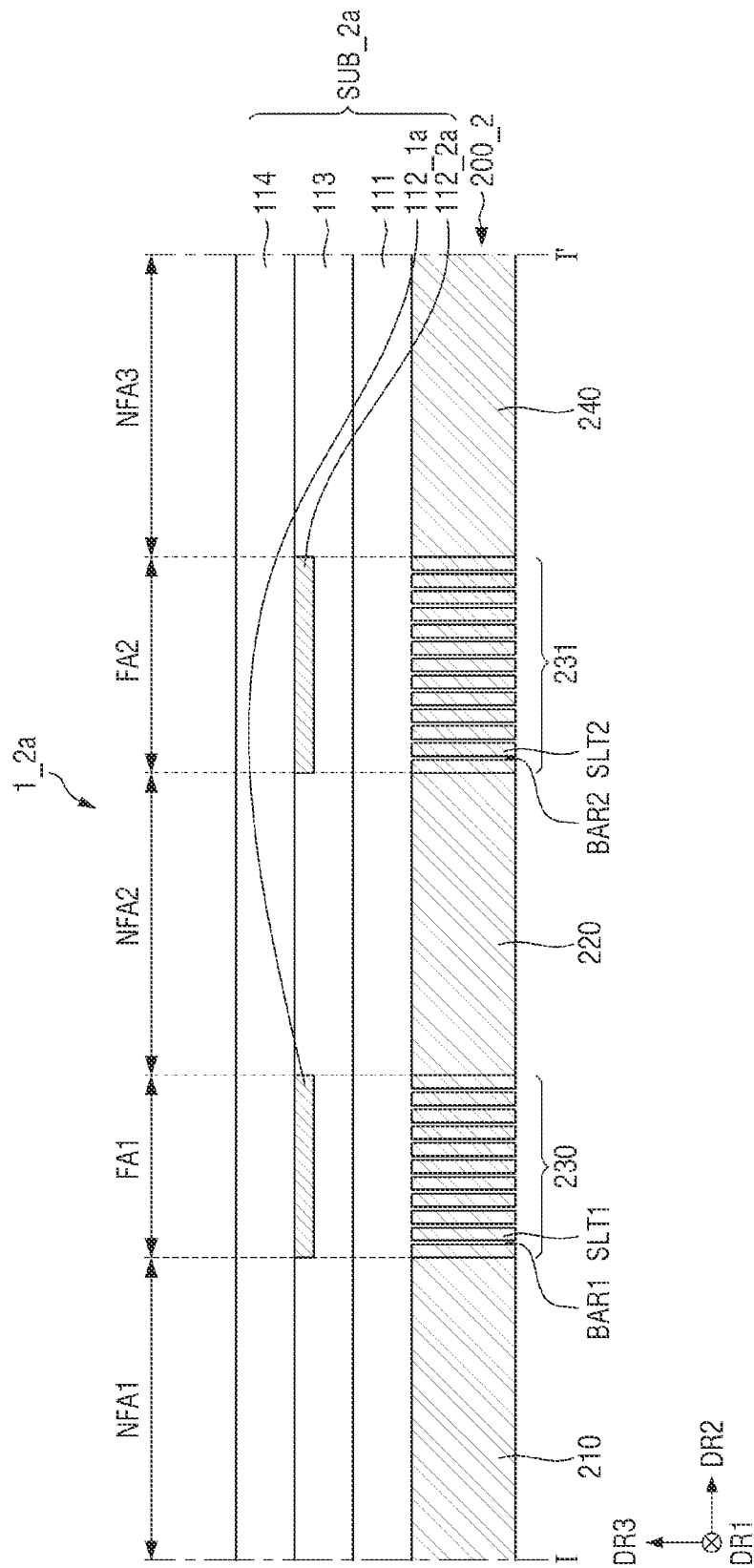

FIG. 36 is a cross-sectional view of a display device taken along the line I-I' of FIG. 34, according to another embodiment of the present disclosure.

The embodiment illustrated in FIG. 36 may differ from the embodiment illustrated in FIG. 35, in that a first reinforcing member 112_1a is disposed on the rear side of the first folding part FA1 of the second substrate 114, and a second reinforcing member 112_2a is disposed between the barrier layer 113 and the second substrate 114 on the rear side of the second folding part FA2 of the second substrate 114.

Other features of the embodiment illustrated in FIG. 36 may be the same or substantially the same as those described above, and thus, redundant description thereof will not be repeated.

Figure 37:
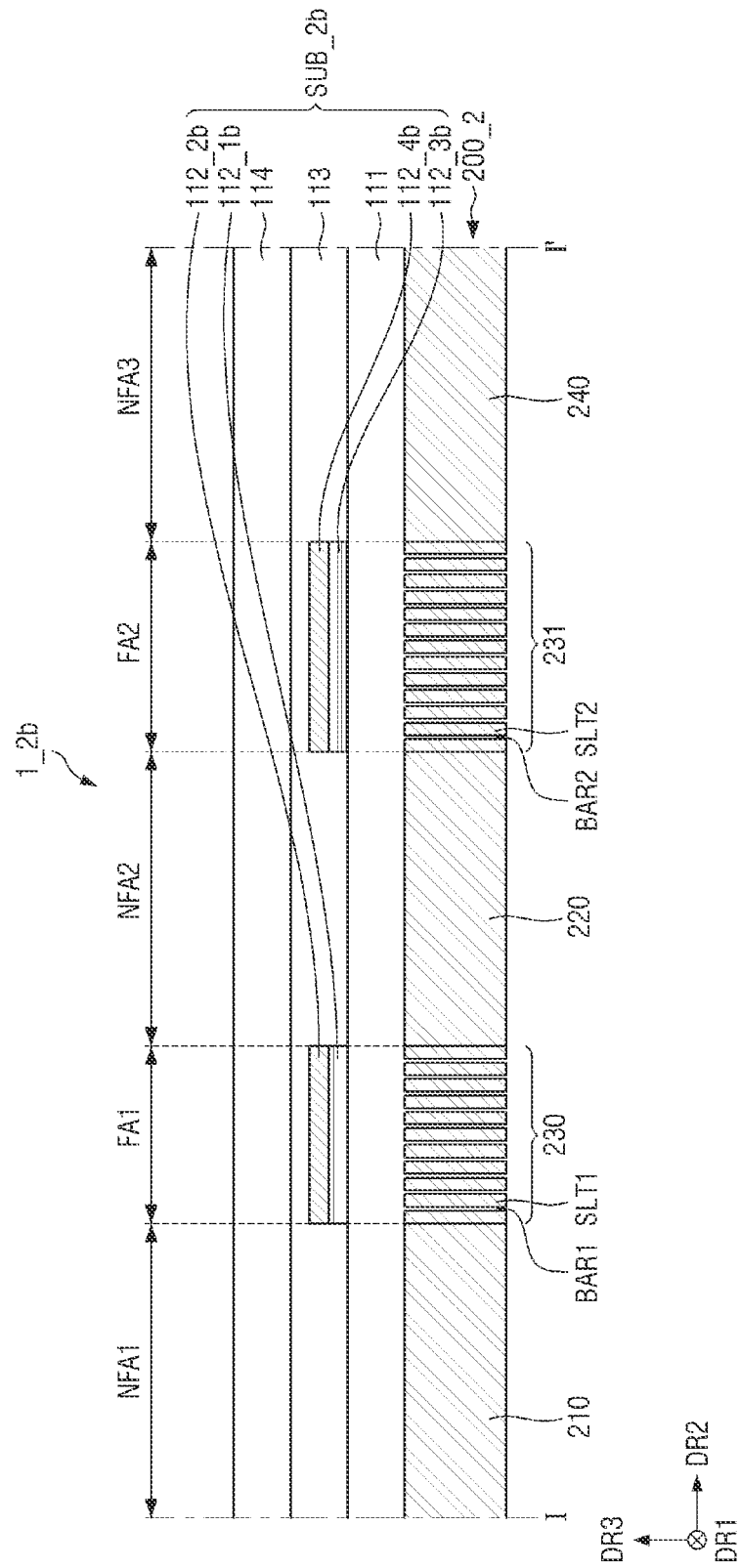

FIG. 37 is a cross-sectional view of a display device taken along the line I-I' of FIG. 34, according to another embodiment of the present disclosure.

The embodiment illustrated in FIG. 37 may differ from the embodiment illustrated in FIG. 22, in that third and fourth reinforcing members 112_3b and 112_4b are further disposed on the second folding part FA2 of the first substrate 111.

Referring to FIG. 37, the third reinforcing member 112_3b may be formed of the same or substantially the same material as that of a first reinforcing member 112_1b, which is disposed on the first folding part FA1 of the first substrate 111, and the fourth reinforcing member 112_4b may be formed of the same or substantially the same material as that of a second reinforcing member 112_2b, which is disposed on the first folding part FA1 of the first substrate 111. However, the present disclosure is not limited thereto.

Other features of the embodiment illustrated in FIG. 37 may be the same or substantially the same as those described above, and thus, redundant description thereof will not be repeated.

Figure 38:
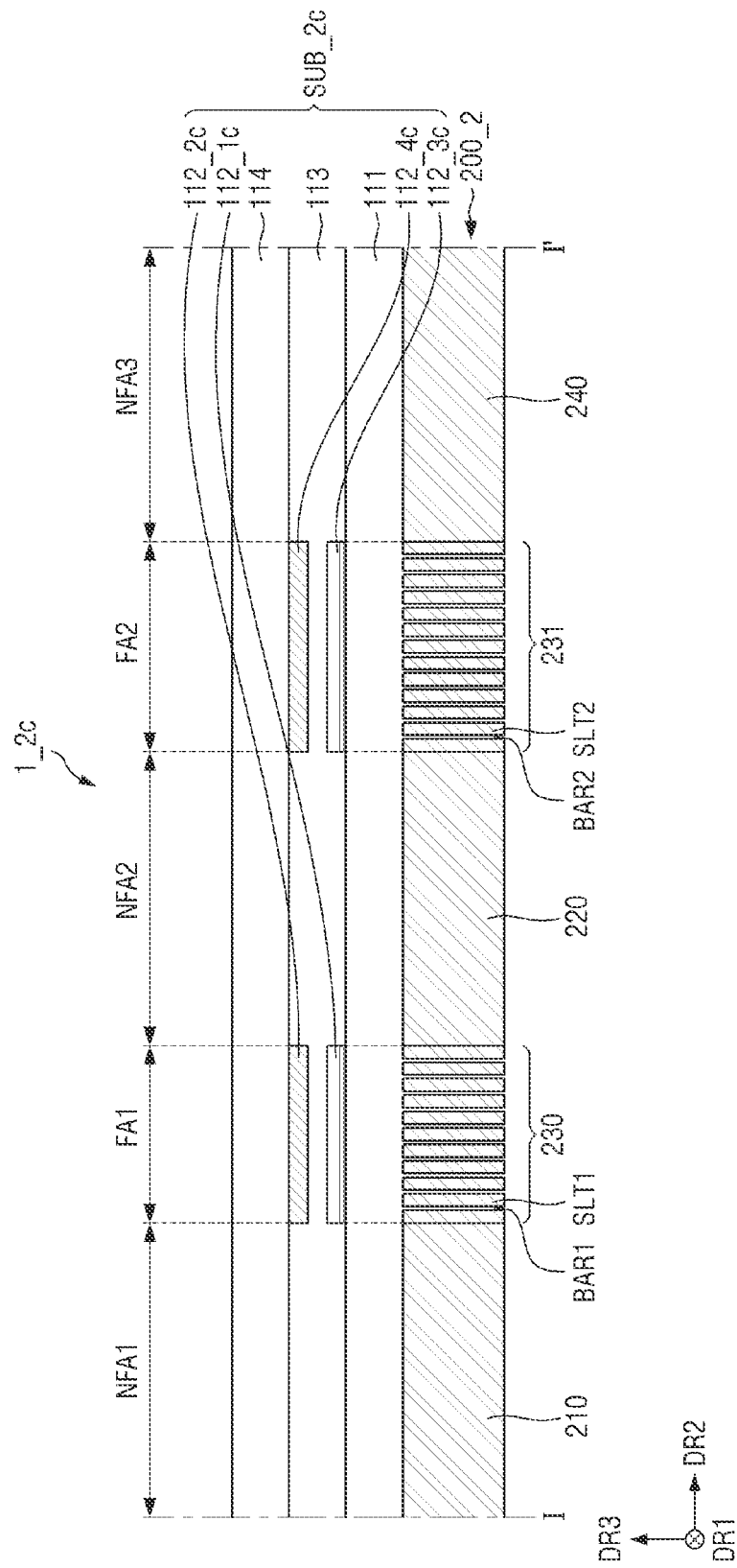

FIG. 38 is a cross-sectional view of a display device taken along the line I-I' of FIG. 34, according to another embodiment of the present disclosure.

The embodiment illustrated in FIG. 38 may differ from the embodiment illustrated in FIG. 37, in that first and second reinforcing members 112_1c and 112_2c are spaced apart from each other in the third direction DR3 with the barrier layer 113 interposed therebetween at (e.g., in or on) the first folding part FA1 of a display device 1_2c, and third and fourth reinforcing members 112_3c and 112_4c are spaced apart from each other in the third direction DR3 with the barrier layer 113 interposed therebetween at (e.g., in or on) the second folding part FA2 of the display device 1_2c.

Other features of the embodiment illustrated in FIG. 38 may be the same or substantially the same as those described above, and thus, redundant description thereof will not be repeated.

Figure 39:
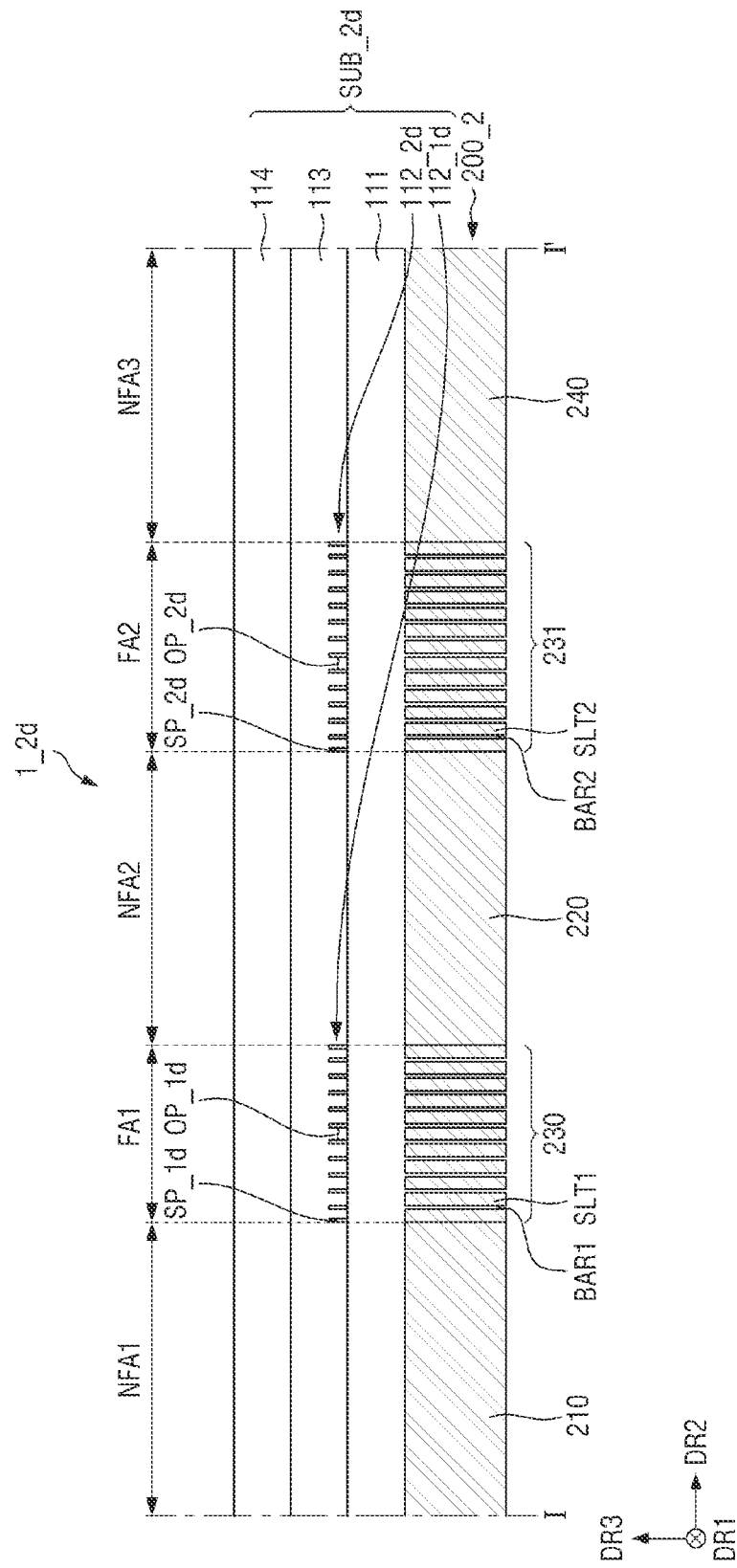

FIG. 39 is a cross-sectional view of a display device taken along the line I-I' of FIG. 34, according to another embodiment of the present disclosure.

The embodiment illustrated in FIG. 39 may differ from the embodiment illustrated in FIG. 16, in that a second reinforcing member 112_2d is further disposed on the second folding part FA2 of the first substrate 111.

Referring to FIG. 39, the first reinforcing member 112_1d, which is disposed on the first folding part FA1 of the first substrate 111, may include a plurality of supporting parts SP_1d and a plurality of openings OP_1d, and thus, may have a mesh pattern. The second reinforcing member 112_2d, which is disposed at (e.g., in or on) the second folding part FA of the first substrate 111, may include a plurality of supporting parts SP_2d and a plurality of openings OP_2d, and thus, may have a mesh pattern.

The first and second reinforcing members 112_1d and 112_2d may be formed of the same or substantially the same material as each other, but the present disclosure is not limited thereto. As another example, the first and second reinforcing members 112_1d and 112_2d may be formed of different materials from each other.

The openings OP_1d of the first reinforcing member 112_1d and the openings OP_2d of the second reinforcing member 112_2d are illustrated as having the same or substantially the same shape as each other, but the present disclosure is not limited thereto. As another example, in some embodiments, the openings OP_1d of the first reinforcing member 112_1d and the openings OP_2d of the second reinforcing member 112_2d may have different shapes from one another.

Other features of the embodiment illustrated in FIG. 39 may be the same or substantially the same as those described above, and thus, redundant description thereof will not be repeated.

Figure 40:
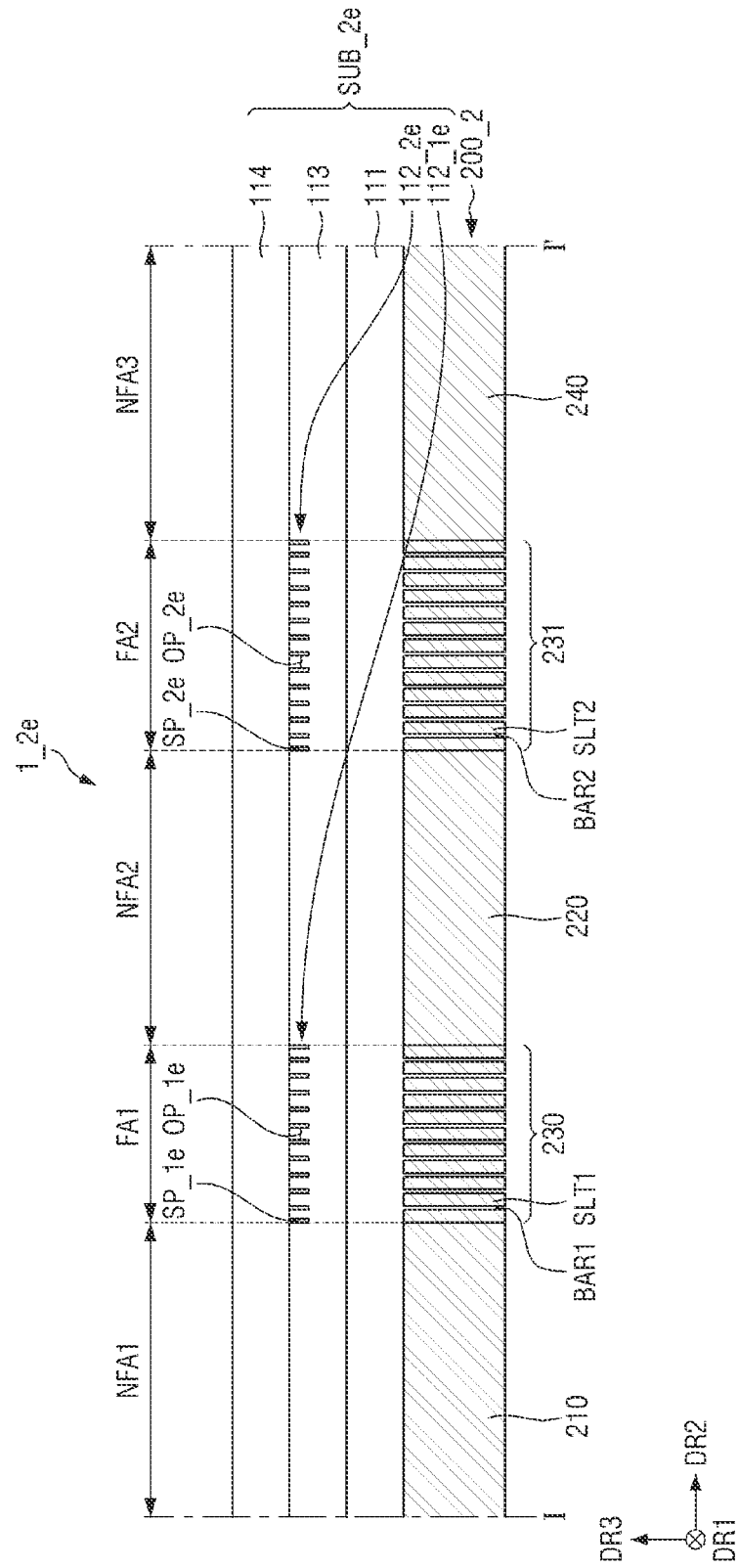

FIG. 40 is a cross-sectional view of a display device taken along the line I-I' of FIG. 34, according to another embodiment of the present disclosure.

The embodiment illustrated in FIG. 40 may differ from the embodiment illustrated in FIG. 39, in that a first reinforcing member 112_1e is disposed on the rear side of the first folding part FA1 of the second substrate 114, and a second reinforcing member 112_2e is disposed on the rear side of the second folding part FA2 of the second substrate 114.

Other features of the embodiment illustrated in FIG. 40 may be the same or substantially the same as those described above, and thus, redundant description thereof will not be repeated.

Figure 41:
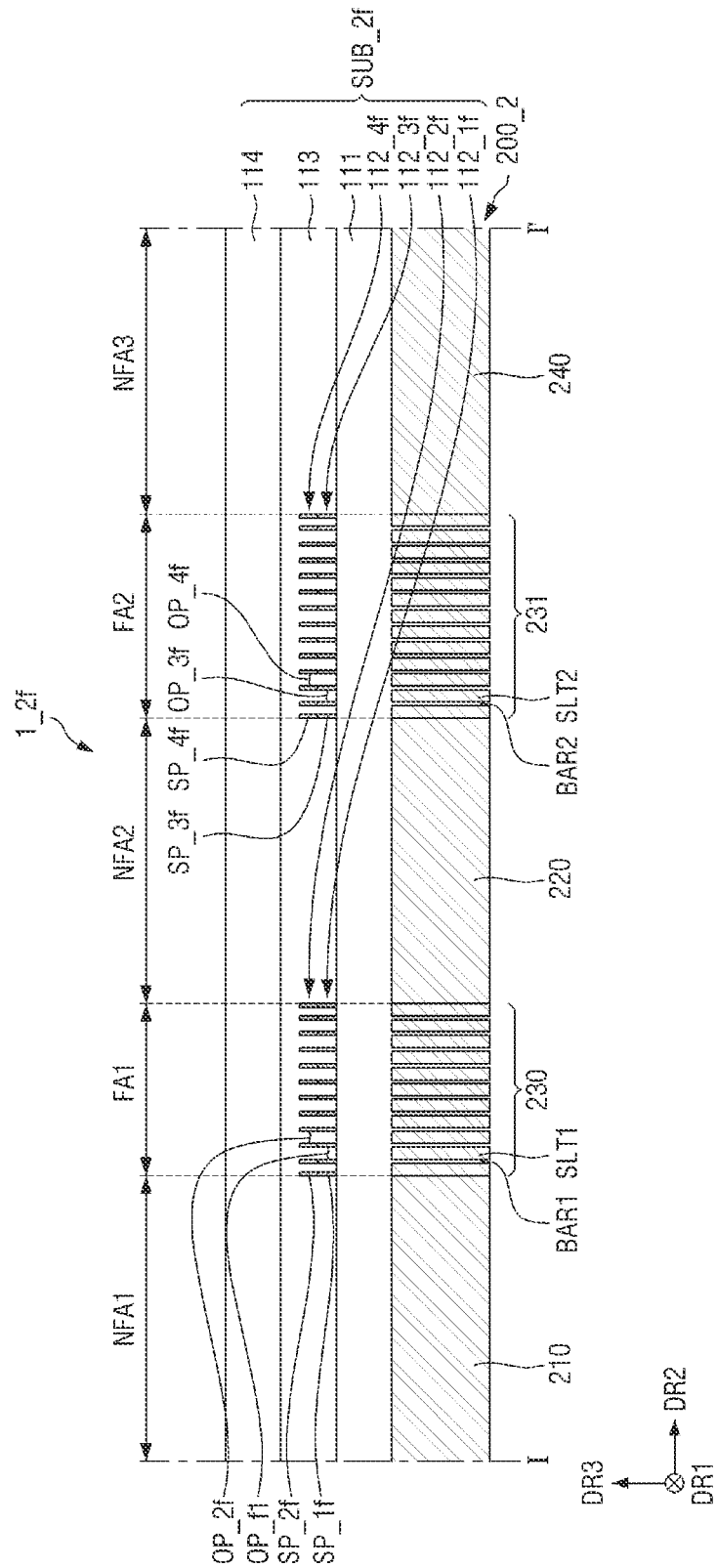

FIG. 41 is a cross-sectional view of a display device taken along the line I-I' of FIG. 34, according to another embodiment of the present disclosure.

The embodiment illustrated in FIG. 41 may differ from the embodiment illustrated in FIG. 37, in that each of first and second reinforcing members 112_1f and 112_2f, which are disposed on the first folding part FA1 of the first substrate 111, includes a plurality of supporting parts and a plurality of openings, and thus, has a mesh pattern, and each of third and fourth reinforcing members 112_3f and 112_4f, which are disposed on the second folding part FA2 of the first substrate 111, includes a plurality of supporting parts and a plurality of openings, and thus, has a mesh pattern.

Referring to FIG. 41, openings OP_1f of the first reinforcing member 112_1f, openings OP_2f of the second reinforcing member 112_2f, openings OP_3f of the third reinforcing member 112_3f, and openings OP_4f of the fourth reinforcing member 112_4f may all have the same or substantially the same shape as one another, but the present disclosure is not limited thereto. As another example, in some embodiments, at least some of the openings OP_1f of the first reinforcing member 112_1f, the openings OP_2f of the second reinforcing member 112_2f, the openings OP_3f of the third reinforcing member 112_3f, and the openings OP_4f of the fourth reinforcing member 112_4f may have the same or substantially the same shape as one another.

As another example, the openings OP_1f of the first reinforcing member 112_1f, the openings OP_2f of the second reinforcing member 112_2f, the openings OP_3f of the third reinforcing member 112_3f, and the openings OP_4f of the fourth reinforcing member 112_4f may all have different shapes from one another.

Supporting parts SP_1f of the first reinforcing member 11_1f, supporting parts SP_2f of the second reinforcing member 112_2f, supporting parts SP_3f of the third reinforcing member 112_3f, and supporting parts SP_4f of the fourth reinforcing member 112_4f may all have the same or substantially the same width in the second direction DR2 as each other, but the present disclosure is not limited thereto. As another example, in some embodiments, at least some of the supporting parts SP_1f of the first reinforcing member 11_1f, the supporting parts SP_2f of the second reinforcing member 112_2f, the supporting parts SP_3f of the third reinforcing member 112_3f, and the supporting parts SP_4f of the fourth reinforcing member 112_4f may have the same or substantially the same width as one another in the second direction DR2.

As another example, the supporting parts SP_1f of the first reinforcing member 11_1f, the supporting parts SP_2f of the second reinforcing member 112_2f, the supporting parts SP_3f of the third reinforcing member 112_3f, and the supporting parts SP_4f of the fourth reinforcing member 112_4f may all have different widths in the second direction DR2 from one another.

Other features of the embodiment illustrated in FIG. 41 may be the same or substantially the same as those described above, and thus, redundant description thereof will not be repeated.

Figure 42:
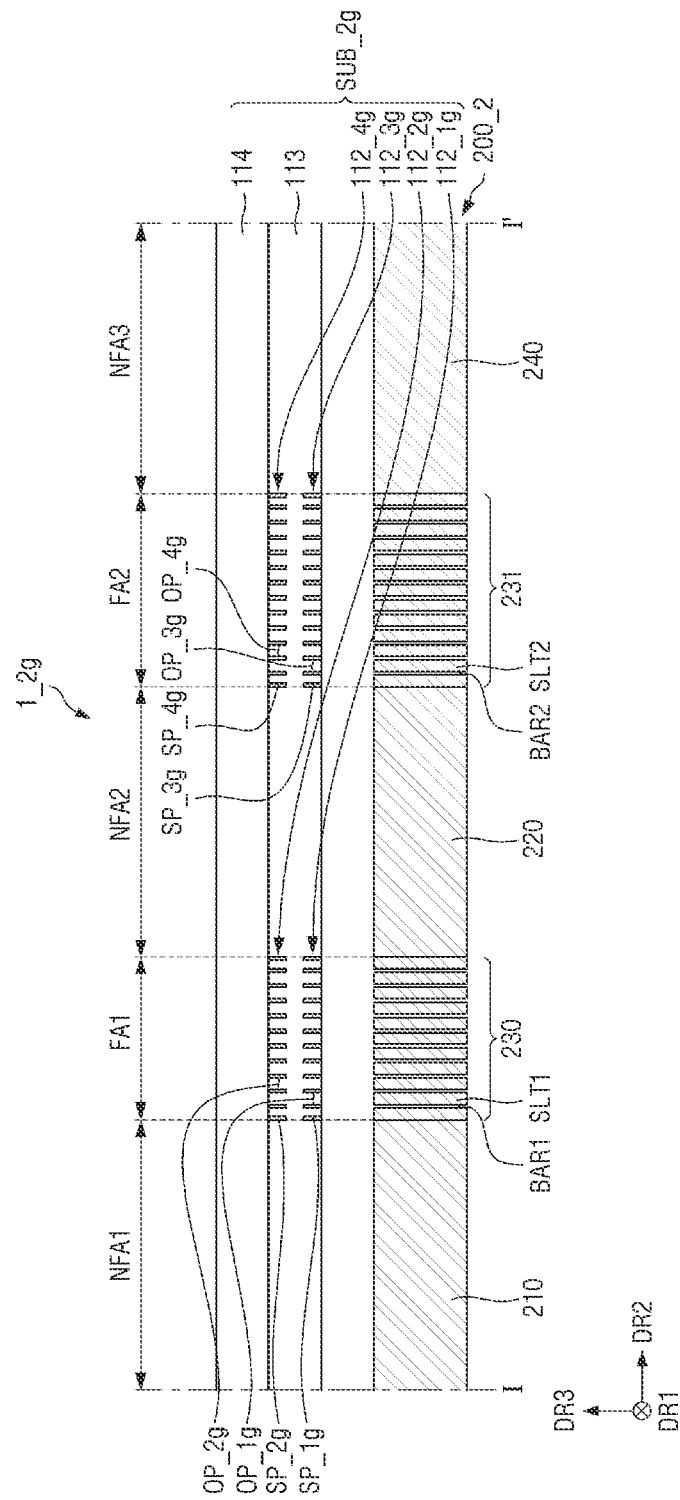

FIG. 42 is a cross-sectional view of a display device taken along the line I-I' of FIG. 34, according to another embodiment of the present disclosure.

The embodiment illustrated in FIG. 42 may differ from the embodiment illustrated in FIG. 41, in that first and second reinforcing members 112_1g and 112_2g are spaced apart from each other in a third direction DR3, with the barrier layer 113 interposed therebetween at (e.g., in or on) the first folding part FA1 of a display device 1_2g, and third and fourth reinforcing members 112_3g and 112_4g are spaced apart from each other in the third direction DR3, with the barrier layer 113 interposed therebetween at (e.g., in or on) the second folding part FA2 of the display device 1_2g.

Other features of the embodiment illustrated in FIG. 42 may be the same or substantially the same as those described above, and thus, redundant description thereof will not be repeated.

According to one or more embodiments of the present disclosure, a display device having one or more folding parts may include one or more reinforcing members having a large modulus value that are disposed on the substrate of the display device having the one or more folding parts, and thus, the impact resistance of the display device in each of the one or more folding parts may be improved. As a result, the reliability of the display device may be be improved.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
   a first substrate comprising:
     a folding part; and
     first and second non-folding parts spaced from each other by the folding part;
   a second substrate on the first substrate, and comprising:
     a folding part; and
     first and second non-folding parts spaced from each other by the folding part of the second substrate;
   a first reinforcing member between the first and second substrates, and overlapping with the folding parts of the first and second substrates;
   a metal plate on a rear side of the first substrate, and comprising:
     a connecting part overlapping with the first reinforcing member, and comprising:
       slits; and
       bars at least partially spaced from one another by the slits;
     a first plate part overlapping with the first non-folding part of the first substrate; and
     a second plate part spaced from the first plate part with the connecting part interposed therebetween, and overlapping with the second non-folding part of the first substrate; and
   a middle layer between the first and second substrates, and overlapping with a central portion of the first reinforcing member in a plan view, the middle layer contacting at least a side surface of the first reinforcing member.

2. The display device of claim 1, wherein the first reinforcing member does not overlap with the first and second plate parts.

3. The display device of claim 1, wherein the first reinforcing member has a modulus value of 50 GPa to 450 GPa.

4. The display device of claim 1, wherein the first reinforcing member includes at least one of molybdenum, copper, aluminum, silicon nitride, silicon oxide, or silicon oxynitride.

5. A display device comprising:
   a first substrate comprising:
     a folding part; and
     first and second non-folding parts spaced from each other by the folding part;
   a second substrate on the first substrate, and comprising:
     a folding part; and
     first and second non-folding parts spaced from each other by the folding part of the second substrate;
   a first reinforcing member between the first and second substrates, and overlapping with the folding parts of the first and second substrates; and
   a metal plate on a rear side of the first substrate, and comprising:
     a connecting part overlapping with the first reinforcing member, and comprising:
       slits; and
       bars at least partially spaced from one another by the slits;
     a first plate part overlapping with the first non-folding part of the first substrate; and a second plate part spaced from the first plate part with the connecting part interposed therebetween, and overlapping with the second non-folding part of the first substrate, wherein the first reinforcing member comprises:
 a plurality of first supporting parts; and
 a plurality of first openings between the first supporting parts, and penetrating the first reinforcing member in a thickness direction, and
wherein the first reinforcing member has a mesh pattern defined by the first supporting parts and the first openings.

6. The display device of claim 5, wherein the first openings have a circular shape or a polygonal shape, and
 wherein the polygonal shape is one of a triangular shape, a rectangular shape, a pentagonal shape, or a hexagonal shape.

7. The display device of claim 5, wherein a width of the first supporting parts is 50 µm to 500 µm.

8. The display device of claim 5, wherein a width of the first openings is 30 µm to 300 µm.

9. The display device of claim 5, further comprising:
 a second reinforcing member between the first and second substrates, and overlapping with the first reinforcing member,
 wherein the second reinforcing member overlaps with the connecting part.

10. The display device of claim 9, wherein the first and second reinforcing members include different materials from each other.

11. The display device of claim 9, wherein the first and second reinforcing members have different thicknesses from each other.

12. The display device of claim 9, wherein the second reinforcing member comprises:
 a plurality of second supporting parts; and
 a plurality of second openings between the second supporting parts, and penetrating the second reinforcing member in the thickness direction, and
wherein the second reinforcing member has a mesh pattern defined by the second supporting parts and the second openings.

13. The display device of claim 12, wherein the second openings have a different shape from that of the first openings.

14. The display device of claim 1, wherein the middle layer covers an entirety of the first reinforcing member.

15. A display substrate comprising:
 a first substrate comprising:
  a folding part; and
  first and second non-folding parts spaced from each other by the folding part;
 a second substrate on the first substrate, and comprising:
  a folding part; and
  first and second non-folding parts spaced from each other by the folding part of the second substrate; and
 a reinforcing member overlapping with the folding parts of the first and second substrates,
 wherein the reinforcing member comprises:
  a plurality of supporting parts; and
  a plurality of openings between the supporting parts, and penetrating the reinforcing member in a thickness direction, and
 wherein the reinforcing member has a mesh pattern defined by the supporting parts and the openings, and
 wherein the openings are filled in with a middle layer between the first and second substrates.

16. The display substrate of claim 15, further comprising:
the middle layer between the first and second substrates,
wherein the middle layer covers an entirety of the reinforcing member.

* * * * *